(12) United States Patent
Vincent et al.

(10) Patent No.: US 11,275,590 B2
(45) Date of Patent: Mar. 15, 2022

(54) DEVICE AND PROCESSING ARCHITECTURE FOR RESOLVING EXECUTION PIPELINE DEPENDENCIES WITHOUT REQUIRING NO OPERATION INSTRUCTIONS IN THE INSTRUCTION MEMORY

(71) Applicant: HUAWEI TECHNOLOGIES CO., LTD., Shenzhen (CN)

(72) Inventors: John Edward Vincent, Ottawa (CA); Peter Man Kin Sinn, Nepean (CA); Benton Watson, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 341 days.

(21) Appl. No.: 15/068,058

(22) Filed: Mar. 11, 2016

(65) Prior Publication Data
US 2017/0060579 A1    Mar. 2, 2017

Related U.S. Application Data

(60) Provisional application No. 62/210,254, filed on Aug. 26, 2015.

(51) Int. Cl.
G06F 9/38  (2018.01)
G06F 9/30  (2018.01)
G06F 9/32  (2018.01)

(52) U.S. Cl.
CPC ........ *G06F 9/3836* (2013.01); *G06F 9/30058* (2013.01); *G06F 9/30127* (2013.01);
(Continued)

(58) Field of Classification Search
CPC .................................................... G06F 9/3836
See application file for complete search history.

(56) References Cited

U.S. PATENT DOCUMENTS 5,664,136 A * 9/1997 Witt .................... G06F 9/30014
                                                     712/200
5,771,376 A    6/1998 Hayakawa et al.
(Continued)

FOREIGN PATENT DOCUMENTS

| CN | 104424026 A | 3/2015 |
| CN | 104509043 A | 4/2015 |
| JP | H08272738 A | 10/1996 |

OTHER PUBLICATIONS

Sunghyun Jee et al: "Dynamically scheduling VLIW instructions with dependency information", Interaction Between Compilers and Computer Architectures, Jan. 1, 2002, pp. 15-23, XP010588694.
(Continued)

*Primary Examiner* — Jacob Petranek
(74) *Attorney, Agent, or Firm* — Slater Matsil, LLP

(57) ABSTRACT

Different processor architectures are described to evaluate and track dependencies required by instructions. The processors may hold or queue instructions that require output of other instructions until required data and resources are available which may remove the requirement of NOPs in the instruction memory to resolve dependencies and pipeline hazards. The processor may divide instruction data into bundles for parallel execution and provide speculative execution. The processor may include various components to implement an evaluation unit, execution unit and termination unit.

27 Claims, 32 Drawing Sheets

(52) U.S. Cl.
CPC .............. *G06F 9/321* (2013.01); *G06F 9/322* (2013.01); *G06F 9/3814* (2013.01); *G06F 9/3824* (2013.01); *G06F 9/3834* (2013.01); *G06F 9/3838* (2013.01); *G06F 9/3853* (2013.01); *G06F 9/3855* (2013.01); *G06F 9/3859* (2013.01); *G06F 9/3861* (2013.01); *G06F 9/3871* (2013.01)

(56) References Cited

U.S. PATENT DOCUMENTS

| | | | |
|---|---|---|---|
| 5,978,925 A | | 11/1999 | Shiraishi et al. |
| 6,079,014 A | * | 6/2000 | Papworth .............. G06F 9/3806 |
| | | | 712/1 |
| 6,542,986 B1 | * | 4/2003 | White ................. G06F 9/30152 |
| | | | 712/217 |
| 6,697,932 B1 | * | 2/2004 | Yoaz ..................... G06F 9/3824 |
| | | | 712/216 |
| 8,504,691 B1 | | 8/2013 | Tobler et al. |
| 8,776,067 B1 | | 7/2014 | Yancey |
| 9,182,986 B2 | * | 11/2015 | Rajwar ................ G06F 9/30145 |
| 2006/0101241 A1 | | 5/2006 | Curran et al. |
| 2011/0314263 A1 | | 12/2011 | Greiner et al. |
| 2012/0204008 A1 | * | 8/2012 | Dockser ................ G06F 9/3802 |
| | | | 712/208 |
| 2012/0278596 A1 | * | 11/2012 | Tran ...................... G06F 9/3838 |
| | | | 712/228 |
| 2013/0297912 A1 | * | 11/2013 | Tran ...................... G06F 9/3814 |
| | | | 712/208 |
| 2014/0036929 A1 | | 2/2014 | Lih et al. |
| 2015/0220347 A1 | | 8/2015 | Glossner et al. |
| 2016/0110201 A1 | * | 4/2016 | Carlson ................. G06F 9/3836 |
| | | | 712/215 |

OTHER PUBLICATIONS

Wang, A., et al., "Application Development of TMS320C674X DSP", Beihang University Press, Mar. 2012, 21 Pages.

* cited by examiner

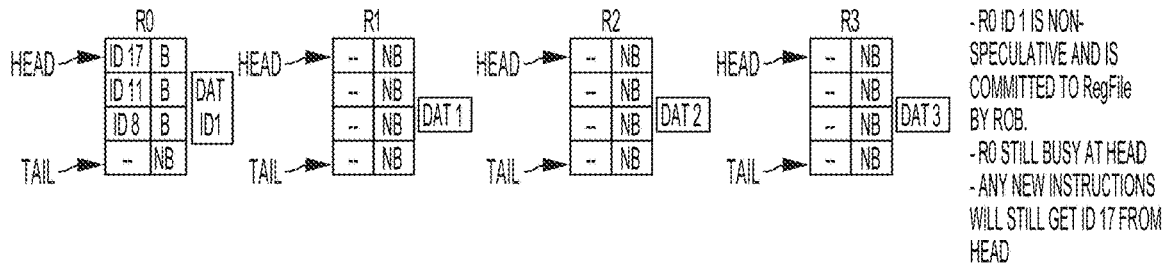
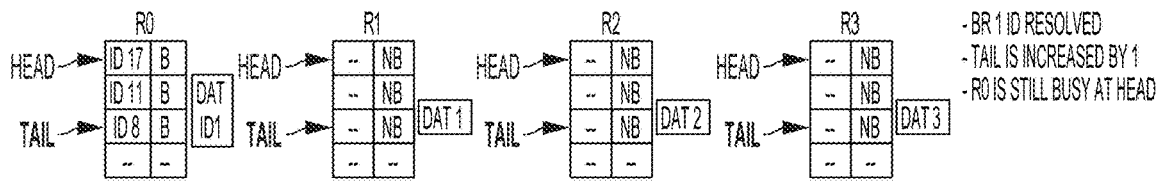
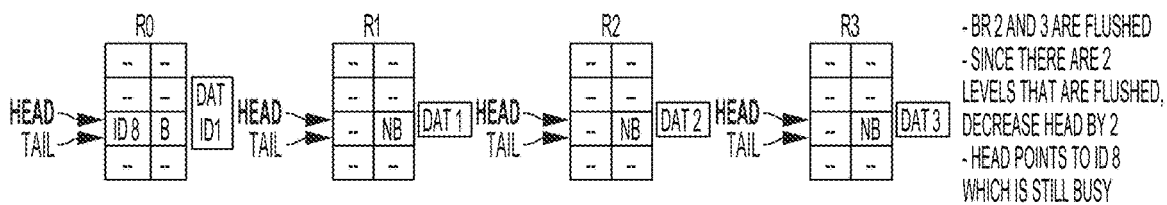
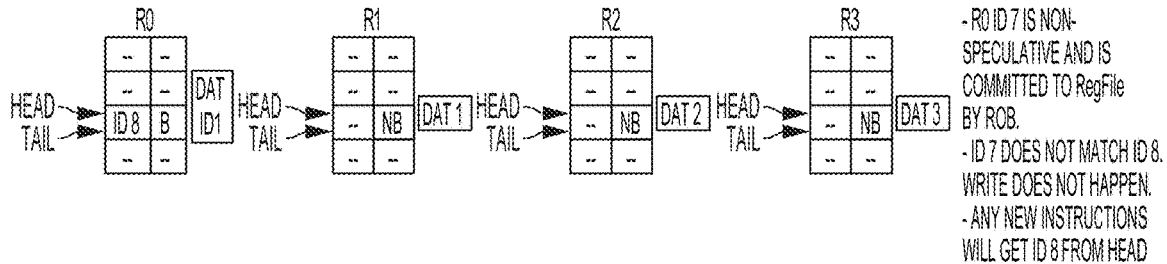
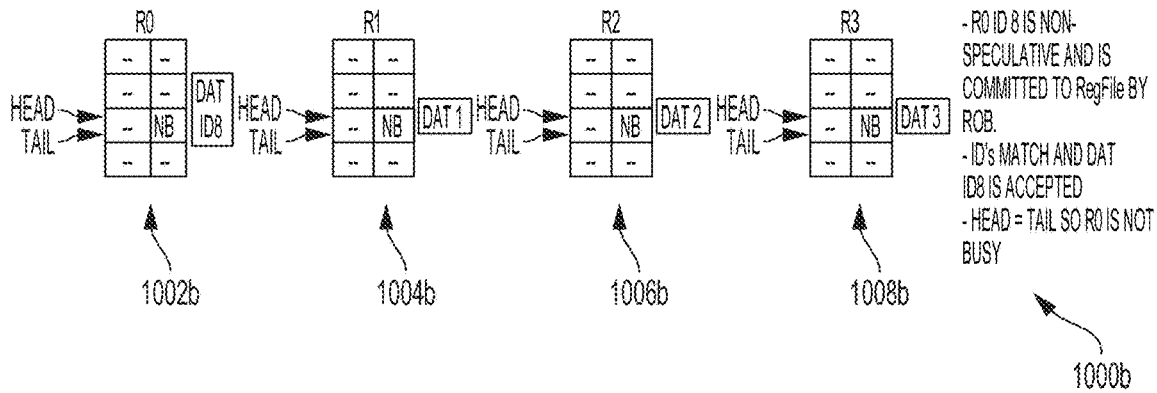
FIG. 11

FIG. 21

| | LD | ST | BRU | SALU | SMUL | CCM | VMAC | VALU | VLUT | NOP |
|---|---|---|---|---|---|---|---|---|---|---|
| INST TAG | X | X | X | X | X | X | X | X | X | X |
| LOAD Q ENTRY | X | | | | | | | | | |
| STORE Q ENTRY | | X | | | | | | | | |
| BRU Q ENTRY | | | X | | | | | | | |
| SALU Q ENTRY | | | | X | | | | | | |
| SMUL Q ENTRY | | | | | X | | | | | |
| VMAC Q ENTRY | | | | | | | X | | | |
| VALU Q ENTRY | | | | | | | | X | | |
| VLUT Q ENTRY | | | | | | | | | X | |
| CCM Q ENTRY | | | | | | X | | | | |
| BRU BUFFER | | | X | | | | | | | |
| LOAD BUFFER | X | | | | | | | | | |
| STORE BUFFER | | X | | | | | | | | |
| VTIR | X (IF INTEGER LD) | | X | X | X | X (IF CSR READ) | X | | X (IF INTEGER RESULT) | |
| VTVR | X (IF VECTOR LD) | | | | | | X | X | X (IF INTEGER RESULT) | |

| VIRTUAL TEMPORARY INTEGER REGISTER (VTIR) ALLOCATION | | |
|---|---|---|
| CR NAME | VTIR INDICES | # OF VTIR |
| SALU0 | 0-3; 32-35 | 8 |
| SALU1 | 4-7; 36-39 | 8 |
| SMUL | 8-10; 40-42 | 6 |
| BRU | 12-13; 44-45 | 4 |
| VLUT | 16-18; 48-50 | 6 |
| CCM | 20; 52 | 2 |
| LSC LD0 | 24-26; 56-58 | 6 |
| LSC LD1 | 28-30; 60-62 | 6 |
| VIRTUAL TEMPORARY VECTOR REGISTER (VTVR) ALLOCATION | | |
| CR NAME | VTVR INDICES | # OF VTVR |
| VMAC | 0-5; 32-37 | 12 |
| VALU | 8-12; 40-44 | 10 |
| VLUT | 16-18; 48-50 | 6 |
| LSC LD0 | 24-26; 56-58 | 6 |
| LSC LD1 | 28-30; 60-62 | 6 |

FIG. 23

| INTEGER RESOURCES | # OF RESOURCES |
| --- | --- |
| RESOURCE NAME | |
| SALU0 QUEUE | 4 |
| SALU1 QUEUE | 4 |
| SMUL QUEUE | 4 |
| LSC LD0 QUEUE | 2 |
| LSC LD1 QUEUE | 2 |
| LSC ST QUEUE | 2 |
| LSC SLD0 BUFFER | 6 |
| LSC SLD1 BUFFER | 6 |
| LSC ST BUFFER | 6 |
| BRU QUEUE | 4 |
| BRU BUFFER | 4 |
| CCM QUEUE | 2 |
| VECTOR RESOURCES | # OF RESOURCES |
| RESOURCE NAME | |
| VMAC QUEUE | 6 |
| VALU QUEUE | 6 |
| VLUT QUEUE | 6 |
| LSC VLD0 BUFFER | 6* |
| LSC VLD1 BUFFER | 6* |

FIG. 24

| INTEGER REGISTER COMMIT PORTS | |
|---|---|
| CMT PORT ID | VTIR GROUP |
| 0,1 | SALU/SMUL/BRU |
| 2,3 | LSC |
| 4 | VLUT/CCM |
| VECTOR REGISTER COMMIT PORTS | |
| CMT PORT ID | VTVR GROUP |
| 0,1 | VMAC, VALU, VLUT |
| 2,3 | LSC |

FIG. 27

| CR NAMES | # READ PORTS |
|---|---|
| SALU | 4 |
| SMUL | 2 |
| BRU | 2 |
| LSC | 4 |
| VLUT | 2 |
| CCM | 1 |

FIG. 28

| CR NAME | # READ PORTS |
|---------|--------------|
| VMAC    | 3            |
| VALU    | 2            |
| VLUT    | 2            |

FIG. 29

| DEBUG ADDRESS OFFSET | OBSERVABLE SIGNAL |
| --- | --- |
| 0x0000 - 0x001f | 32 IFT ENTRIES (EXCEPT IN-USE AND COMMIT FIELDS) |
| 0x0020 - 0x003f | 32 VTIR/VTVR MAP ENTRIES |
| 0x0040 - 0x005f | 32 VTIR/VTVR COUNT TABLE ENTRIES |
| 0x0060 | SALU/SMUL/BRU/CCM QUEUE AVAILABLE |
| 0x0061 | SALU/SMUL/BRU/CCM QUEUE IN-USE |
| 0x0062 | SALU/SMUL/BRU/CCM CURRENT RESOURCE POINTERS |
| 0x0063 | LSC QUEUE/BUFFER AVAILABLE |
| 0x0064 | LSC QUEUE/BUFFER IN-USE |
| 0x0065 | LSC QUEUE BUFFER CURRENT RESOURCE POINTERS |
| 0x0066 | VMAC/VALU/VLUT QUEUE AVAILABLE |
| 0x0067 | VMAC/VALU/VLUT QUEUE IN-USE |
| 0x0068 | VMAC/VALU/VLUT CURRENT RESOURCE POINTERS |
| 0x0069 | CURRENT COMMIT POINTER |
| 0x006a | "OK2TERMINATE" BITS |
| 0x006b - 0x006c | VTIR "OK2COMMIT" BITS |
| 0x006d - 0x006e | VTVR "OK2COMMIT" BITS |
| 0x006f | TAG IN-USE STATUS |
| 0x0070 | TAG COMMIT STATUS |
| 0x0071 - 0x0074 | FLUSH STATE BITS |
| 0x0075 - 0x0076 | VTIR COMMIT STATUS BITS |
| 0x0077 - 0x0078 | VTVR COMMIT STATUS BITS |
| 0x0079 - 0x007a | VTIR IN-QUEUE STATUS BITS |
| 0x007b - 0x007c | VTVR IN-QUEUE STATUS BITS |
| 0x007d | SPECULATION STATE BITS |
| 0x007e - 0x007f | RESERVED |

FIG. 30

DEVICE AND PROCESSING ARCHITECTURE FOR RESOLVING EXECUTION PIPELINE DEPENDENCIES WITHOUT REQUIRING NO OPERATION INSTRUCTIONS IN THE INSTRUCTION MEMORY

FIELD

The improvements generally relate to the field of processors and memory.

INTRODUCTION

Processors receive instructions from an instruction memory. There may be problems or hazards with the instruction pipeline in a processor architecture when the next instruction cannot execute in the following clock cycle. There are techniques to resolve or avoid hazards and dependencies in the execution pipeline by, for example, the insertion of No Operation instructions (NOP) into the instruction code. A NOP is an instruction that does nothing and the insertion of NOPs may use instruction memory resources.

SUMMARY

In an aspect, embodiments described herein provide a processor having an instruction memory for storing instructions at corresponding instruction memory addresses, each instruction being a data structure that references operands and opcode. The processor has an instruction memory controller for controlling access to the instruction memory. The processor has an evaluation unit for triggering the instruction memory controller to receive instruction data from the instruction memory, evaluating operand and execution dependencies for the operands and the opcode of the instruction data. The processor determines source register identifiers for source data for the operands of the instruction data and destination register identifiers for instruction results generated by execution of the instruction data, and evaluating resource requirements for the execution of the instruction data. The evaluation unit may hold instruction data when the resource requirements are unavailable. The processor has an execution unit for dispatching the instruction data to computational resources for execution when the source data for the operands is ready or available and the resources specified by the resource requirements are ready or available. The processor has a termination unit for terminating the execution of the instruction when speculation is resolved and triggering transfer of the instruction results from temporary registers to the destination register. The processor has registers and a data memory for loading the source data required for the operands to execute the instruction data and receiving the instruction results generated by the execution of the instruction data. The processor has a data memory controller for controlling access to the data memory for the source data and reading from and writing to the data memory based on the opcode of the instruction data and the instruction results.

In accordance with some embodiments, the processor resolves the input operand dependencies and the execution unit dependencies without requiring the placement of NOPs in the instruction memory.

In accordance with some embodiments, the processor has a program counter unit for generating read requests with at least one instruction memory address for instruction data stored in the instruction memory at the at least one instruction memory address, the program counter providing the read request to the evaluation unit to receive the instruction data.

In accordance with some embodiments, the processor has an instruction FIFO for storing the instruction data received from the instruction memory in response to the read requests, the instruction data being held by the evaluation unit for dispatch.

In accordance with some embodiments, the processor has the instruction FIFO that receives the instruction data as multiple instructions at a time and validates the instruction data.

In accordance with some embodiments, the evaluation unit has a distribution unit for indicating that it is ready to accept the instruction data for evaluating the operand and execution dependencies for the operands and the opcode of the instruction data, and assigning instruction tags to provide reference identifiers for the instruction data.

In accordance with some embodiments, the distribution unit is configured to divide the instruction data into bundles or packs for parallel execution of the bundles or packs.

In accordance with some embodiments, the distribution unit may hold the instruction data by not releasing the instruction data from an instruction FIFO.

In accordance with some embodiments, the distribution unit decodes the instruction data to detect invalid instruction data and triggers an exception for the instruction data.

In accordance with some embodiments, the distribution unit decodes the instruction data to generate an instruction profile for required resources for the operands and the opcode of the instruction data, the required resources being part of the source input operand dependencies and the execution dependencies for the operands and the opcode of the instruction data.

In accordance with some embodiments, the distribution unit identifies instruction type and computational resource type for the instruction data as part of the evaluation of the source input operand dependencies and the execution dependencies for the operands and the opcode of the instruction data.

In accordance with some embodiments, the evaluation unit has a scoreboard unit for tracking resource and operand availability for the opcode of the instruction data, comparing the resource and operand availability to the input operand dependencies and the execution dependencies of the resource requirements for the execution of the instruction data to generate a resource available signal, and tracking information about current in-flight instructions using the instruction tags.

In accordance with some embodiments, the scoreboard unit is configured for tracking status of the instruction data using the instruction tags, holding the instruction tags pending completion of the instruction data, and upon detecting completion of the instruction data, releasing the instruction tags.

In accordance with some embodiments, the distribution unit provides identifiers to the scoreboard unit for the operands as part of the evaluation of the source input operand dependencies and the execution dependencies for the operands and the opcode of the instruction data.

In accordance with some embodiments, the execution unit comprises a dispatcher for dispatching, based on the resource available signal from the scoreboard unit, the instruction data as an entry of at least one queue for the computational resources to execute the operands and opcode of the instruction data to generate instruction results, the queue advancing to a next entry (if available) when the instruction data is dispatched from the queue to the computational resources.

In accordance with some embodiments, the dispatcher is configured for speculative execution of the instruction data so that the instruction results may be computed and available before full resolution.

In accordance with some embodiments, an individual instruction is associated with a corresponding instruction tag, the instruction tag being used for tracking status of the individual instruction throughout the lifecycle of the individual instruction and maintaining an order of the individual instruction relative to other instructions of the instruction data.

In accordance with some embodiments, the registers further comprise a plurality of temporary registers and committed registers, and a commit controller configured to trigger termination or completion of execution of the instruction by transferring data relating to the instruction result from the temporary registers to the committed registers, and providing a status notification to the evaluation unit to retire the instruction tags.

In accordance with some embodiments, the scoreboard unit tracks information about current in-flight instructions using the instruction tags and an in-flight table, the instruction tags corresponding to indices of the in-flight table.

In accordance with some embodiments, the data memory comprises a local data memory and shared data memory, the processor connecting to the shared data memory through an access port.

In accordance with some embodiments, the evaluation unit is for holding the instruction data having an execution dependency or an unavailable resource requirement.

In another aspect, embodiments provide a processor with an instruction memory controller for controlling access to an instruction memory for storing instructions at corresponding instruction memory addresses, each instruction being a data structure that references operands and opcode.

In another aspect, embodiments provide an evaluation unit for triggering the instruction memory controller to receive instruction data from the instruction memory, evaluating operand and execution dependencies for the operands and the opcode of the instruction data, determining source register identifiers for source data for the operands of the instruction data and destination register identifiers for instruction results generated by execution of the instruction data, and evaluating resource requirements for the execution of the instruction data.

In another aspect, embodiments provide an execution unit for dispatching the instruction data to computational resources for execution when the source data for the operands is ready or available and all resources specified by the resource requirements are ready or available.

In another aspect, embodiments provide a termination unit for terminating the execution of the instruction data when speculation is resolved and triggering transfer of the instruction results from temporary registers to the destination register.

In another aspect, embodiments provide a data memory for loading the source data required for the operands to execute the instruction data and receiving the instruction results generated by the execution of the instruction data, the data memory comprising a local data memory and shared data memory, the processor connecting to the shared data memory through an access port.

In another aspect, embodiments provide the evaluation unit for holding the instruction data having an execution dependency or an unavailable resource requirement.

In another aspect, embodiments described herein provide a method for a processor involving the steps of generating at least one instruction memory address for read requests for instruction data stored in an instruction memory at at least one instruction memory address, the instruction data being a data structure that references operands and opcode; storing the instruction data received from the instruction memory in response to the read requests, the instruction data being held for dispatch; decoding the operands and the opcode of the instruction data to evaluate source input operand dependencies and execution dependencies for the operands and the opcode of the instruction data; assigning instruction tags to provide reference identifiers for the instruction data; tracking resource and data availability for the opcode of the instruction data, comparing the resource and data availability to the input operand dependencies and the execution dependencies to generate a resource available signal; tracking information about current in-flight instructions using the instruction tags; in response to the resource available signal, entering the instruction data as an entry of at least one queue for computational resources to execute the instruction data to generate instruction results, the queue advancing to a next entry (if available) when the instruction data is dispatched from the queue to the computational resources; and reading from and writing to a data memory based on the opcode of the instruction data and the instruction results.

In some embodiments, the method may involve identifying source register identifiers for input operands and destination register identifiers for the instruction results.

In some embodiments, the method may involve identifying different types of operations of the opcode to identify required resources for executing the instruction data as part of the input operand dependencies and the execution dependencies, the different types of operations including integer, vector, branch, jump, system, load or store operations.

In another aspect, embodiments described herein provide a processor comprising: an evaluation unit for reception of instruction data, determining execution dependencies of the instruction data, determining resource requirements for the execution of the instruction data, holding the instruction data having an execution dependency or unavailable resource requirement, and releasing the instruction data when no said execution dependency or unavailable resource requirement remain. The processor may have an execution unit for dispatching the instruction data to computational resources for execution upon the releasing the instruction data.

The processor may have a termination unit for terminating the execution of the instruction when speculation is resolved and triggering transfer of the instruction results from temporary registers to the destination register.

DESCRIPTION OF THE FIGURES

In the figures,

FIGS. 10 and 11 are views of an register file index according to some embodiments;

FIG. 21 is a view of an example table of resources for instruction types according to some embodiments;

FIG. 23 is a view of an example table of integer register allocation according to some embodiments;

FIG. 24 is a view of an example table of integer resources according to some embodiments;

FIG. 27 is a view of an example table of integer register ports according to some embodiments;

FIG. 28 is a view of an example table of integer register ports according to some embodiments;

FIG. 29 is a view of another example table of integer register ports according to some embodiments;

FIG. 30 is a view of another example table of observable signals according to some embodiments.

DETAILED DESCRIPTION

Figure 1:
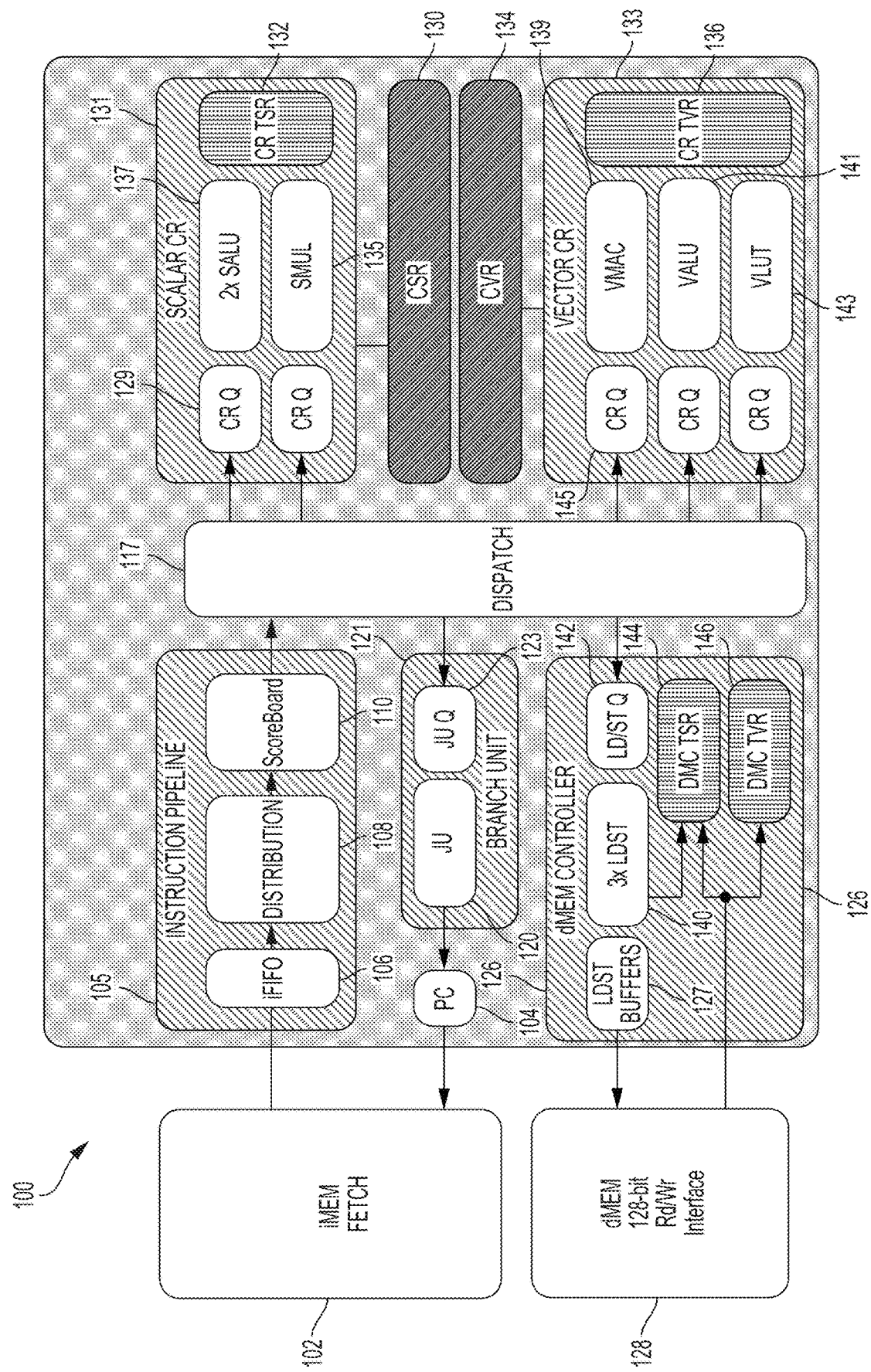
FIG. 1 is a view of an example processor according to some embodiments.

Embodiments described herein relate to a processor architecture that may resolve or avoid hazards or instruction dependencies in the execution pipeline. Embodiments may remove the requirement for inserting NOPs into the instruction memory to address hazards, for example. The processor architecture is aware of and tracks dependencies required by a sequence of instructions. The processor architecture holds or queues instructions that require the output of a previous instruction until that instruction completes. This may resolve or avoid hazards or instruction dependencies in the execution pipeline. This may remove the need for NOPs in the instruction memory and may provide an advantage of code density since the NOPs may be eliminated from the instruction memory. For example, removal of NOPs from instruction memory increases the number of useful instruction in a memory of a given size. This may allow for the reduction of memory size for a given program. The processor architecture may allow either smaller, less expensive memory to be used or larger programs to be stored which may provide cost savings and increase memory resource efficiency. This may also simplify the compiler development since there is no longer a requirement for the compiler to be aware of instruction hazards in the execution pipeline. The processor architecture may also provide performance benefits. The processor architecture may also provide parallel processing for bundles or parts of instructions and provide for speculative execution. Further, by holding instructions the system may potentially reduce the number of gate or net transitions in the design, which may lower power consumption.

Traditional processors may be implemented in a multi-stage pipeline. Each instruction executes in 1 to N cycles, depending on the complexity of the instruction. For example, mathematical operations such as multiplications may take multiple cycles. If a new instruction uses the output of a previous instruction as an input then the new instruction must wait for the previous instruction to complete. This may be referred to as a "pipeline hazard". Pipeline hazards may be resolved using various techniques. For example, pipeline hazards may be resolved by a compiler by inserting NOP instructions to allow the hazard to be resolved. Embodiments described herein provide a processor architecture that does not dispatch instructions into the execution pipeline until all inputs are ready which may resolve pipeline hazards. By holding instructions the processor architecture is able to remove NOPs from the instruction memory, for example. Further, implementations of the processor architecture allow for parallel execution pipelines combined with speculative execution to improve the overall performance when instructions are held waiting for inputs from other instructions.

The following example terminology may be used to describe various processor architectures.

An instruction bundle (which may be referred to as a quad-pack) may refer to a group of scalar and/or vector instructions (e.g. 4×32-bit instructions) received from the instruction memory, queued in the instruction FIFO, and decoded by a distribution unit.

An instruction tag (which may be referred to as a Scoreboard or SB index) may be a unique tag assigned to each instruction. Instruction tags may be assigned in-order as the instructions leave the distribution unit. When comparing two instruction tags, the instruction with the smallest instruction tag is the oldest instruction, and may be committed before newer instructions (with larger instruction tags).

An input operand may refer to source data or source value, including, for example, a 32-bit or 128-bit value used as an input by an instruction.

A source register may be one of the N scalar registers or M vector registers available in the Commit Scalar Registers (CSReg) and Commit Vector Registers (CVReg) (which may be collectively be referred to as CReg) containing the operand value used as an input to an instruction.

An instruction result may be a resulting value of a Scalar Arithmetic Logic Unit (sALU) or Vector Computational Resource (vCR) computation. For example, the instruction result may be a 32-bit or 128-bit value. A sALU processes a scalar instruction. A vCR may refer to a Vector Multiply Accumulate unit (vMAC), Vector Arithmetic Logic unit (vALU), Vector Lookup table unit (vLUT), and so on.

A destination register may be one of the Y scalar registers or Z vector registers in the CRegs used by an instruction to store its result. Jump and store (ST) instructions do not update destination registers.

An in-flight instruction may refer to an instruction when it leaves an evaluation unit or component thereof such as the distribution unit (e.g. distribution unit 208 of FIG. 2), until its instruction tag is released by the evaluation unit or component thereof such as the scoreboard unit.

An instruction dependency may refer to an instruction with a dependency on an in-flight instruction that uses the result of that instruction as one of its input operands. The instruction execution starts when all of its dependent input operand values are available.

A distributed instruction may refer to instructions that leave an evaluation unit.

A dispatched instruction may refer to scalar instructions that are dispatched to a sALU slice immediately after being distributed. Vector instructions may be dispatched when they are in the vCR queue and transferred to a vCR.

A launched instruction may refer to an instruction when all its input operands are received by the vCR or sALU and the execution can start. Until being launched, an instruction, sitting at the input stage of a vCR or sALU, may still be considered dispatched.

A committed instruction may refer to an instruction with its results written into the committed scalar or vector registers. A committed instruction result may be performed in-order. A ST instruction is committed when the write access is sent to the dMEM. A jump instruction is committed when its result is confirmed.

A completed instruction may refer to an instruction with no more action to be done related to the instruction itself. A ST instruction is completed when the write access is sent to the dMEM. A jump instruction is completed when its condition is evaluated. Instruction pipeline flush and program counter resynchronization may be a consequence to a completed and incorrectly predicted branch. Other instructions may be completed when the instruction result is written into the CSVR.

A flushing instruction may refer to a branch instruction that was incorrectly predicted, resulting in an instruction pipeline flush.

A speculative instruction may refer to any instructions distributed after a branch (or jump) instruction that has not yet been resolved. A speculative instruction may be purged due to certain conditions in the program (e.g. flush caused by an unpredicted jump).

An exception instruction may refer to any instruction that generates an exception. Multiple exception sources exist, including, for example, illegal instruction opcode, out-of-range dMEM load instruction (LD) or ST address, memory error-correcting code (ECC) error, and so on.

Post-exception actions depend on the severity of the exception. Example actions may be activating an interrupt, capturing the trace data, jumping to the exception handler routine, and so on.

A computational resource (CR) queue may refer to instructions leaving the evaluation unit or a component thereof such as the distribution unit that are queued before being dispatched.

A scalar ALU (sALU) slice may refer to a group of 4 sALU units, capable of processing 4 scalar instructions in parallel, for example. Each sALU slice shares a scalar multiplication unit.

Other example terminology and components may be described herein to refer to various processor architectures and components thereof.

Example Processor

FIG. 1 shows an example processor 100 architecture for a digital signal processor (DSP), central processing unit (CPU), and so on. The processor 100 has a number of hardware components that implement an evaluation unit, an execution unit and a termination unit. For example, processor 100 may include iMEM 102, a program counter 104, and an instruction pipeline 105 with an instruction FIFO 106, a distribution unit 208, and a scoreboard unit 210, a dispatcher 117, branch unit 121 with a jump unit 120, a data memory controller 126, and a dMEM 128. The processor 100 also has scalar commit registers 130, scalar computational resources 131, vector commit registers 134, and vector computational resources 133 (with vector temporary registers 136). As part of an evaluation unit, the distribution unit 108 may implement an instruction evaluation stage along with the scoreboard unit 110, as it may evaluate instructions to identify bottle necks and dependencies. The distribution unit 108 may hold instructions by not releasing instructions from the instruction FIFO 106, for example.

The iMEM 102 stores instructions at corresponding instruction memory addresses. The program counter 104 generates at least one instruction memory address for read requests for instruction data stored in the iMEM 102 at the at least one instruction memory address. The instruction data is a data structure that references operands (data) and opcode. The opcode may be the portion of the instruction that specifies the operation to be performed. Instructions also specify the data the opcode will process in the form of operands. Specifications and format of the opcodes are laid out in the instruction set architecture (ISA) of the processor 100, which may be a DSP, CPU or other specialized processing unit. An instruction also has one or more specifiers for operands (i.e. data) on which the operation should act. Some operations may have implicit operands, or none at all. The operands may be register values, values in the stack, other memory values, I/O ports, and so on, specified and accessed using addresses, tags or other identifiers. The types of operations include arithmetics, data copying, logical operations, and program control, special instructions, and so on.

The iFIFO 106 stores the instruction data received from the instruction memory in response to the read requests, where the instruction data is held for dispatch.

An evaluation unit of the processor 100 may evaluate instructions, including execution dependencies (e.g. a requirement for pending instruction results) for operand and opcode of the instruction data and evaluate resource requirements for the execution of the instruction data. An evaluation unit may include a distribution unit 108. The distribution unit 108 is configured to indicate to the iFIFO 106 that it is ready to accept the instruction data to evaluate source input operand dependencies and execution dependencies for the operands and opcode of the instruction data. The distribution unit 108 assigns instruction tags to provide reference identifiers for the instruction data. Instruction data may refer to all instructions (e.g. one or more instructions) received from the iMEM 102. Instruction data may be received continuously from the iMEM 102 such that the contents of instruction data may continuously change or update as new instructions are received or fetched. The evaluation unit is for reception of instruction data, determining execution dependencies of the instruction data, and determining resource requirements for the execution of the instruction data. The evaluation unit is further for holding the instruction data having an execution dependency or unavailable resource requirement and releasing the instruction data when no said execution dependency or unavailable resource requirement remains. The resource requirement for the execution of the instruction data may be available or unavailable. The evaluation unit may hold instruction data for a resource requirement that is unavailable. The evaluation unit may not hold instruction data that has a resource requirement that is available.

The scoreboard unit 110 is configured to track resource and data availability for the opcode of the instruction data. The scoreboard unit 110 is configured to compare the resource and data availability to the input operand dependencies and the execution dependencies to trigger dispatch using resource available signals. The scoreboard unit 110 is configured to track information about current in-flight instructions using the instruction tags. The evaluation unit may also include the scoreboard unit 110.

The processor 100 includes an execution unit dispatches instruction data to computational resources for execution when the source data for the operands is ready and all resources specified by resource requirements are ready. The execution unit is for dispatching the instruction data to computational resources for execution upon the releasing the instruction data. An execution unit may include a dispatcher 117. The dispatcher 117 dispatches, based on a resource available signal from the scoreboard unit 110, the instruction data as an entry of at least one queue (scalar CR Q 129, vector CR Q 145) for computational resources (Scalar CR 131, Vector CR 133) to execute the instruction data to generate instruction results. The queue (Scalar CR Q 129, Vector CR Q 145) advances to a next entry (if available) when the instruction data is dispatched from the queue to the CRs (Scalar CR 131, Vector CR 133). The Scalar CR 131 interacts with a Scalar Commit Register 130 and the Vector CR 133 interacts with the Vector Commit Register 134 to read and write data relating to instruction execution. CSReg 130 and CVReg 134 refer to commit registers, as instructions may need data from a commit register file in addition to the temporary registers.

The processor 100 includes a termination unit for terminating the execution of the instruction data when speculation is resolved and triggering transfer of instruction results from temporary registers to a destination register. The termination stage involves writing data to the commit registers, as will be described herein. Scalar CR queue 129 and vector CR queue 145 may be used to queue instructions at the front of the actual execution units (e.g. opcode, inflight instructions, pointers to inputs). An instruction will be queued and when it is at the head of queue just prior to dispatch. When all required inputs are in either the commit registers or the temporary registers then the instruction is pushed into the execution stage.

A dMEM controller (DMC) 126 is configured for reading and writing from and to the dMEM 128 based on the opcode of the instruction data. The dMEM controller 126 may include a DMC TSR 144 and a DMC TVR 146 as decentralized temporary register blocks for data from the dMEM 128. Once the data is in the temporary register there is a process to write data to the commit register. This may only for data from dMEM 128 as opposed to the CR temporary register which may include data resulting from another instruction (e.g. result of a multiplication). In some cases the DMC TSR 144 may also be loaded into the CVR 134 depending on timing. The dMEM 128 may include local dMEM and shared dMEM accessible to the processor 100 via an access port.

The LDST queue 142 may queue a store or load instruction that comes from dispatch 117. The LDST 140 may compute address calculations to pull from memory (dMEM 128). The LDST buffer 127 may buffer store or load instructions. Execution of the instructions is distributed and the termination stage (from temporary registers) may triggered by transitioning data from temporary registers to commit registers (while considering exceptions).

The instruction pipeline 105 may implement functionality of the evaluation stage of instructions (e.g. functionality of the evaluation unit). The branch unit 121 may run in parallel to the evaluation stage as a branch instruction may be a type of instruction that influences the PC 104 value.

Figure 2:
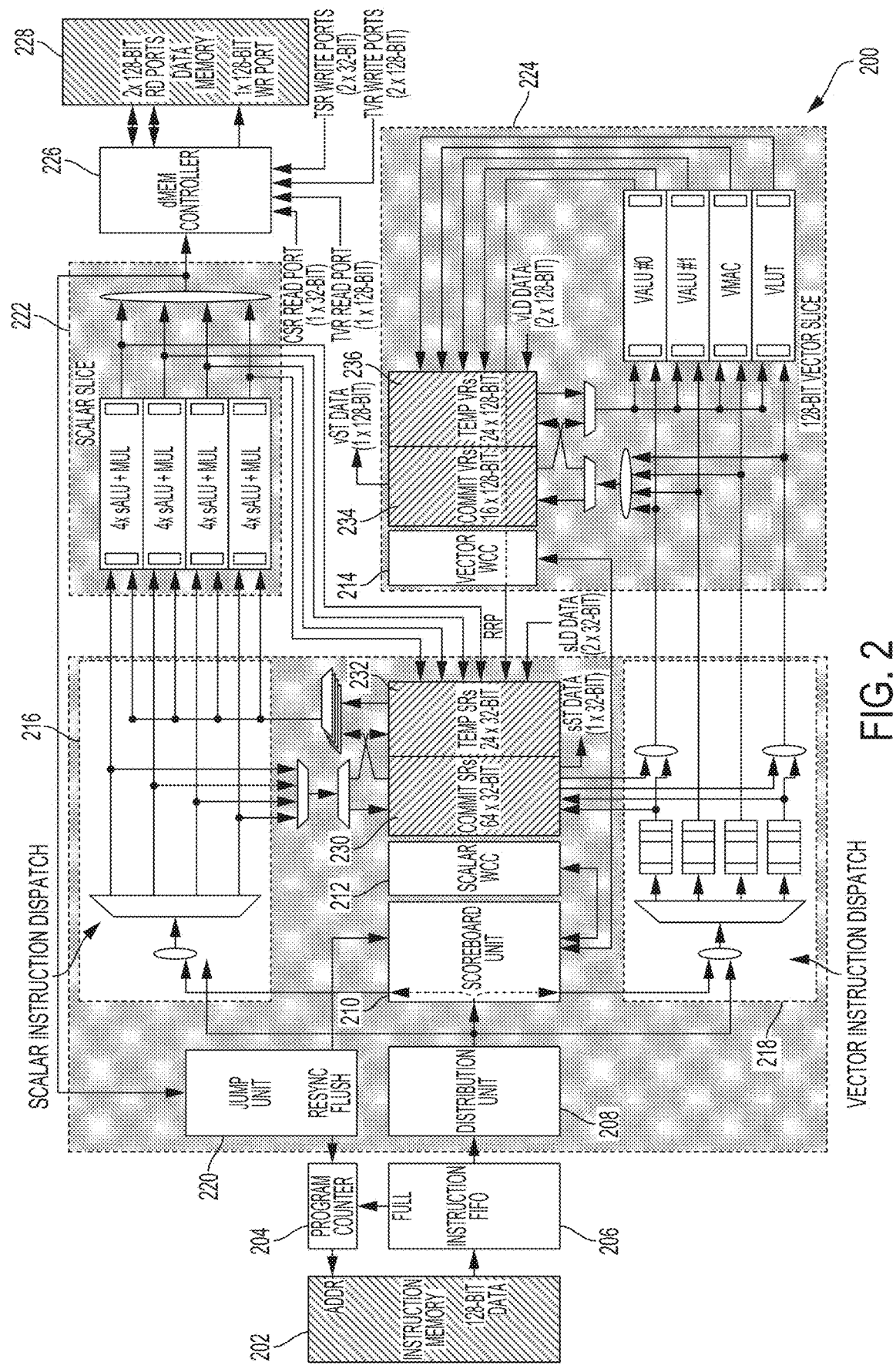
FIG. 2 is a view of another example processor according to some embodiments.

FIG. 2 shows another example processor 200 architecture for a DSP, CPU, and so on. Processor 200 has a number of hardware components that implement an evaluation unit, an execution unit and a termination unit. For example, the processor 200 has a iMEM 202, a program counter 204, an instruction FIFO 206, a distribution unit 208, controller components including a scoreboard unit 210 and a write commit controller (scalar WCC 212, vector WCC 214), a scalar instruction dispatch 216, a vector instruction dispatch 218, a jump or branch unit 220, a scalar slice unit 222, a vector slice unit 224, a data memory controller 226, and a data memory (dMEM) 228. The distribution unit 208 may be referred to as an instruction evaluator, as it may evaluate instructions to identify bottle necks and dependencies. The distribution unit 208 may hold instructions by not releasing instructions from the instruction FIFO 206, for example. The processor 200 may be similar to processor 100, and other example processors described herein (see for example FIGS. 7, 8, 17 and 18). According to some embodiments similar processor components are shown in both FIGS. 1 and 2. The following illustrative example description refers to FIG. 2 but may also apply to components of FIG. 1, and other components of other example processors described herein. The figures may contain references to example bit width as illustrative example implementations. These are illustrative and other variations and modifications may be used in different embodiments.

Program Counter and Instruction Memory

As shown in FIG. 2, the program counter 204 fetches or receives instruction data from the instruction memory (iMEM) 202. The instruction data is a data structure that holds instructions. As an illustrative example, the instruction data may be 128-bit instruction data as a bundle of four instructions or a quad pack of instructions. Instruction data may refer to all instructions fetched from the iMEM 202, for example and not only one quad pack or 128-bit instruction data.

The program counter 204 is responsible for keeping the Instruction FIFO 206 as full of instruction data as possible in order not to starve the scalar and vector CR. The current FIFO level is adjusted to account for the number of pending read requests sent to the iMEM 202 that will consume FIFO space when the instruction data is eventually received. The Program Counter 204 stops requesting new data from the iMEM 202 when the adjusted FIFO level is full (to avoid overflow), and resumes when new instruction data can be accepted by the Instruction FIFO 206.

The iMEM address associated with each instruction is also sent to the Scoreboard unit 210. The address is used to recover from exception or incorrectly predicted branch instruction. When an instruction pipeline flush occurs, a new iMEM address will be received by the Program Counter 204. Program Counter 204 will use this value to retrieve new instructions from the iMEM 202.

Instruction FIFO

The instruction data received from the iMEM 202 is stored in the instruction FIFO 206. As soon as the instruction FIFO 206 is not empty, and the next stage, the distribution unit 208, is ready to accept a new instruction bundle, the FIFO head entry is extracted and pushed to the distribution unit 208.

As an illustrative example, the instruction FIFO 206 size may be 8 by 128-bit entries. Assuming an iMEM read to data latency of three to four nanoseconds and a quad-instruction pipeline running at a minimum target rate of 1 GHz (at least every one nanosecond), the instruction FIFO 206 may absorb the iMEM 202 data resulting of burst memory read requests without stopping the data fetch process too often.

If the FIFO size is too small (assume 4 by 128-bit as an illustrative example), the processor performance may be affected negatively. To avoid FIFO overflow, the program counter 204 may stop every 4 read requests. With a iMEM 202 read access time of three to four nanoseconds, the program counter 204 may stop before the first read data is received from the iMEM 202. Only when the first data is extracted from the instruction FIFO 206 and transferred downstream can the Program Counter 204 resumes its read request process. The instruction FIFO 206 may run empty before the new data is received from the iMEM 202. Having a deeper instruction FIFO 206 accounts for the latency to update the FIFO level (and consequently the program counter 204 stop/resume read request), and may facilitate not running out of instructions to send out to the distribution unit 208.

All instructions in the instruction FIFO 206 may be purged when a flush occurs (by the Jump Unit 220, for example). New instructions may be received from the iMEM 202 as retrieved from the new program counter 204 value.

Distribution Unit

When idle, the distribution unit 208 indicates to the instruction FIFO 206 it is ready to accept a new instruction bundle. The distribution unit 208 becomes busy as soon as new data is received from the instruction FIFO 206. The distribution unit 208 clears its busy state and becomes idle when the all instructions in the quad-pack are transferred out to the scalar or vector domains.

There may be a minimum period before the next clock update. For example, a pulse generator at the output stage of the Instruction FIFO 206 may have a minimum period before its next clock update occurs. Similarly, the distribution unit 208 output stage pulse generator may wait for the resource availability status updates from the scoreboard unit 210 before declaring itself ready to accept a new instruction bundle.

As an illustrative example, the 128-bit instruction bundle may be broken down into 4 individual 32-bit instructions. This may be a mix of scalar and/or vector instructions, for example. Within the 128-bit instruction data, instruction slot #0 (bits 31:0) is analyzed first, followed by slots #1, #2 and #3 (bits 63:32, 95:64, 127:96 respectively).

The distribution unit 208 may decode each instruction, and detect invalid instruction format and opcode and trigger an exception.

The distribution unit 208 may identify the instruction type (e.g. scalar, vector) and CR type (sALU, vMAC, vALU, vLUT). The distribution unit 208 may detect invalid instruction mix within the instruction bundles. As an illustrative example, per instruction bundle there may be 1 VMAC, 2 VALU, 1 SMUL, 1 VLUT and so on. For example, more than 1 VMAC or 1 scalar MUL instruction(s) in the same bundle may trigger an exception.

The distribution unit 208 may determine the source input operands for all instructions. Input operands may include an immediate value. Depending on the instruction format, an immediate value could be carried out to the CR using the whole instruction data (e.g. 32-bit). The distribution unit 208 may provide the instruction input source register identifier to the scoreboard unit 210 to detect dependencies between instructions in the bundle.

The distribution unit 208 may request the resource needed to process all 4 instructions based on the instruction opcode. For LD/ST/Jump instructions, the distribution unit 208 may request additional dedicated resources.

The distribution unit 208 may monitor the scoreboard unit 210 resource availability. The scoreboard unit 210 may provide to the distribution unit 208 the resource status.

The distribution unit 208 may transfer instructions to their destinations according to the instruction requirements. For example, scalar instructions may be sent to the scalar dispatch unit 216. Vector instructions may be written to one of the 4 vCR queues.

The distribution unit 208 may preserve the group of scalar instructions by clearing the instruction valid bit in the bundle slots occupied by a vector instruction. For example, sALU within a slice receiving invalid instruction may remain idle.

A pulse generator generates on-demand clock pulse whenever the conditions to transfer the distribution unit 208 instruction data downstream. Until all conditions are met, the data is held at the distribution unit 208, and the instruction pipeline is stalled.

When leaving the distribution unit 208, a unique tag (e.g. an instruction tag, 7 bit) follows each instruction through its life cycle and relate to the size of inflight table. The tag, provided by the scoreboard unit 210, represents the 64 entries of the in-flight table in the scoreboard unit 210. The tag is reclaimed when the instruction is completed or purged due to a flush.

Instructions are transferred to either the scalar or vector domain only when the required resources are available. The required resources depend on the instruction profile currently decoded at the distribution unit 208. Example conditions to send instructions out are: (i) at least a number (e.g. 4) of available tags in the In-flight instruction table (IFT); (ii) sufficient LD/ST/Jump buffer entries available (for LD/ST/Jump instructions) for the current quad-pack; (iii) sufficient scalar or vector temporary registers available for the current quad-pack; (iv) at least 1 sALU slice available (for scalar instructions, and vLD/vST instructions); (v) sufficient entries available in the vCR queues (for each type of vector instructions). These are example conditions only for this illustrative embodiment.

Scalar Instruction Dispatch

A scalar instruction is provided by the distribution unit 208 to the scalar instruction dispatch 216. A scalar instruction is in the scalar instruction dispatch stage when the instruction leaves the distribution unit 208. Scalar instructions entering this stage are routed to the first available sALU slice of the scalar slice unit 222. Since the scoreboard unit 210 IFT is updated when instructions are distributed, the scalar instruction dispatch 216 registers the scalar instructions and then forwards the data to one of the sALU slices. Should the current dispatch slice be busy while another slice is available, the scalar instruction dispatch 216 may skip over the current slice and access the next available one.

When the distribution unit 208 sends the scalar instructions to the sALU slice, it also pushes the tags of the scalar instructions into the scoreboard unit 210. The scoreboard unit 210 uses the instruction tags to locate the input operands and send read requests out to the register units (e.g. commit scalar registers 230, temporary scalar registers 232, commit vector registers 234, temporary vector registers 236). Temporary scalar registers 232 and temporary vector registers 236 are accessed when input operands depend on in-flight instruction. Otherwise, the Commit Scalar Registers 230 is read. When accessing the commit SVR, the read data is already available and may be returned immediately to the sALU Slice. When reading from the temporary scalar registers 232 and temporary vector registers 236, the request may be pending until the target data becomes available. The data read from the registers are directed to the sALU slices.

In parallel, 4 instruction opcodes, tags and valid signals may be routed from the distribution unit 208 to the selected sALU Slice of Scalar slicer 222. The input operand values will be received directly from the registers. Note the opcode and tag may be ignored when the valid bit is not set.

Scalar ALU Slice

For this illustrative example, a total of 4 sALU slices may be available. Each sALU slice may process instructions independently. If at least one scalar instruction is decoded within an instruction bundle by the distribution unit, a full sALU slice may be consumed. In the distribution unit 208, slots carrying a vector instruction may be marked as invalid and ignored by their sALU.

A sALU is non-pipelined CR. Instruction execution starts when all input operands are received for a given instruction sitting at the input of a sALU. The sALU execution time may be variable, static or fixed based on the instruction type. Once the computation is completed, the result (and the associated tag) may be registered and forwarded to the temporary scalar registers 232 (TSR). This result may be 32 bit for the illustrative example.

Slices may provide a ready status to the distribution unit 208. A slice is busy (not ready) when at least one sALU is processing an instruction. It becomes ready when all sALU have transferred their instruction result out to the temporary scalar registers 232 and temporary vector registers 236, dMEM controller 226 or jump unit 220. If none of the slices are ready, the instruction pipeline is stalled at the distribution unit 208. The instruction flow may resume as soon as a slice becomes available.

Vector Instruction Dispatch Unit

The Vector Instruction Dispatch 218 may include a Vector CR Queue. Three example types of vCR queues are: VALU, VMAC and VLUT. When leaving the distribution unit 208, vector instruction opcode and tag may be buffered to one of the three queues. As an illustrative example, the VALU queue may accept up to two instructions per quad-pack, such as for the VMAC and VLUT. The depth may be, for example, 8 entries for VALU, VMAC and VLUT queues.

The queue depth is a function of the number of available temporary vector registers (e.g. 24) and the maximum number of in-flight instructions before stalling the instruction pipeline. Each queue ensures that instructions of the same type are processed in-order. If the head queue entry cannot be dispatched to its vector CR (or CR pair for VALU), the following instructions in that same queue are stalled. Eventually, if the queue fills up, the whole instruction pipeline stalls. As soon as the CR becomes ready, the queue's head entry is dispatched.

The vector instruction dispatch 218 may include an instruction dispatcher. The vector instruction dispatcher may be divided in three independent processes, each handling a vCR queue and associated CR(s) of the same type. For VALU, a single entry is read while the dispatch alternate between the CR instances.

Each process monitors the vCR queue instruction available status and the vCR destination ready status. When both conditions are met, it reads an instruction opcode and tag out of the queue and transfers it to the selected vCR. It also forwards the tag to the SBM to generate the register read requests.

For the VALU queue, a single read process manages the two CRs. The longest timing path when dispatching instructions is the scoreboard unit 210 lookup using the instruction tag and the register read request generation for input operands. Therefore, the scoreboard unit 210 and registers provide two sets of ports to read the VALU input operands. Alternating between CR of the same type may yield the same overall performance if the read process is twice as fast as the above longest timing path, for example.

This example implementation may be equivalent to two read processes (one per CR, up to 2 queue reads per cycle) running at the rate equivalent to the longest timing path. The maximum VALU dispatch rate may also be bound by the round-trip time for the CR to lower its ready status after receiving a new instruction from the queue.

Read Requests to CSVR

During the dispatch stage, read requests are sent from the scoreboard unit 210 to the commit registers 230, 234 for input operands without data dependencies. Since the source data is available, the value is returned immediately towards the CR processing that instruction.

Read ports to the commit registers are shared between the 4 sALU slices, but may be dedicated to each of the five vector CRs. The read cycle from the commit scalar register (CSReg) 230 is completed as fast as the instruction pipeline rate. Therefore sharing the read ports is possible and reduces the read logic. The read cycle from the commit vector register (CVReg) 234 is also completed faster than the instruction pipeline rate. However, due to the smaller number of vector CRs (compared to the scalar CRs), dedicated read ports are used.

Read Requests to Temporary Registers

In order to resolve instruction dependencies faster, speculative, non-committed data may be made available in the Temporary Registers. The read request for a source operand is sent to the temporary scalar register (TSR) 232 or vector register (TVR) 236. The received read requests will be pending until the data becomes available at the targeted register. Then the request is processed by reading the targeted register and sending its data to the destination CR (vCR or sALU slice).

On any given port, a new read request can be received after a CR moved its pending instruction into the execution phase. Then the dispatch may send a new instruction to the same CR, and generate a new read request on the same register read port. Therefore, backpressure from the register unit to the dispatch stage is not required.

Vector CR

Vector CR are pipelined resources. When a vector instruction is sent to a CR, the CR becomes "busy" and clears its ready status. The instruction waits at the input stage of a CR until all input operands are received from the commit or temporary registers 230, 232, 234, 236. Then, the instruction execution starts, and the CR can accept a new instruction from a vCR queue (after a minimum delay to provide status update from the CR to the Dispatch Stage, for example).

The vector instruction dispatch maximum dispatch rate may be limited by the latency for the CR to clear its ready status and the dispatch stage to receive the updated signal. It may also be limited by the minimum period (or maximum frequency) the CRs can operate at.

CRs operate independently. Execution can start at random time based on input operands availability. Once in execution mode, CR pipeline latencies may be fixed, and instruction progresses within the CR until result is registered at the output stage.

Write Requests to Temporary Registers

The CRs processing an instruction are agnostic of the result destination. When an instruction result is available, the result is pushed to the temporary registers. Write ports to the temporary registers are provided for every CR. The 16 Scalar ALUs and two dMEM scalar LD update their results into the Temporary Scalar Register (TSR) 232, while the two VALUs, 1 VMAC, 1 VLUT CRs and two dMEM vector LD write into the Temporary Vector Register (TVR) 236.

The write port receiving the instruction result and tag retrieves the allocated temporary register ID by looking up the IFT in the scoreboard unit 210 using the tag. The result is written and the data becomes available to all other in-flight instructions with an input operand dependency on that temporary register.

Write Commit Controller (WCC)

Instruction results are processed in-order. Three example mechanisms that may be used to complete an instruction include: an instruction that writes its results in a destination register; a ST instruction that ends when the dMEM write access is performed; and a jump instruction that requires a confirmation for a potential instruction pipeline flush.

The first mechanism above involves the WCC updating the commit register space with data from the temporary register space. The ST and jump instructions are handled outside of the WCC by their respective units (dMEM Controller 226 or jump unit 220 respectively), which provide their instruction status directly to the scoreboard unit 210. The scoreboard unit 210 in turns relays the status to the WCC.

The WCC follows the in-flight instruction status provided by the scoreboard unit 210. The WCC sends up to four temporary register read requests to one of the 4 scalar temporary register 232 and four vector temporary register ports 236 according to the instruction commit sequence. The sequence follows the SB entry assignment (tags), skipping over NOP entries and waiting at Jump and ST completion status. Since the commitment of instruction is performed sequentially, speculative instructions are never committed before all previous branch instructions (or potential exception from older instructions) are resolved.

Although NOPs are not required in accordance with embodiments described herein, instruction code with NOPs may be processed by processors according to in some embodiments. For example, the instruction code may already have NOPs and in some embodiments the NOPs can be removed or the NOPs may also remain and the instruction code may still be handled or used by the system. For example, a migrating compiler may still insert NOPs into the instruction code. According to some embodiments, the processor may still provide improvements for resolving hazards regardless of whether NOPs are in the instruction code. That is, the processor accordingly to some embodiments does not require NOPs to address hazards but they can be present in the instruction code if the removal requires additional processing steps.

The data read request remains pending until the data becomes available at the target temporary register allocated to the instruction the WCC wants to commit. Then it is transferred on one of the four scalar Commit Register 230 write ports and four vector Commit Register 234 write ports. The target commit register corresponds to the instruction destination, and is obtained by looking up the In-Flight Table in the scoreboard unit 210 using the instruction tag. Finally, the WCC triggers a request to the scoreboard unit 210 to release the scoreboard unit 210 entry, before processing the subsequent instructions.

Instruction Flow

Figure 3:
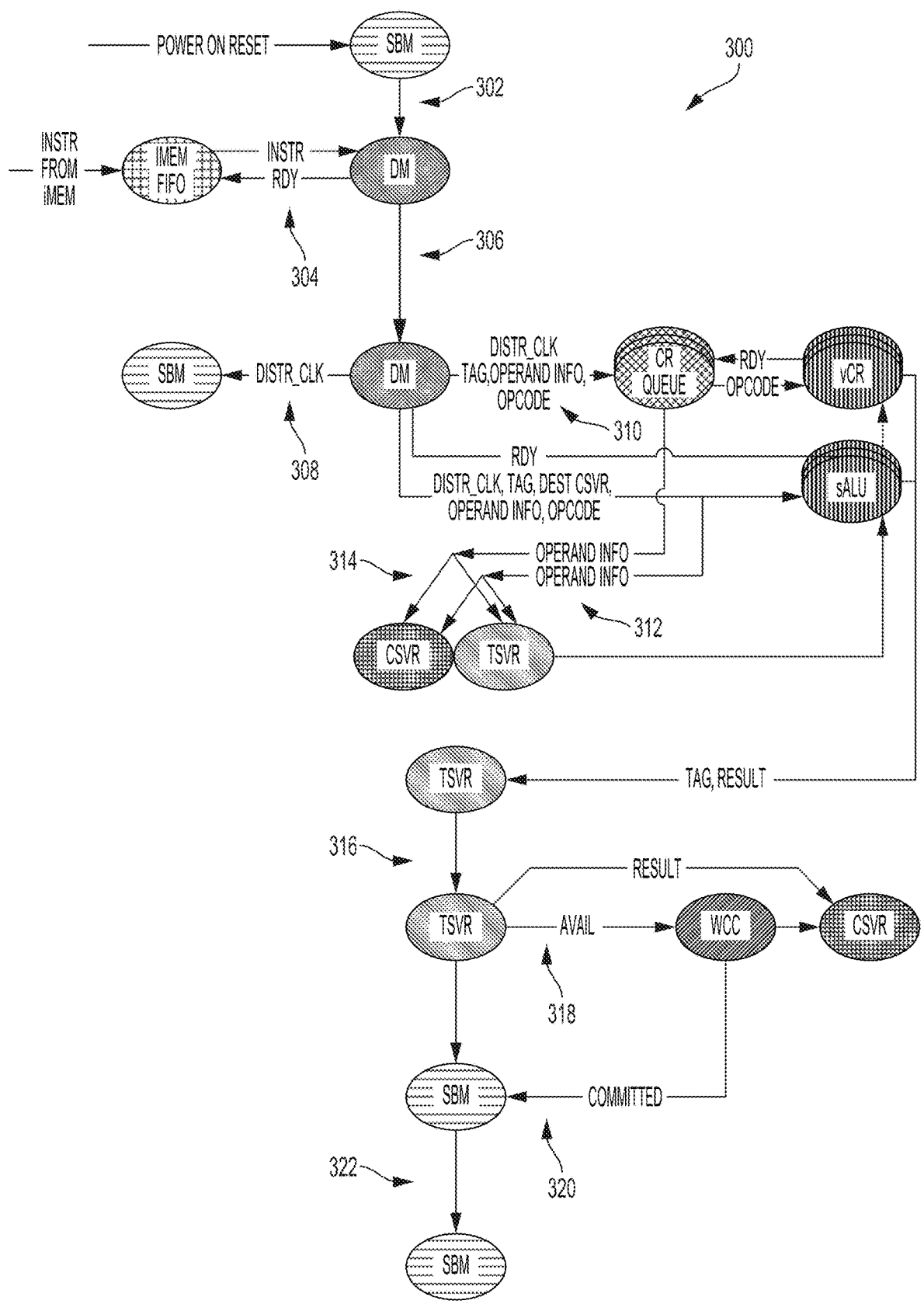
FIG. 3 is a flow chart of an example process according to some embodiments.

FIG. 3 shows a flow chart diagram of a process 300 for an instruction flow cycle for an illustrative example processor architecture. The example process may be described with reference to components of FIG. 2 for illustrative purposes but other example processor architectures according to embodiments described herein may also be used to implement operations of the process 300.

At 302, the scoreboard unit 210 (referenced as SBM) sets all resource availability bits to "available", sets next available instruction tags to 0 to 3, and sets next available scalar and vector temporary registers (TSVR) locations to 0 to 3.

At 304, the distribution unit 208 (referenced as DM) sets its ready (RDY) signal toward the iMEM FIFO 206. When the iMEM FIFO 206 is not empty and the distribution unit 108 is ready, the iMEM FIFO 206 sends an instruction bundle to the distribution unit 108 (or another component of the an evaluation unit).

At 306, the distribution unit 208 decodes the instructions and registers the scoreboard information (e.g. Scalar/Vector Instruction, NOP, LD, ST, JUMP, OPERAND Locations, DEST Location). The distribution unit 208 also sets the resource requirement bits based on the instruction decode (e.g. number and type of crs required, number of tsvrs required). The distribution unit 208 also registers the instruction opcodes from the iMEM FIFO 206, and the instruction tags received from the scoreboard unit 210. The distribution unit 108 clears its ready (RDY) signal. The distribution unit 208 compares the resource requirement for the current instruction bundle with resource availability. When enough resources are available then the distribution unit 108 enables the pulse generator to distribute the instructions. The distribution unit 208 sets the RDY signal again after the minimum period delay.

At 308, with the distribution clock (referenced DISTR_CLK), the scoreboard unit 210 logs scoreboard information (referenced SB_INFO) in the IFT and updates the resource usage data structure (e.g. TSVRs allocated, IFT locations assigned), and sets the corresponding in-flight bits. The scoreboard unit 210 updates the resource availability data structure, next tag, and next TSVR locations for the next bundle. The scoreboard unit 210 updates the TSVR MAP with the last TSVR assigned to the SVR location. The scoreboard unit 210 updates the TSVR CNT Table with the number of instructions to reference the TSVR locations.

At 310, the distribution unit 208 sends the required info to the CR FIFO or sALU.

At 312, the vCR Queue or sALU sends the Operand Info to CSVR or TSVR and the OPCODE to the vCR or sALU.

At 314, the TSVR or CSVR sends the source data to the vCR or sALU. If the source input originates from the CSVR, it is sent right away. The source inputs from TSVR are sent when they become available. The scoreboard unit 210 updates the TSVR CNT Table to account for the instructions that were just dispatched.

At 316, the results from vCR or sALU are written into the TSVR. The TSVR sets the available flag and registers the instruction tag to use evaluate the flush condition.

At 318, the TSVR sets the AVAIL bit towards WCC. The WCC writes the TSVR data to SVR location when all outstanding speculations have been resolved.

At 320, the WCC sets the committed bit.

At 322, the scoreboard unit 210 checks the TSVR CNT table to make sure the TSVR can be released (i.e. there are no instructions in the CR FIFO referencing the TSVR.). The scoreboard unit 210 releases the TSVR location and the IFT entry to make them available for the subsequent instructions. The scoreboard unit 210 sets clears the In-Flight bit if it was the last instructions to target the SVR location.

Control Flow

Figure 4:
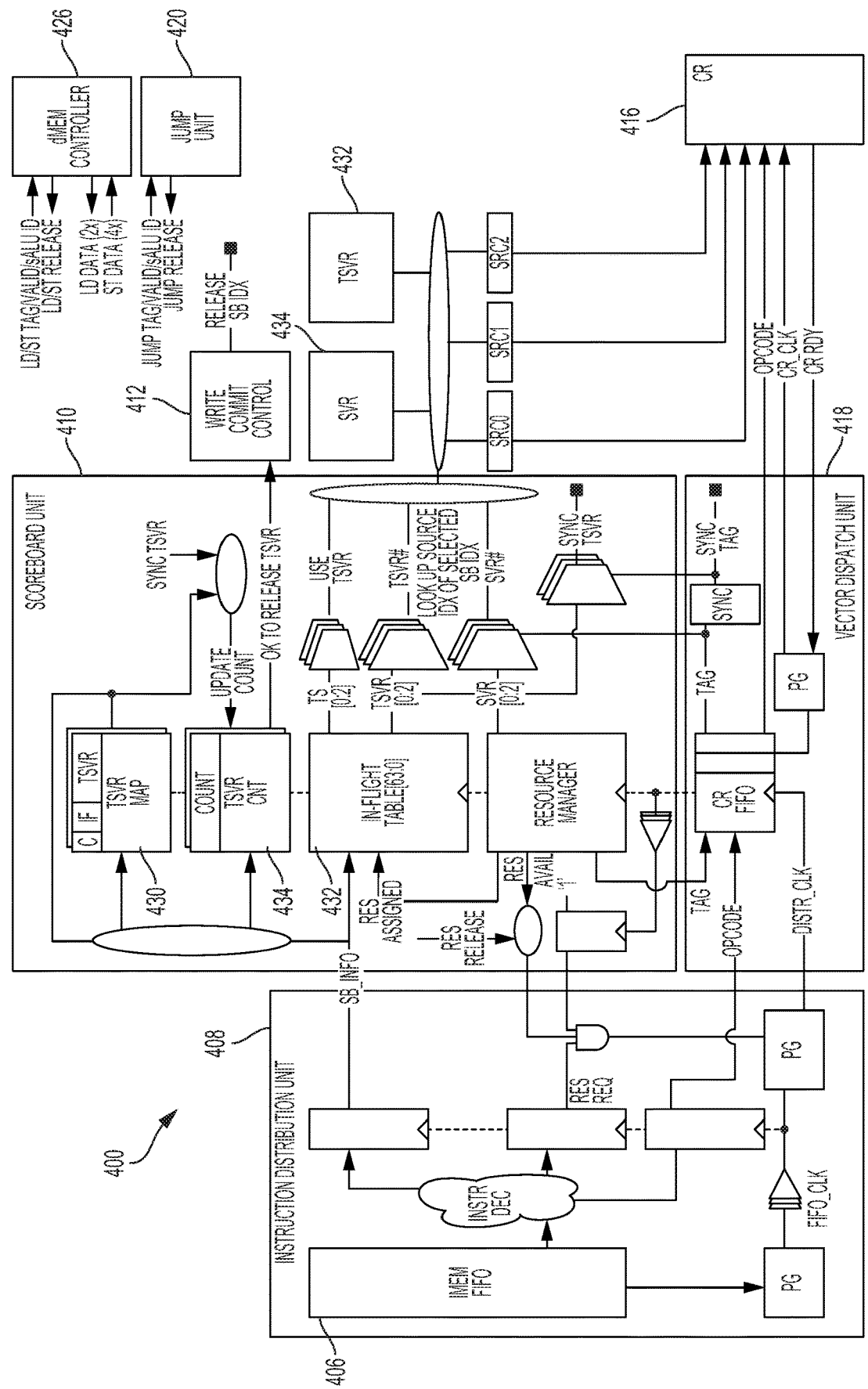
FIG. 4 is a view of an example distribution unit and scoreboard unit according to some embodiments.

A block diagram of an example scoreboard unit 410 is shown in FIG. 4. The scoreboard unity 410 may be part of an evaluation unit, as noted herein. The processor 400 control may be centralized in the scoreboard unit 410 (SBM) which, in conjunction with the WCC 412, controls the data flow throughout the DSP 400.

Scoreboard Unit

A function of the scoreboard unit 410 is to keep track of information about the current instructions in-flight. The scoreboard unit 410 stores the information in multiple tables (in-flight table 432, TSVR map table 430, and TSVR count table 434) and updates them as needed.

The in-flight table 432 stores the general information about the instruction, including, the instruction type (Scalar or Vector), NOP, LD, ST, JUMP, Operands CSVR and TSVR locations, Destination CSVR and TSVR locations, and iMEM Address, for example. An entry in the IFT is marked as in-use when it is assigned to an instruction, and released with the result of the instruction has been committed to the CSVR.

The TSVR map table 430 is used to keep track of the latest TSVR locations assigned to the CSVR registers. It also keeps track of the In-Flight and Committed status of the TSVR locations. This table is used by the scoreboard unit 410 to properly assign the input operand dependencies.

Finally, the TSVR Cnt Table 434 is used by the scoreboard unit 410 to keep track of the number of outstanding instructions in the CR FIFO with dependency on the TSVR locations. This information is used by the scoreboard unit 410 to determine if the TSVR location can be released after the result has been committed.

The scoreboard unit 410 also keeps track of the resource availability. The resource availability information is sent to the distribution unit 408 to indicate whether there are enough available resources for the next set of instructions to be distributed. The resource availability information may include: instruction tag and TSVR 432 location availability; LD, ST, and JUMP buffer availability; CR FIFO entry availability, and so on.

Working in conjunction with the write commit controller 412, the scoreboard unit 410 frees up the Temporary SVR 432 locations and the instruction Tags as the results are committed to the Committed SVR 434. Further, the scoreboard unit 410 updates the LD, ST, JUMP Unit 420 buffer availability and the CR FIFO entry availability as they are processed by their respective processing units.

Example scoreboard unit 410 functions include: providing an interface with the distribution unit 408 to receive the information about the instructions to be distributed; tracking of the information about the instructions "in-flight" in the in-flight table 432; tracking of the TSVR 432 availability and allocates them to instructions as they are distributed; maintains a Destination TSVR Map 430 with the latest TSVR location assigned to a Scalar or Vector destination register; tracking of the number of Load, Store, and Jump Buffer entries available; tracking of the number of vCR queue entries available; sending sALU identifiers and tags for load and store instructions (both scalar and vector) to the dMEM Controller 426, as the sALU identifier is used by the dMEM Controller 426 to capture the dMEM address information from the assigned sALU; sending sALU identifier and Tags for Jump Instructions to the Jump Unit 420, as sALU identifier is used by the Jump Unit 420 to capture the jump information from the assigned sALU; advertising resource availability to the distribution stage for the distribution unit 408 to enable the Pulse Generator when there are enough resources available for the current Quad to be distributed; and receiving the tags from the Scalar and Vector Dispatch units 418 and send read requests to CSVR 434 and TSVR 432 for input source data which will be returned directly from the CSVR 434 or the TSVR 432 to the CR 416.

In-Flight Instruction Table (IFT)

Each instruction is assigned an entry in the in-flight table (IFT) 434. When an instruction leaves the distribution unit 408, the instruction is assigned a tag which corresponds to the index of the IFT entry. At the same time, information about the instruction is recorded in the IFT 434. As multiple instructions may be distributed simultaneously, a corresponding number of sequential IFT 434 entries are assigned an instruction bundle. The details of example IFT entry fields are shown in the following table.

| Fields | # of Bits | Description |
| --- | --- | --- |
| IN_USE | 1 | 1 = SB Entry is in-use<br>0 = SB Entry is free to be allocated |
| INSTR_S1V0 | 1 | 1 = Is a Scalar Instruction<br>0 = Is a Vector Instruction |
| DEST_SV | 1 | When the INSTR_S1V0 field is set to '0' (Vector Instruction), this bit indicates whether the instruction generates a scalar output<br>1 = Vector Instruction generates a scalar and/or vector output<br>0 = Vector Instruction only generates a vector Output<br>For scalar instructions, this bit is ignored. |
| NOP | 1 | 1 = Indicates the instruction is NOP |
| JUMP | 1 | 1 = Indicates the instruction is a JUMP |
| LOAD | 1 | 1 = Indicates the instruction is a LOAD |
| STORE | 1 | 1 = Indicates the instruction is a STORE |
| SPEC_TAG | 7 | Instruction tag of the previous branch instruction relative to the IFT entry |

-continued

| Fields | # of Bits | Description |
|---|---|---|
| IMEM_ADDR | 32 | Address of the instruction in the iMEM |
| DEST SVR | 6 | Committed SVR location where the result generated by the instruction will be stored. This value is the same as the register address in the instruction. |
| DEST TSVR | 5 | Temporary SVR location where the result generated by the instruction will captured before being committed |
| SRC0 REQUIRED | 1 | 1 = Input Source0 is required by the instruction<br>0 = Input Source0 is not used |
| SRC0 SVR | 6 | Committed SVR location where the Input Source0 can be read from |
| SRC1 REQUIRED | 1 | 1 = Input Source1 is required by the instruction<br>0 = Input Source1 is not used |
| SRC1 SVR | 6 | Committed SVR location where the Input Source1 can be read from |
| SRC2 REQUIRED (when DEST_SV = 0) | 1 | This bit has multiple functions depending on the setting of DEST_SV field. When DEST_SV field is set to '0', SRC2_REQUIRED indicates:<br>1 = Input Source2 is required by the instruction<br>0 = Input Source2 is not used |
| SRC2 REQUIRED (when DEST_SV = 1) | 1 | When DEST_SV field is set to '1', SRC2_REQUIRED indicates:<br>1 = Instruction generates a vector output<br>0 = Instruction generates only a scalar output |
| SRC2 SVR | 6 | This field has multiple functions depending on the setting of DEST_SV field. In normal mode, when DEST_SV field is set to '0', SRC2 SVR indicates the Committed SVR location where the Input Source2 can be read from.<br>When the DEST_SV field is set to '1', (meaning the current vector instruction generates both vector and scalar output), this field is used to indicate the CSReg location where the Scalar Output should be written to. |
| TSRC0 USED | 1 | 1 = Get the Input Source0 from the Temporary SVR<br>0 = Get the Input Source0 from the Committed SVR |
| TSRC0 TSVR | 5 | Temporary SVR location where the Input Source0 can be read from |
| TSRC1 USED | 1 | 1 = Get the Input Source1 from the Temporary SVR<br>0 = Get the Input Source1 from the Committed SVR |
| TSRC1 TSVR | 5 | Temporary SVR location where the Input Source1 can be read from |
| TSRC2 USED | 1 | This bit has multiple functions. When DEST_SV bit is set to '0', TSRC2_USED indicates:<br>1 = Get the Input Source2 from the Temporary SVR<br>0 = Get the Input Source2 from the Committed SVR<br>When DEST_SV field is set to '1', TSRC2_USED indicates:<br>1 = Vector instruction generates only a vector output<br>0 = Vector Instruction generates a scalar output |
| TSRC2 TSVR | 5 | Temporary SVR location where Input Source2 can be read |

The scoreboard unit 410 implements resource availability tracking. When an instruction bundle leaves the distribution stage, the scoreboard unit 410 updates the resource availability information for the next quad-pack. The scoreboard unit 410 may keep track resource availability. The following provides illustrative examples of resource availability:
Load Buffer: Maximum 16 entries
Store Buffer: Maximum 8 entries
Jump Buffer: Maximum 4 entries
Scalar TSVR: Maximum 24 entries
Vector TSVR: Maximum 24 entries
in-flight table: Maximum 64 entries
VMAC FIFO: Maximum 8 entries in vMAC vCR queue
VALU FIFO: Maximum 8 entries in vALU vCR queue
VLUT FIFO: Maximum 8 entries in vLUT vCR queue The distribution unit 408 uses the resource availability information to enable the pulse generator to distribute the instruction bundle. Since the enable signal to the pulse generator must be glitch free, the scoreboard unit 410 uses one-hot encoded signals to assert the resource availability status.

For example, the scoreboard unit 410 indicates the load buffer availability by setting the following example signals:

NO_LD_AVAIL
ONE_LD_AVAIL
TWO_LD_AVAIL
THREE_LD_AVAIL
FOUR_LD_AVAIL

As the load buffer entries become available, these signals may transition without glitches. The distribution unit logically ANDs the resource availability signals with the resource required signals and enables the pulse generator when there are sufficient resources available for all instructions in the quad-pack to be sent out.

For this example, instructions are distributed in multiples simultaneously at a time. Therefore, enough resources must be available to handle all instructions before the instruction pack is distributed. An illustrative example is a quad-pack of four instructions.

Source Input Read

After leaving the distribution unit 408, the scalar instructions are immediately dispatched while the vector instructions are sent to the vCR queues of the Vector Dispatch Unit (VDU) 418.

The scalar and vector instruction dispatch unit 418 send the tags to the scoreboard unit 410 to request their operands.

The scoreboard unit 410 uses the tag to lookup the In-Flight Instruction Table to determine whether the Input Source data should come from the Commit SVR or Temporary SVR. It is responsibility of the scoreboard unit 410 to send source input data read requests to the Commit SVR or Temporary SVR. The source input data, when read from the register units is returned to the CR 416 associated to the read request. If the data originates from the Temporary SVR, the data is sent when it becomes available.

TSVR Count Table

Since the input operand dependencies are evaluated and recorded in the IFT 432 at the distribution stage, these dependencies should remain valid until the input operands are read at the dispatch stage. Therefore, a TSVR location with dependent instructions in the CR FIFO cannot be released until all dependent instructions are dispatched.

Before releasing an instruction tag and the allocated temporary register, the scoreboard unit 410 monitors if there are in-flight instructions not yet dispatched which are linked to a Temporary SVR register that has been committed. To ensure that the temporary SVR location is not re-allocated and overwritten before the dependent instruction is dispatched to a vCR, the TSVR Count Table 434 is used to keep track of the number of instructions in the vCR queue which reference the temporary register location.

When instructions are distributed, the TSVR Count Table 434 location where the source data comes from is incremented by 1 each time an instruction uses the temporary register as one of its inputs. When the instruction exits the vCR queue and is dispatched, the TSVR Count Table 434 is decremented by 1. The scoreboard unit 410 uses this table to determine if the temporary Register location can be released and re-assigned. If there is no instruction in the vCR queue which reference a particular temp register location, that temp register location can be released immediately after it has been committed. Otherwise, even if the content is committed the CSVR, the TSVR location is not available until the source TSVR Map 430 count goes to 0.

It is important to note that Source TSVR Map 430 being greater than one does not prevent the Write Commit Controller 412 from writing the result into the Commit SVR 434. It only prevents the scoreboard unit 410 from releasing the TSVR location prematurely before all instructions referencing that location has been dispatch from the vCR queue. Once the result has been committed by WCC 412, a flag will be set to indicate the Temporary SVR 432 has been committed. Any instructions leaving the Distribution unit 408 will reference the Committed SVR 434 location from this point on to ensure timely release of the Temp SVR 432 location. Note, for this example, once the TSVR has been committed, the SB entry associated with the instruction can be released even if the TSVR 432 location cannot be released. This is an example embodiment.

For the scalar dispatch unit, since there is no queue, there may be no danger of re-assigning the TSVR location.

TSVR Map Table

The scoreboard unit 410 is also responsible for keeping track of the "in-flight" and "committed" status of all Scalar and Vector destination registers (CSReg and CVReg). When a TSVR location is allocated to an instruction, the TSVR Map 430 is updated to indicate the in-flight and committed status of the destination register and the last TSVR location assigned to the register. This information is then used to determine the source input locations for the subsequent instructions leaving the distribution unit 408.

Separate TSVR Map tables may be used for the scalar and vector registers. The TSVR Map 430 may contain as many entries as there are committed register locations (64 for scalar and 16 for vector, for example) and is indexed with the instruction destination register.

Example Committed and In-flight flag definitions are shown below:

| Committed Flag | In-Flight Flag | Definition |
|---|---|---|
| 0 | 0 | N/A |
| 0 | 1 | Result not yet available. Use the TSVR location for Source Inputs. |
| 1 | 0 | Result is committed and TSVR location has been released. Use the SVR location for Source Inputs. |
| 1 | 1 | Result is committed but TSVR location has not yet been released. Use the SVR location for Source Inputs. |

Figure 5:
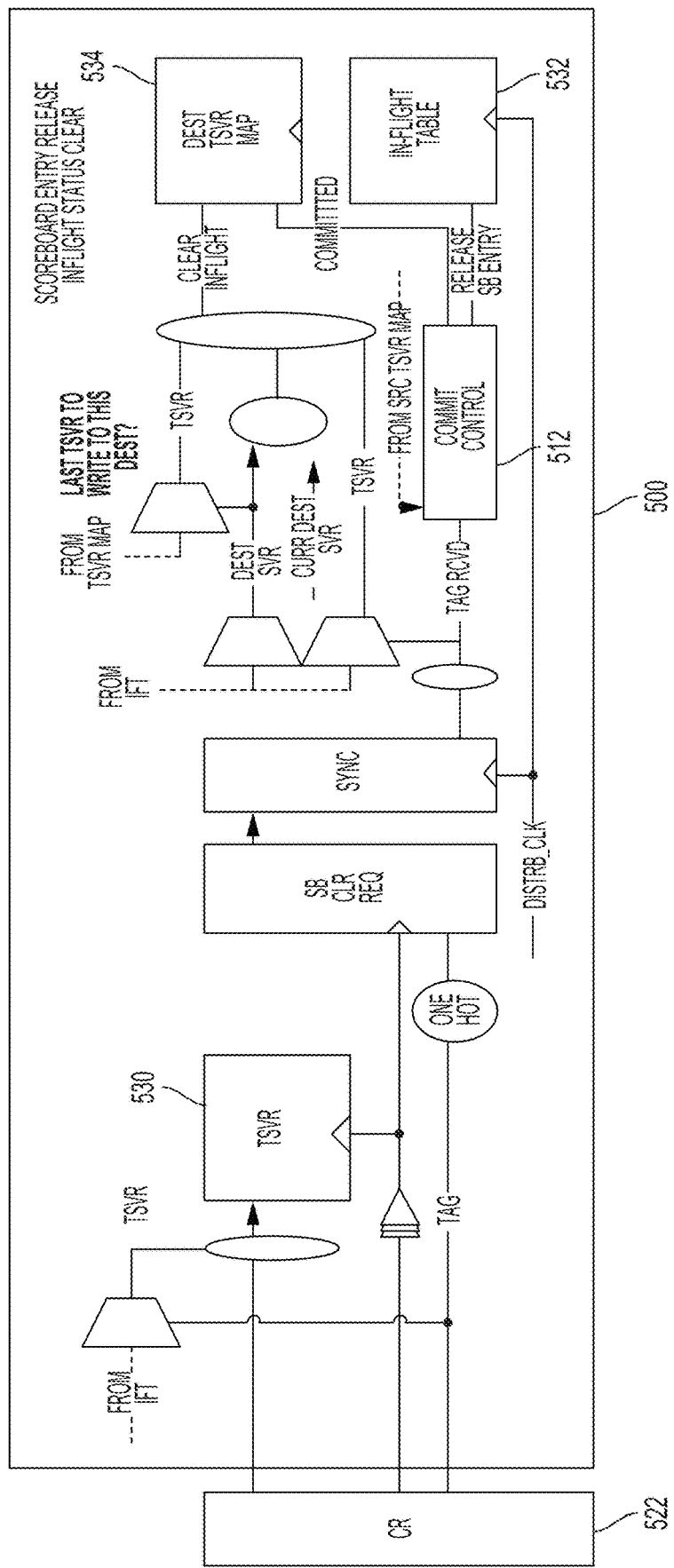
FIG. 5 is a view of an example scoreboard unit according to some embodiments.

FIG. 5 shows an example scoreboard entry release unit 500, including TSVR 530 with inflight status clear. At the end of the instruction execution, the result data from CRs 522 along with the associated tag come into the Temporary SVR 530 Write Ports. The tag is used to lookup the destination temporary register ID from the in-flight table 532 in the SBM. At the same time, the tag is used by the Scoreboard Release Unit 500 to determine if the current instruction is the last "in-flight" instruction to write to the destination register in the Commit register space. If it is the last instruction to target the destination register, a flag may be set to clear the in-flight status of the register in the TSVR Map 534. The Write Commit Controller 512 uses this information to clear the "in-flight" bit after the data has been written to the Commit SVR. At the same time, it sets the "committed" flag. Once the "committed" flag is set, instructions launched after this point will use the committed register values as the source inputs.

Once the result has been committed, the SB entry and the temporary register location associated with the instruction can be re-assigned. The Scoreboard Release Unit 500 releases the SB entry (tag) at this point. However, it waits for all dependent instructions to leave the dispatch stage before releasing the TSVR location. Some embodiments may make sure that the data is actually read out of TSVR 530 before releasing the TSVR 530.

Flush

The flush will be described in relation to FIG. 2 as an illustrative example. When a Jump/Branch instruction is identified by the distribution unit 208 and distributed to a sALU slice, the scoreboard logs the branch instruction tag in a jump buffer. Each jump buffer entry keeps track of a branch. Scoreboard unit 210 also marks the sALU ID the jump instruction is dispatched to.

The jump instruction is dispatched to the sALU as a normal instruction for condition evaluation. Upon completion, the sALU sends the result of the Jump instruction, which is the new PC for program continuation, back to the Jump Unit 220, with the tag of the Jump instruction.

The jump unit 220 receives all sALU results and uses the sALU ID provided by the SBM to connect one of the sALU results to the head of the jump buffer entries.

The jump unit 220 uses the instruction tag to lookup the corresponding PC value (iMEM address) of the next instruction and compares it against the jump result received. If the jump was correctly predicted, the addresses match and program execution can continue without generating a flush. The Scoreboard unit 210 may be notified that the branch speculation is resolved and proceeds with the following instruction commitments, if the conditions allowed. If the addresses do not match, meaning that the jump was incorrectly predicted, an instruction pipeline flush will be issued. At the same time, the new PC 204 value (coming from the jump result) will be sent to the PC 204 to resynchronize the PC 204 value and start fetching instruction from the iMEM 202 at a new location.

When a flush is generated by the jump unit 420, the in-flight table (IFT) in the scoreboard unit 210 is notified. The scoreboard unit 210 will stop the distribution unit 208 from distributing new instructions. The IFT will be updated. The scoreboard unit 210 uses the tag associated to the instruction that created the flush condition to determine which IFT entries should be removed. During a flush, these entries are not allowed to be committed. If the flushing instruction has a Tag N, the new instruction distributed after the flush will be using N+1 as its Instruction Tag.

The flush action does not reset or clear speculative in-flight instructions. An instruction is speculative if in-flight (e.g. left the distribution stage) and newer than the instruction that causes the flush. In the vector domain, speculative instructions can be buffered in the vCR queues while the flush is executed. vCR queues are read as usual after the flush, waiting for a vCR to become ready. Instruction tag extracted from the vCR queue head entries is used to lookup the IFT. If the instruction is speculative (the tag is larger than the flush tag), the instruction will be purged by the CR. The CR will remain available and continue pulling another instruction from its vCR queue. If the tag is smaller (i.e. the instruction is older than the flushing instruction), the instruction will be carried out as usual by the CR.

For the dMEM controller 226, it may be slave to the Scoreboard unit 210. The flush request and tag may not be sent to the dMEM controller 226.

Figure 6:
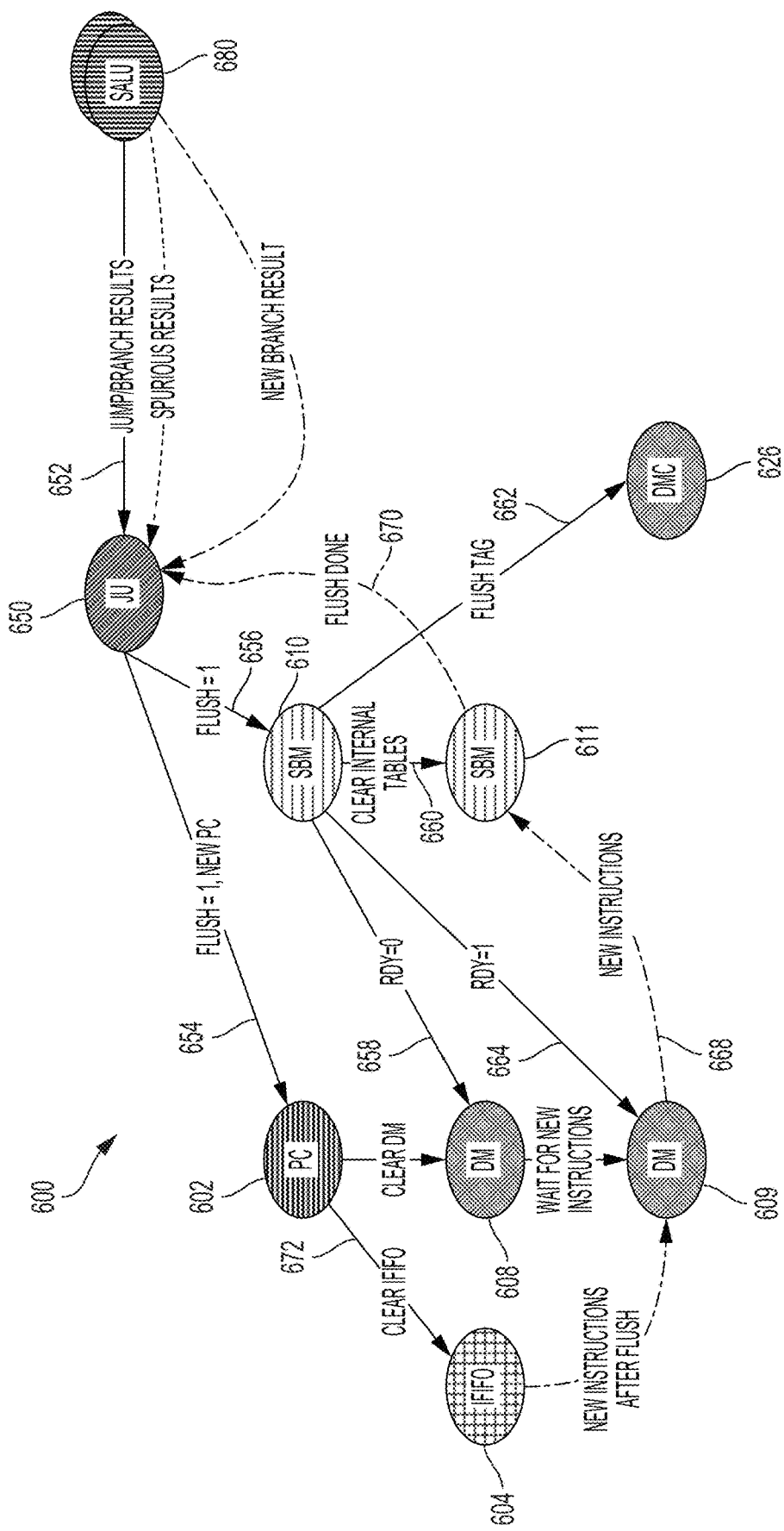
FIG. 6 is a flow chart of an example data flow according to some embodiments.

FIG. 6 shows a flowchart of a process 600 for a flush according to some example embodiments.

At 652, the jump unit 650 compares the head of the jump queue result with that from the sALU 680 to determine if the result causes a flush or not. At 654, a new program counter 602 is generated which triggers instruction FIFO 604 to clear at 672. At 656, a flush signal triggers the scoreboard unit 610 to assert flag to show that flush is in progress. At 658, the scoreboard unit 610 de-asserts RDY to DM to stop incoming instructions. Note the tag that causes flush also, at 660, clears all tables accordingly. At 662, the scoreboard unit 610 sends flush info (tag etc.) to dMEM controller DMC 626. When all is done, the scoreboard unit 610, at 664, asserts RDY to distribution unit 608 to accept new instructions at 668. The scoreboard unit 611 de-asserts flag to show that flush is done at 670.

Jump Unit

Referring back to FIG. 2 by way of illustrative example, the jump unit 220 monitors the results of the condition evaluation and determines whether a flush should be generated.

The jump unit 220 stores multiple branch instructions (such as four for the quad pack example). When a jump instruction is detected at the distribution unit 208, the instruction tag and the targeted sALU ID are recorded while the scoreboard unit 210 logs the iMEM address (PC value) of the distributed instructions. This information will be used later by the jump unit 220 to determine whether a flush should be generated once the jump instruction is resolved by the sALU. The buffers are independent of each other and are updated when the instruction leaves the distribution unit 208.

The sALU sends the PC result and the corresponding instruction tag to the jump unit 220. The jump unit 220 compares the head of the jump buffer to the incoming PC result. The iMEM address is then compared against the Jump destination PC value. If they match, instruction flow continues without interruption. If the addresses do not match, an instruction pipeline flush signal is triggered and the PC 202 (reading instructions from the iMEM) is re-synchronized to the Jump destination PC value. If the comparison does not generate a flush, it is dropped and scoreboard unit 210 is notified that the tag associated with such evaluation can be released. If a flush happens, a flush signal will be generated for scoreboard unit 210. Also, PC 202 will be notified of the flush together with the new PC value.

During the time when the flush is generated to the time when the flush process is complete, jump unit 220 may still receive in-flight jump instructions and sALU evaluation results. These will be discarded or dropped (based on Flush Marker) and would not be evaluated by the jump unit 220.

Nested Branches

The processor architecture supports nested branches. There is no limit of how many nested branches a program can have. However, the processor may support a maximum of 4 outstanding branch instructions at a time for some embodiments depending on program requirements. As an illustrative example the description may assume 4 outstanding branch instructions at a time, but other thresholds may also be used. After that, the processor may stall the instruction pipeline until one of the branches is resolved.

Since the execution of the sALU can be out-of-order, the branch evaluation results can be received out-of-order. Only the most outer branch will be evaluated. A flush request happening to the outer branch will cause the inner branches to be flushed as well. Results of an inner branch, even if predicted, will not be evaluated by the jump unit 220. This is consistent with the fact that no latter instruction results can be committed before previous instructions are resolved.

Flush Marker

When an instruction pipeline flush occurs, the scoreboard unit 210 increments a 3-bit Flush Marker (to support N=4 nested branches, for example) and attaches that to the instruction tag of all new instructions from the distribution unit 208. The size of the Flush Marker is dependent of the maximum delay of reading the input operands. The Flush Marker is used to differentiate the current entry in the in-flight table from other entry with the same lower 6-bit instruction tag value. This situation happens when an incorrectly predicted branch takes too long to be dispatched, so long that the new instruction are put in-flight before it.

Recovering from Instruction Pipeline Flush

After a flush, the in-flight table may resume from the tag number right after where the Jump causes the flush. The flush marker will also be incremented. All the TSVR assigned for the instructions after the flush will be reclaimed. Any in-flight instructions already dispatched in the CR, be it speculative or non-speculative, will run to completion. Non-speculative results may be committed to the CSVR if the instructions so dictate. Speculative results may be dropped by making the TSVR available without committing the content.

Instructions waiting for dispatch in the vector dispatch unit 218 may still be dispatched. The speculative instructions will be discarded and generate no read requests to the TSVR. Non-speculative instructions will be operated as normal.

The following provides various illustrative example embodiments for a flush.

The following instructions describe an example of how a flush may be implement:

```
PC+0: R5 = R6+R7; // lidx = 8|non-speculative; -> Update entry R5 as
"Busy|lidx = 8";
PC+1: if (...) // Branch instruction should be "not-taken"; unfortunately the
BTB decides "taken"
{
....
PC+8: R5 = R4-R3; // lidx = 16|speculative; -> Update entry R5 as
"Busy|lidx = 16";
}
PC+9: R9 = R5 +1; //lidx = 17|speculative; -> Rs0 = R5-> check the R5
entry and get
"Busy|Ridx = 16";
PC+10: R5 = R22+16;// lidx = 18|speculative; -> Update entry R5 as
"Busy|lidx = 18";
```

An option may be to implement a speculative and deep-in-flight processor. An example is a Re-Order Buffer (e.g. 64-deep ROB). The ISD issues the (PC+0) instruction to the CRD and (PC+1) instruction to branch processing unit respectively. The (PC+0) instruction may still be in the flight when (PC+1) branch is resolved (BPU sends execution result to the ROB). The ROB may wait for the commitment of all outstanding non-speculative instructions, that is, (PC+0)|lidx=8 before flushing its speculative instructions and re-fetching the (PC+9) instruction. If the ROB must wait for the commitment of all outstanding instructions, there may be a heavy flush penalty, because all outstanding non-speculative instructions may be committed until new instructions are fetched from the instruction memory. Moreover, most of the outstanding instructions are memory-loading. The command to fetch the new instruction has been already sent by the BPU to the instruction memory. If the ROB immediately start the speculative instructions, the ROB needs to "rollback" the register file R5 entry to "Busy|lidx=8". The ROB not only flushes the speculative instructions in the ROB but also the Busy) vector and lidx register file in function of the survival entry in the ROB (e.g. PC+0|lidx=8|non-speculative).

The following instructions describe another example flush the processor deals with the nested branch:

```
A-0;
A-1;
...;
A-n
If (R4<R6)
{
    B-0;
    ...
    B-m;
    If (R3>R7)
    {
        C-0;
        ...
        C-y,
    }
    Else
    {
        D-0;
        ...
        D-x;
    }
}
E-0;
E-1;
...
```

For this example, by way of illustration, assume flow of Section-A, Section-B, Section-D, and Section-E. Due to the branch, the speculative program flow is Section-A, Section-B, Section-C and Section-E. The second branch instruction (if (R3>R7)) is speculatively wrong branch. Assume that the second instruction (if (R3>R7)) obtains its operands much earlier than the first branch instruction (If (R4<R6)). If the BPU supports the out-of-order execution, the processor can speculatively flush the Section-C and fetch the Section-D, when the processor is executing the Section-A and Section-B. Thereby, the flush penalty is hidden.

Data Memory Controller

As an example illustration, the description of the dMEM Controller 226 design may assume a synchronous data memory, however, the memory interface can be adapted to an asynchronous design.

The dMEM Controller 226 may support any mix of LD/ST in a quad-instruction bundle. Up to 4 LD, 4 ST or mix of LD/ST can be handled by the dMEM Controller 226, until the LD and ST buffers are full. The dMEM Controller 226 may handle up to 16 LD and 8 ST access requests in parallel. At the distribution stage, the scoreboard unit 210 assigns LD/ST buffer entries to the LD/ST instructions along with the instruction tags. Sufficient LD/ST buffer entries are required for instructions to leave the Distribution Stage. The dMEM Controller 226 may stall the instruction pipeline until LD or ST buffer entries are released and can be re-assigned to new instructions. The instruction ordering may be maintained for LD and ST instructions independently. Newer LDs may be allowed to pass in front older STs as long as no address conflicts are detected. Once a LD/ST address conflict is detected, all LDs may be stalled until the conflict is resolved. LD/ST address conflict is resolved when all outstanding STs (up to and including the conflicting ST) are sent to the dMEM 228. The ST instructions sent to dMEM 228 are assumed completed. Only then can the LD processing be resumed. LDs can be speculative. STs may not be speculative. Speculative LD data may be written in the Temporary Registers, but not updated in the Commit Registers. STs may be launched only when all previous speculations are resolved. ST data always comes from the Commit Registers, and may only be sent to the dMEM 228 once the scoreboard unit 210 has sent a register read request and the ST data is received by the dMEM Controller 226. The scoreboard unit 210 sends the read request for the ST data of a specific instruction when all previous instructions are committed.

Since the instruction execution time is not deterministic and the instructions can be launched at any time based on their input operand availability, the conditional access resolution and the effective address can arrive at the dMEM Controller 226 out-of-order from any of the 16 sALUs. To guarantee the memory access sequence, the distributed LD and ST instructions are recorded using the scoreboard unit 210 LD and ST buffers.

The sequencing of the LD and ST buffer entries and the tag assignments by the SBM may guarantee that all dMEM-related instructions are processed in-order by the dMEM Controller 226. The dMEM Controller 226, using the tags of all in-flight LD and ST instructions, can determine the LD and ST order and priority.

dMEM Exception

The dMEM Controller 226 detects illegal memory accesses such as invalid or illegal access, out-of-range address, and so on. When such conditions are detected, the dMEM Controller 226 reports the problem to the Scoreboard unit 210 as an exception, and may purge the LD and ST locally without sending it to the memory.

When a LD is performed, the only exception that can be returned from the memory is a data error from the read access. For ST, no exception is expected when the memory write access is performed.

LD and ST Prioritization and Conflict Resolution

LD and ST instruction sequence may be preserved. However, newer LD instructions are allowed to be sent in front of older ST instructions.

Before sending a LD or ST access to the dMEM 228, the dMEM controller 226 must make sure that all older ST in-flight LD and ST instruction information (memory address, range, and so on) have been received from the sALU(s). Otherwise, it is impossible to detect potential address conflict against a newer LD instruction.

In some embodiments, the processor may allow LD prioritization over ST for the following examples: LD instruction is the oldest (LD buffer head); all older (compared to oldest LD tag) ST instruction information (address, range, and so on) is available at the dMEM Controller 226; without the address details, it is impossible to confirm potential LD/ST conflict; controller knows about older ST instructions using the SBM tag from the ST buffer; older ST address does not overlap with the LD address; and so on.

If one of the above example prioritization conditions is not met, the head LD buffer entry may be blocked. The LD/ST conflict will naturally be resolved by processing ST buffer entries. As soon as the conflicting ST is sent to the dMEM 228, the conflict flag is cleared and the LD buffer head entry is allowed to read the dMEM 228.

LD Instruction

The dMEM 228 performs the memory read in-order on each of its 2 read ports. Therefore, the dMEM Controller 226 records which of the 2 memory read port which LD instruction is sent to, and expects the LD data to be returned on the same port, in the same order. When the read data is returned by the memory, the dMEM Controller 226 associates the instruction tag to the received LD data and forwards it (with the tag) to either the Temporary Scalar Registers 232 or Vector Registers 236 (TSVR).

Only when the LD data is sent to the TSVR can the dMEM Controller 226 notify the LD completion to the scoreboard unit 210. The scoreboard unit 210 is then free to release the LD buffer entry (without the commitment of the LD data). Upon release of an entry, the dMEM Controller 226 also clears all associated record for that instruction.

Should an exception occur (read data error for example), the exception status is flagged with the LD instruction completion status.

ST Instruction

The dMEM Controller 226, to allow the memory write to happen, may wait for all instruction before the ST to be committed. Instead of monitoring the commit sequence, the scoreboard unit 210 sends the ST data read requests only when the ST is the next instruction to commit. The data read from the Commit Registers (e.g. 230, 234) is sent directly to the dMEM Controller 226, which upon reception performs the memory write access.

Then dMEM Controller 226 notifies the scoreboard unit 210 for the ST completion. Similar to the LD, the scoreboard unit 210 and dMEM Controller 226 may free the ST buffer entry and all other records associated to that instruction.

As opposed to the LD, the scoreboard unit 210 does not wait for the commitment of the ST data to release the tag associated to the instruction, since a ST issued to the memory is assumed complete.

Interface Description

The processor may implement the following example interface related features.

Distribution Unit

When instructions leave the distribution unit 208, the scoreboard unit 210 assigns each LD and ST instructions to an entry in the LD or ST buffers and records the tag. The purpose of the buffers is to guarantee resource availability in the dMEM Controller 226 and to allow the dMEM Controller 226 to keep tracks of the order between LD and ST instructions.

The scoreboard unit 210 provides the LD and ST buffer information (tag, tag valid status, sALU ID handling the instruction) to the dMEM Controller 226. Since the LD and ST buffers are populated when the instructions are distributed, the dMEM Controller 226 assumed information is stable Scalar ALU The sALU is responsible for evaluating the conditional LD and ST instructions and computing the effective memory address and range. The LD and ST result information is sent to the dMEM Controller 226, on a source-synchronous, point-to-point interface with each of the 16 sALUs.

The scoreboard unit 210 LD and ST buffer holding the tag, tag valid and sALU ID may be stable when the LD and ST information comes from the sALU. The sALU port has already been configured (using the sALU ID from the SBM) to route the LD and ST results to the appropriate entry of a LD or ST Info Buffer located in the dMEM Controller 226.

Commit Scalar and Vector Registers

Given ST instructions are not speculative, the ST 32 or 128-bit data always comes from the Commit Registers (e.g. 230, 234), on a source-synchronous interface.

The scoreboard unit 210 initiates the ST data read requests to the Commit Registers (e.g. 230, 234) when all previous instructions to that ST instruction are committed. Therefore, when the dMEM Controller 226 receives the ST data, it assumes that ST request is non-speculative, and the dMEM write access can be launched.

dMEM

The dMEM Controller 226 may be synchronized to the dMEM clock.

The read port may be provided with a 28-bit address. Data is read 128-bits at a time from the memory. The dMEM Controller 226 extracts the 32-bit LD data for sLD and the remaining data bits are ignored.

The write port is provided with an address, 128-bit data and per-bit write enables. For sST, only 32 bits out of the 128-bit data are written. There may also be unaligned access.

Temporary Scalar and Vector Registers

The interface to the Temporary Register Space is used to return LD data back from the dMEM 228 to the Processor 200. The dMEM Controller 226 receives the dMEM data from any of the two Read Ports, retrieves the instruction tag associated with LD data, and sends that data and tag source-synchronously towards the register unit.

The dMEM Controller 226 has two dedicated, point-to-point, connections to both the scalar and vector Temporary Register unit. The dMEM Controller 226 transmits the LD data to either the scalar or vector register interface. The Temporary Register uses the tag to look up the scoreboard unit 210 IFT and determines the allocated temporary register identifier and updates the register content with the LD data.
Scoreboard Unit dMEM 228 ST instruction status feedback is sent to the scoreboard unit 210. If a LD/ST exception occurs (illegal memory address, read data error, and so on), one of the 16 LD or 8 ST buffer entries is marked as an "exception". A flag is set on the bit corresponding to the LD or ST buffer index of the exception instruction. Once the scoreboard unit 210 receives the exception notification, it takes further actions and eventually releases the post-exception SB entries.

The dMEM Controller 226, upon a ST instruction being sent to the dMEM 228 as a write access, also sends an instruction completion status update to the scoreboard unit 210. A flag is set on the bit associated with the ST buffer and the index of the ST instruction. The scoreboard unit 210 receives the ST completion notification and eventually releases the instruction tag.

Once a LD and ST entry is released by the scoreboard unit 210, it resets the instruction tag valid status sent to the dMEM Controller 226. The dMEM Controller 226 detects the update on the status and immediately releases all local buffer entries associated with that instruction.

Storing may be a commitment like register writing. In some examples, only committed data can be used for the ST instructions and such as register contents. A store instruction can use the data from read and write commits that has not been written into the register file, and then write them into the memory. This may also be also a store-commitment.

If the address-ROB is merged into the data-ROB, the ROB actually plays a role as a store-queue in which the store-effective-addresses are stored in terms of lidx.

LD can be speculative and out-of-order if their effective addresses are not in conflict with the effective addresses of any outstanding store instructions in the store-queue.

Embodiments may employ the LD or ST rather than move instruction to exchange scalar register and vector register. See the example:

$SV128$ VR7,R3;//(*R3)=VR7;

LD R7,R4;//R7=(*R4);R4=R3+3;

It actually moves the 3rd lane of the VR7 into the R7. The ROB may detect LD or ST conflict so that the LD would not be sent to the memory until the ST is done. The pipeline may be stalled. However, if the LD is speculated and the ST data is in the ROB, the ROB simply returns the third lane of the 128-bit data to be stored to the R7.
dMEM Features The dMEM 228 may provide a synchronous interface using a periodic clock For example, the dMEM 228 may have 2× Read Ports, 1 Write Port, 128-bit data width, and so on. The ordering may not be guaranteed for Read and Write accesses sent to the dMEM 228 on the same cycle. In some examples, memory is byte addressable, accessed on 128-bit boundaries. When accessing 128-bit data, the address four LSBs are ignored. Memory address is provided with bits [31:4]. The unaligned read/write accesses are handled in the dMEM Controller 226 using Aligned Registers. The dMEM 228 read and write ports have the same latency. A Read access sent on the next clock cycle after a Write access to the same memory address would read the updated data. A Read at the same address as a Write launched on the previous memory clock cycle must return the updated data from the write access. Due to potential cache misses, read data latency is not deterministic. However, the sequence of access on a given port is maintained. A cache miss on a read access on a memory read port may stall subsequent read accesses on that port from returning read data towards the core.

In another aspect, there is provided another example processor architecture that may implement the evaluation functionality of the distribution unit and scoreboard unit using an instruction decoder and dispatcher, reorder buffers, buffer elements and register files.

Figure 7A:
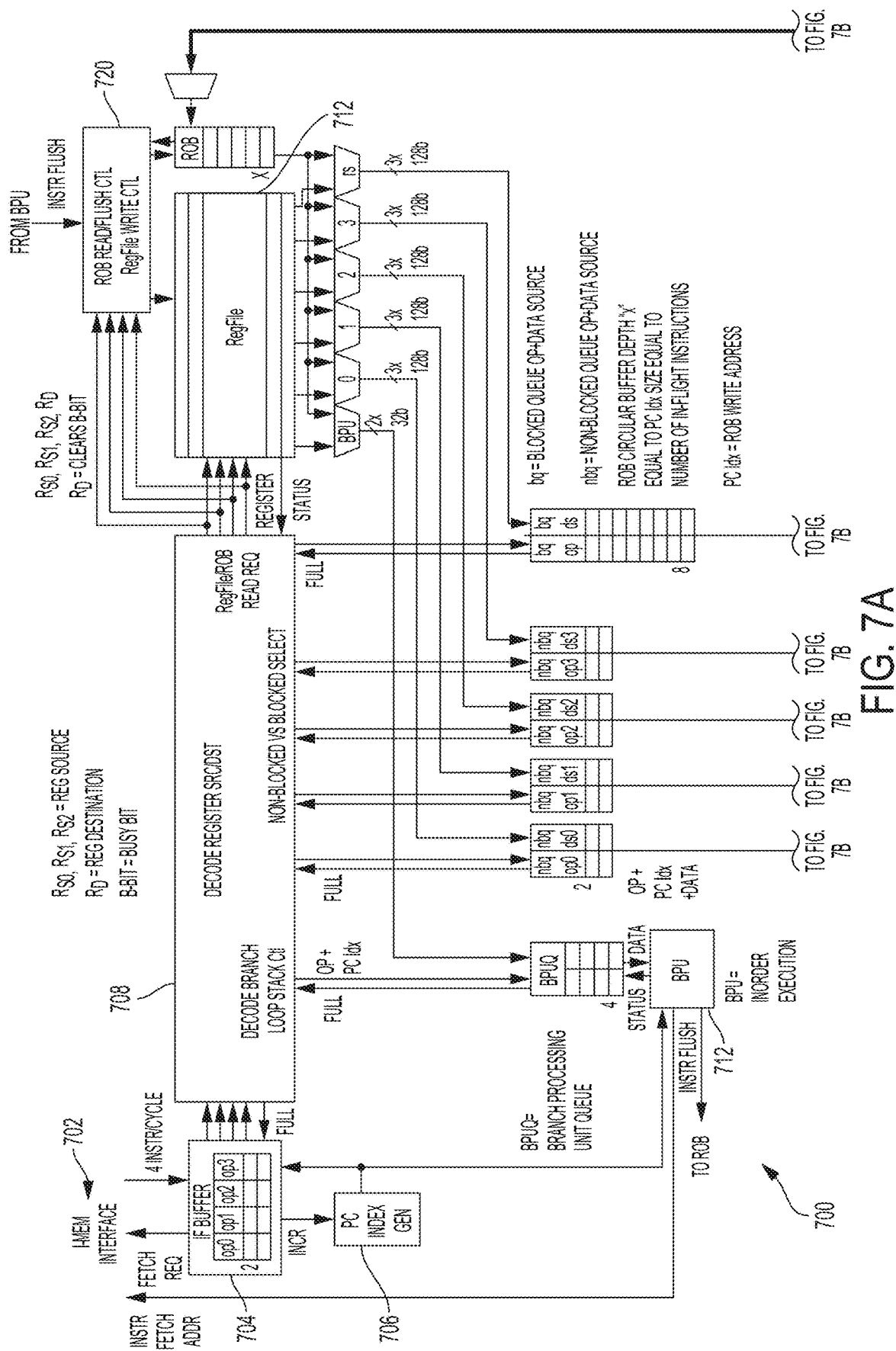
FIGS. 7a and 7b are views of an example processor according to some embodiments.
Figure 7B:
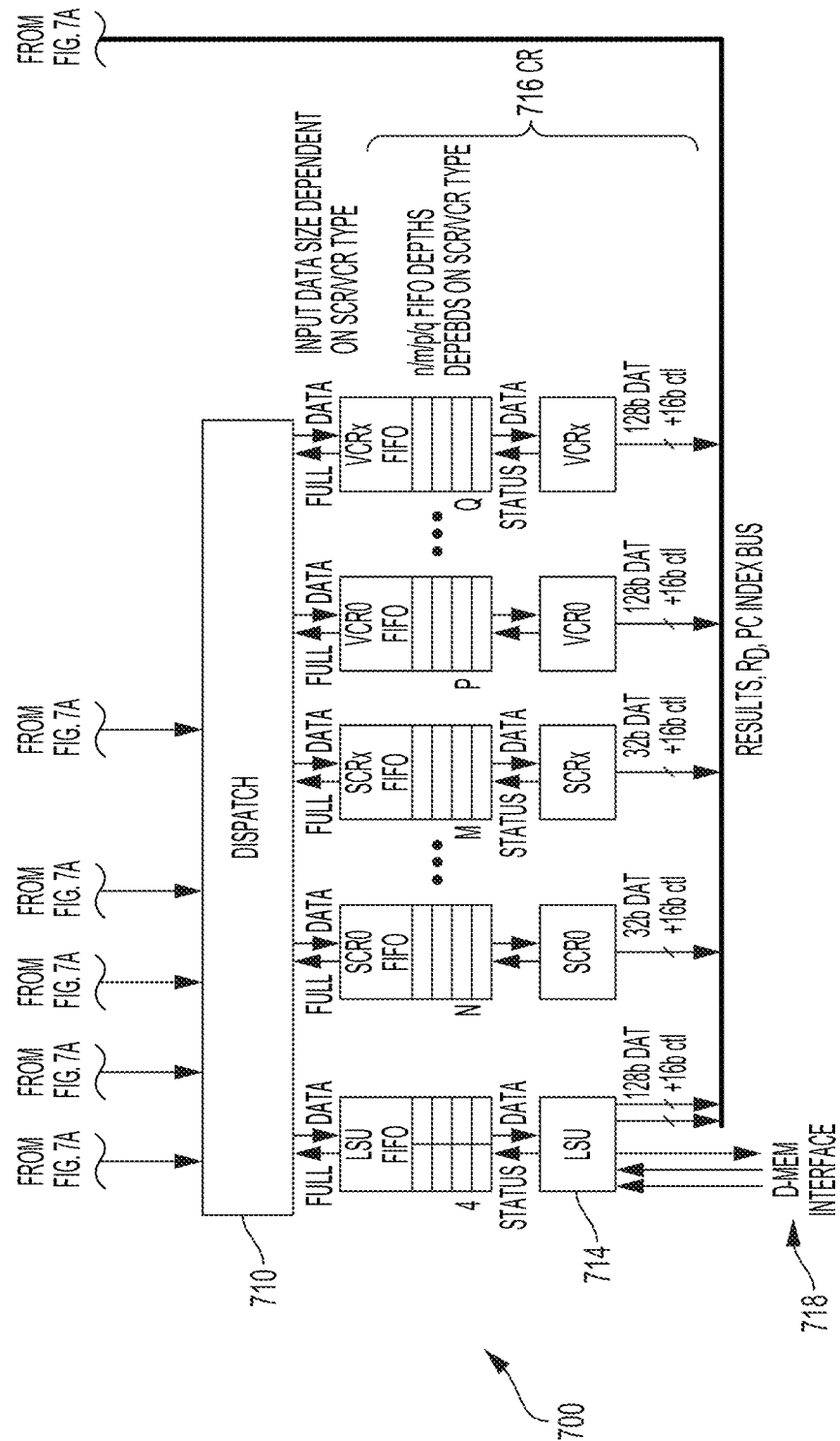

FIG. 7 shows an example processor 700 according to some embodiments. The processor 700 may include components for an evaluation unit, execution unit and termination unit. For example, the processor 700 includes an iMEM interface 702 for sending read requests to the iMEM memory for instructions stored at corresponding instruction memory addresses, an instruction buffer 704 for storing the instruction data received from the instruction memory in response to the read requests, where the instruction data held for dispatch, and a program counter 706 for generating at least one instruction memory address for the read requests for the instruction data stored in the iMEM at the least one instruction memory address. The instruction data is a data structure that references operands (data) and opcode. The processor 700 includes a decode register 708, register file 712, brand processing unit (BPU) 712, instruction dispatcher (ID) 710, reorder buffer (ROB) 720 which work together to evaluate source input operand dependencies and execution dependencies for the operands and opcode of the instruction data using pointers, assign instruction tags to provide reference identifiers for the instruction data, track resource and data availability for the opcode of the instruction data, compare the resource and data availability to the input operand dependencies and the execution dependencies, and track information about current in-flight instructions using the instruction tags. The processor 700 includes a load store unit (LSU) 714, calculation or computational resources (CRs) 716 to manage dispatch, based on a resource available signal, the instruction data as an entry of at least one queue for computational resources to execute the instruction data to generate instruction results, where the queue advances to a next entry (if available) when the instruction data is dispatched from the queue to the computational resources. A dMEM interface 718 is for reading and writing from and to the data memory based on the opcode of the instruction data.

Figure 8:
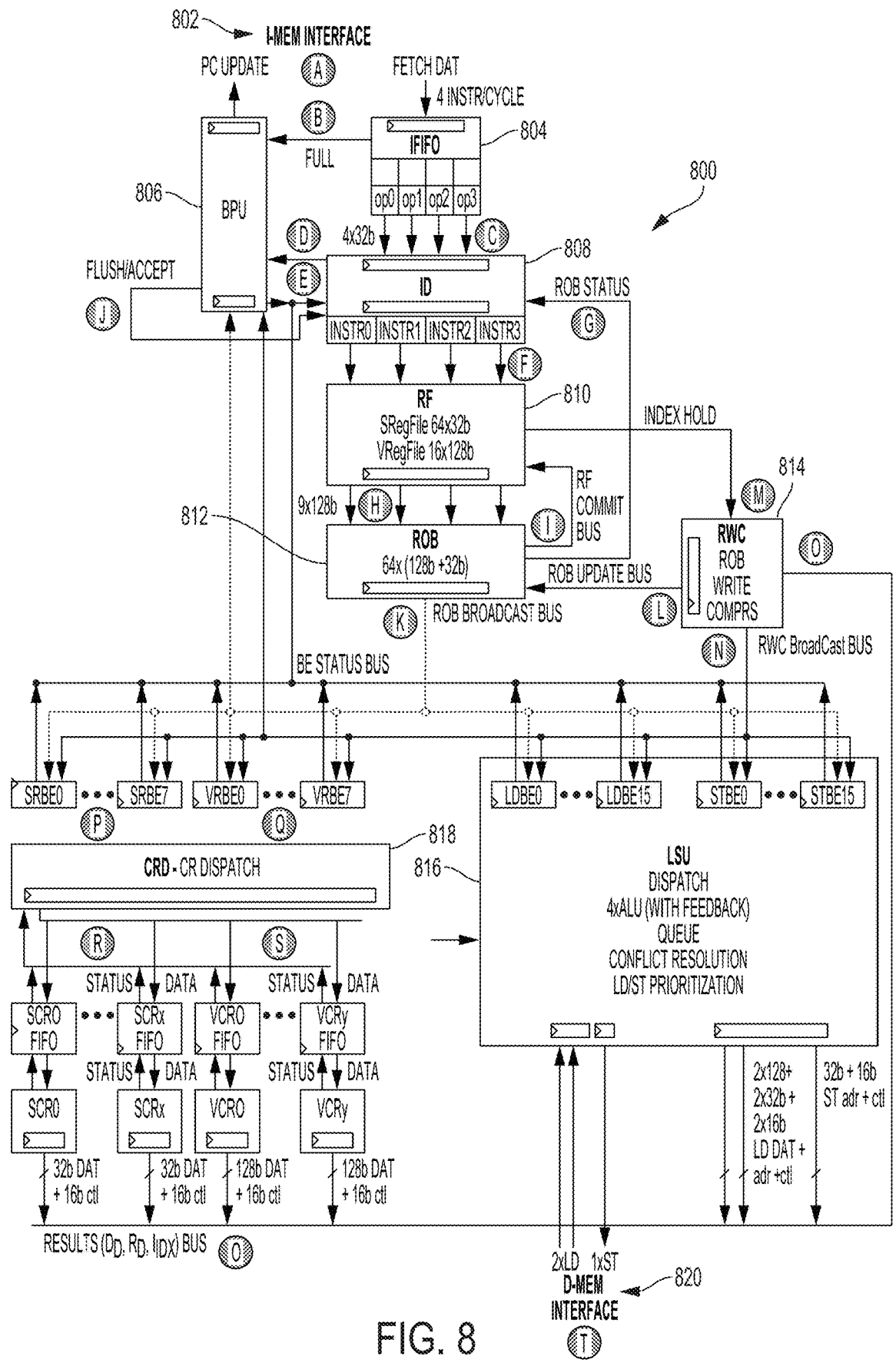
FIG. 8 is a view of another example processor according to some embodiments.

FIG. 8 shows another example processor 800 according to some embodiments. The processor 800 may include components for an evaluation unit, execution unit and termination unit. The processor 800 includes an iMEM interface 802 for sending read requests to the iMEM memory for instructions stored at corresponding instruction memory addresses, an iFIFO 804 for storing the instruction data received from the instruction memory in response to the read requests, where the instruction data held for dispatch. The instruction data is a data structure that references operands (data) and opcode. The processor includes a brand processing unit (BPU) 806, ID 808, Register File (RegFile) 810, ROB 812, ROB write compressor (RWC) 814 which work together to evaluate source input operand dependencies and execution dependencies for the operands and opcode of the instruction data using pointers, assign instruction tags to provide reference identifiers for the instruction data, track resource and data availability for the opcode of the instruction data, compare the resource and data availability to the input operand dependencies and the execution dependencies, and track information about current in-flight instructions using the instruction tags. The processor 800 includes LSU 816, CR Dispatch 818 to manage dispatch, based on a resource available signal, the instruction data as an entry of at least one queue for computational resources to execute the instruction data to generate instruction results, where the queue advances to a next entry (if available) when the instruction data is dispatched from the queue to the computational resources. The dMEM interface 820 is for reading and writing from and to the data memory based on the opcode of the instruction data.

For the processor 800, instructions may be fetched simultaneously and various rates. For example, four instructions may be issued. As an example, the instruction format may be little endian. There may be multiple parallel (scalar, vector) calculation/computational resources (SCR/VCR) with a separate dispatch instruction FIFO 804 per CR. The processor 800 may allow out-of-order execution on instructions. There may be separate buffers for branch, load, store and CR (Calculation Resources) instructions to allow for out of order execution. There may be branch instruction execution by dedicated the BPU 806. For example, multiple deep BPU 806 and iFIFO 804 instruction processing may allow speculative execution of unresolved conditional branch operations. The iFIFO 804 depth to be determined after modeling according to some examples. The processor 800 may have a dedicated Load/Store processing unit (LSU 816) with two load ports and one store port. There may be multiple parallel address calculations handled by LSU 816. There may be a fast path for address results to be used in the next address calculation. Out-of-order speculative loads and in-order non-speculative stores may be allowed and resolved by logic within LSU 816. The processor 800 may implement in-order write back to RegFile 810 and which may be guaranteed by 64 entry data reorder buffer (Data ROB) 812. When CR results are being written to ROB 812, they may also be broadcast to the CR, load, store and BPU Buffer Elements.

The following provides further example terminology that may be used to described example processor architectures according to embodiments described herein.

A "quad pack" of instructions may refer to a pack of four, 32-bit instructions. This is an illustrative example of multiple instructions that may be loaded into example processors described herein.

The following state definitions may be used to define processor 800 functionality. "Asserted" may refer to a status bit which may be in the "asserted" state if it is equal to logic one. To "Set" a bit is to put it into the "asserted" state. A status bit may be in the "deasserted" state if it is equal to logic zero. To "reset" a bit is to put it into the "deasserted" state.

The following register bit definitions may be used to define processor 800 functionality. RSx may refer to a register source where x=0, 1, 2 and DSx may refer to a data source where x=0, 1, 2. The RDx may refer to a register destination where x=0, 1 depending on how many outputs an instruction has. RDx is the address of where to write to in the RegFile 810 when a ROB 812 entry is ready to be committed. DDx may refer to data destination where x=0, 1 depending on how many outputs an instruction has. The DDx is the data to write in the RegFile 810 at location RDx when a ROB 812 entry is ready to be committed. VSx may refer to a vector or scalar indicator where x=0, 1 depending on how many outputs an instruction has. This bit is used to know how many bits to write to the RegFile 810 when a ROB 812 entry is ready to be committed. "Busy" means that a register has been chosen as a destination for an instruction's output and cannot be read from the RegFile 810 while the instruction is still executing. When an instruction completes and the register has been committed back to the RegFile 810, then that register is no longer busy and is available to be read from the RegFile. BRFx may refer to a register file busy bit associated with RSx used in register scoreboard to denote that a specific register within the RegFile 810 is "busy" and should not be read. BRBx may refer to a ROB Busy bit associated with RSx that may be used in register scoreboard to denote that a specific register within the ROB 812 is "busy" and should not be read. IIDX may refer to an instruction index created by the instruction index generator. The IIDX may be used to keep track of registers used for data.

The following component example functionality may be described with reference to processor 800 but may apply to other processor architectures described herein.

The iFIFO 804 may refer to the Instruction Fetch FIFO. The ROB 812 may refer to the Reorder Buffer. The ID 808 (or Pre Decode) may refer to the Instruction Dispatch with Pre Decoding. A Scalar Resource Buffer Element may be referred to as SRBEx, where x=0 to 7. A Scalar CR Instruction is placed into any free SRBEx element regardless of whether they have a blocked input or not. If the input data is available, it is stored in the SRBEx. If the input data is not available, a pointer into the Data ROB where the data will eventually be is stored in the SRBEx.

A vector resource buffer element may be referred to as VRBEx, where x=0 to 7. Vector CR Instructions are placed into any free VRBEx element regardless of whether they have a blocked input or not. If the input data is available, it is stored in the VRBEx. If the input data is not available, a pointer into the data ROB where the data will eventually be is stored in the VRBEx.

A load buffer element may be referred to as LDBEx, where x=0 to 15. Load instructions are placed into any free LDBEx element regardless of whether they have a blocked input or not. If the input data is available, it is stored in the LDBEx. If the input data is not available, a pointer into the data ROB where the data will eventually be is stored in the LDBEx.

A store buffer element may be referred to as STBEx, where x=0 to 15. Store instructions are placed in order into STBEx elements regardless of whether they have a blocked input or not. If the input data is available, it is stored in the STBEx. If the input data is not available, a pointer into the data ROB where the data will eventually be is stored in the STBEx.

Branch processing buffer element (BPBE) may refer to fall branch-type instructions waiting to be dispatched once input parameters are available. Branch-type instructions are placed in order into the BPUB.

Computational or calculation resource (CR) can be either vector or scalar resources. For example, SCR may refer to scalar calculation resource and VCR may refer to vector calculation resource.

The iMEM Interface

The iMEM interface 802 may be implemented in some examples as being a synchronous interface to an iMEM but may also be an instruction cache structure. The address that is used to access the iMEM may be referred to as the Program Counter (PC). Upon reset, the PC internal to the iMEM may be reset to 0 and the iMEM will push multiple instructions (e.g. four instructions, each 32-bit) to the iFIFO 804 and increment the PC by four. Each address represents 32-bits. Since the iMEM pushes multiple instructions (e.g. 128-bits) to the IFIFO each transaction, the PC must be incremented by a number corresponding to the number of multiple instructions pushed (e.g. 4). In some examples, the iMEM may continue to increment the PC by the number of multiple instructions and push the instruction data to the iFIFO every cycle except under the following example conditions: If there is a FULL indication from the iFIFO 804, the instruction pushing must halt; If there is a WAIT indication from the BPU 806, the instruction pushing must halt; If the BPU sends a PC Update due to a Branch instruction, the iMEM may update its internal PC with the updated PC and resume "normal" operation;

iFIFO

The iFIFO 804 may retime the instructions from the synchronous domain into the clock domain of the ID block. The IFIFO 804 may have the following attributes. There may be multiple entries. If the IFIFO 804 is FULL, the IFIFO 804 must signal this to the IMEM 802 so instructions will stop being pushed. The IFIFO 804 may contain multiple instructions, such as four 32-bit instructions: {instr0, instr1, instr2, instr3} as an illustrative example.

Instruction Dispatch

The Instruction Dispatch (ID) 808 block has the following example attributes: Instructions coming from the IFIFO 804 are pre-decoded as either branch, load, store, scalar calculation resource (SCR) or vector calculation resource (VCR) instructions. The VCR instructions are further classified into VMAC and Non-VMAC as VMAC instructions require up to three 128-bit inputs.

Decoded branch instructions and any immediate target address information are sent to the BPU 806 directly. If the BPU 806 buffers are full, the ID 808 will halt, causing the IFIFO 804 to eventually become FULL. The BPU 806 reports FULL if there are four unresolved speculative Branch instructions. The ID 808 must check the availability of the buffer elements (SRBE, VRBE, LDBE, STBE and BPU) before pushing the instruction to the RegFile 810. The ID 808 can push any of the four instructions based on individual availability If there are any instructions not yet pushed, the ID 808 will halt until the remaining instructions are pushed to the RF 810.

The ID 808 will modify all register source/destination numbers by the RF 810 window offset (WindowBase). Register windowing control is handled within the ID 808 block. The ID 808 contains an eight entry return address stack (RAS) to support eight nested subroutine calls. The RAS is used to support returning from a function call. When a CALL instruction is executed, the return address is saved to the RAS. If another CALL instruction is executed before the RET instruction, the next return address will be pushed onto the RAS.

When a RAS instruction is executed, the return address will be popped off the RAS and used to fetch the instruction after the CALL instruction. The ID 808 will not dispatch a CALL or RET instruction while there are speculative instructions still not resolved. If the RAS is full, the ID 808 will raise an exception if another CALL instruction is decoded. The ID 808 will assign an Instruction Index (IIDX) sequentially to each instruction. The ID 808 contains a 6-bit IIDX counter which counts 0 to 63 then rolls over to 0 for some example embodiments. As an illustrative example, a quad may consume 4 IIDX values. For every Quad, the IIDX counter increments. The ROB 812 contains 64 entries so each IIDX corresponds to a ROB 812 entry location. For each ROB 812 entry rob[y] (where "y" is the entry number from 0 to 63), the ROB provides a one-hot busy status to the ID (which may be expressed as rob[y].busy). When the ID 808 attempts to assign IIDX[5:0]=y, it must first check the ROB 812 entry at rob[y]. If rob[y].busy=1, the ID must halt as the ROB is full.

Figure 9:
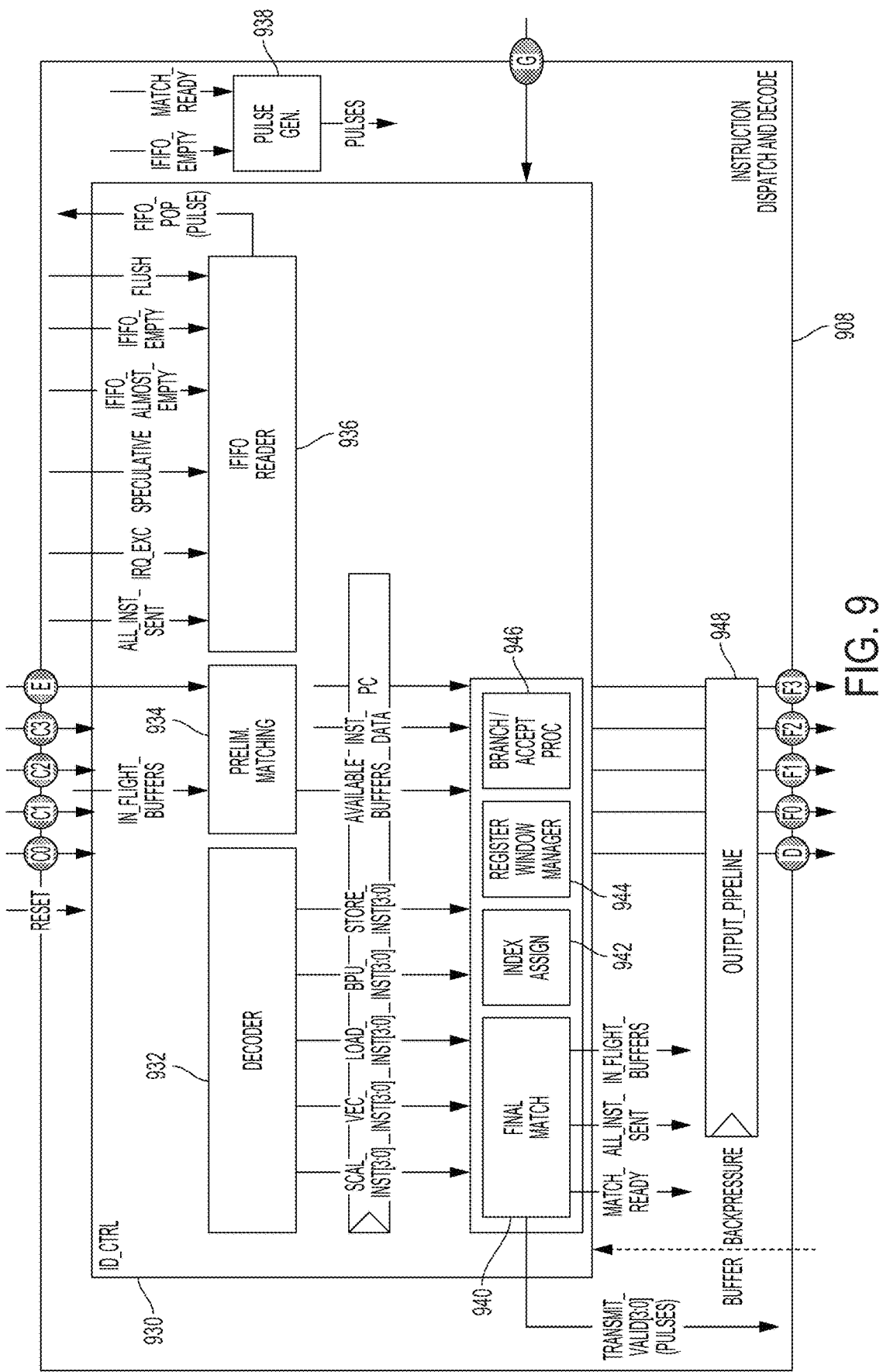
FIG. 9 is a view of an example instruction dispatcher and decoder according to some embodiments.

FIG. 9 shows a schematic diagram of an example instruction dispatch and decode unit (ID) 908. In this example, the ID 908 has an ID control 930, a pulse generator 938 and an output pipeline 948. The ID control 930 has a decoder 932, a preliminary match unit 934, an iFIFO reader 936, a final match unit 940, an index assign 942, a register window manager 944, and branch acceptance unit 946.

RF (Register File)

The Register File (RF) 810 may have the following attributes. Each entry may contain: a busy bit, five deep IIDX stack, and data field (size varies depending on the register file type). When a register is busy, instructions that follow are given the IIDX from the head of the IIDX stack which corresponds to the ROB entry where the data can be found. The IIDX stack may allow four outstanding conditional branches and quick flushing of the pointers. An example purpose scalar register file may have one 64-entry of 32-bits (SR0 to SR63). An RF 810 may support twelve read ports and four write ports, in some examples. The RF 810 may be configured with 16-register access windows. The access window may be controlled by function calls that can rotate by 4, 8 or 12 registers. A return address from CALL is stored in the RAS. The overflow generates a window overflow exception where the exception handler must spill the contents of the older window to a pre-allocated spill area on the stack. When returning from a function call to a window that was spilled, a window underflow exception is generated where the exception handler must copy the register values from the spill stack back to the register file. Register Windowing control is handled within the ID 808 block. There may be one 16-entry 128-bit vector register file (VR0 to VR15) that may support twelve read ports and four write ports. The RF 810 may support two types of vector data: vfloat (8×16) and vfloat (4×32), for example. There may be one 4-entry 128-bit alignment register file (AL0 to AL3) that supports one read port and one write ports. There may be one 8-entry 32-bit Select register file (SL0 to SL7) and one 16-entry 1-bit Boolean register file (BL0 to BL15).

RF IIDX Stack

There may be an IIDX stack for every RF 810 entry which remembers or records five levels of IIDX that were assigned. This allows the RF 810 to quickly unroll from up to four levels of speculation. The RF 810 IIDX stack may have the following attributes. After reset, the head and tail point to the same stack element. When there is a speculative Branch, the head of the stack will increment by one. The ID 808 block ensures that there are no more than four unresolved speculative Branch instructions because the BPU 806 will be full, and if another Branch instruction comes in, the ID 808 will halt. When read request for a particular register are made from the RF 810, the RF 810 returns the IIDX from the head of the stack which is the most recent instance of the register. If there are multiple writes to the same register destination at the same branch level, the IIDX will be overwritten. The ROB 812 can handle having multiple IIDX for the same register. Writes to the RF 810 are in order and the IIDX value at the tail is checked to see if there is a match. If there is no match, the RF 810 will not accept the write as this is an older instance of the register that was handled by the ROB 812. Branches are resolved in order. When a Branch is resolved as accepted, the tail is incremented by one. When there is a flush, the number of Branches being flushed is indicated to the RF 810 IIDX stack and it will decrement the head by that amount. i.e. if there are three Branches to be flushed at the same time, the head will decrement by three. When the head equals the tail, the is no longer any unresolved speculative Branches. The example picture given below is for a four deep IIDX stack but the same principle applies for a five deep IIDX stack.

Figure 10:
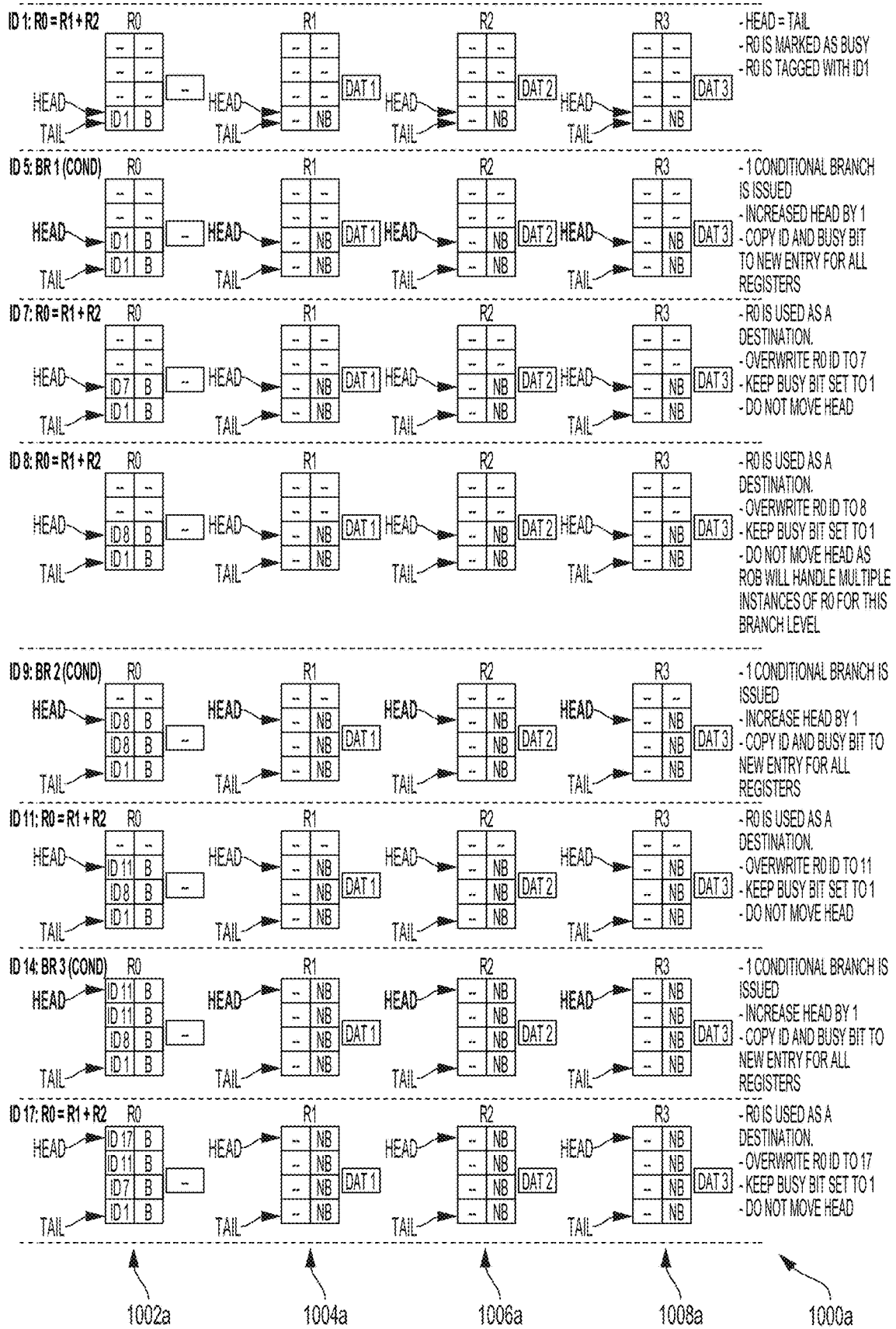

FIGS. 10 and 11 show an example IIDX stack 1000*a*, 1000*b* with four deep registers 1002*a*, 1004*a*, 1006*a*, 1008*a*, 1002*b*, 1004*b*, 1006*b*, 1008*b*. The same principles may apply for other levels of registers, such as five deep registers, for example.

ROB

The ROB 812 (FIG. 8) may have the following example attributes. The ROB 812 may be built using flip flops. There are 64 ROB 812 entries denoted by rob[y] where y=0 to 63. Each entry contains the following example fields:

rob[y].spec: speculative bit for current phase rob[y].br_id: branch identification which indicates which branch the instruction is speculative to rob[y].busy: Indicates the ROB entry is busy waiting to be written rob[y].dstdat.vs: A bit that indicates whether the Destination Data is Vector or Scalar rob[y].dstdat.num: Indicates the Register Number where the Destination Data needs to be written in the RF 810 rob[y].dstdat.dat: Contains the Destination Data which can be Vector or Scalar rob[y].dstadr.num: Indicates the Register Number where the Destination Address Data needs to be written in the RF 810. This will only be used by LD and ST instructions to return the address update. May also be used for Vector instructions that also return a Boolean.

rob[y].dstadr.dat: Contains the Destination Address Data which can only be Scalar. This will only be used by LD and ST instructions to return the address update. May also be used for Vector instructions that also return a Boolean.

Figure 12:
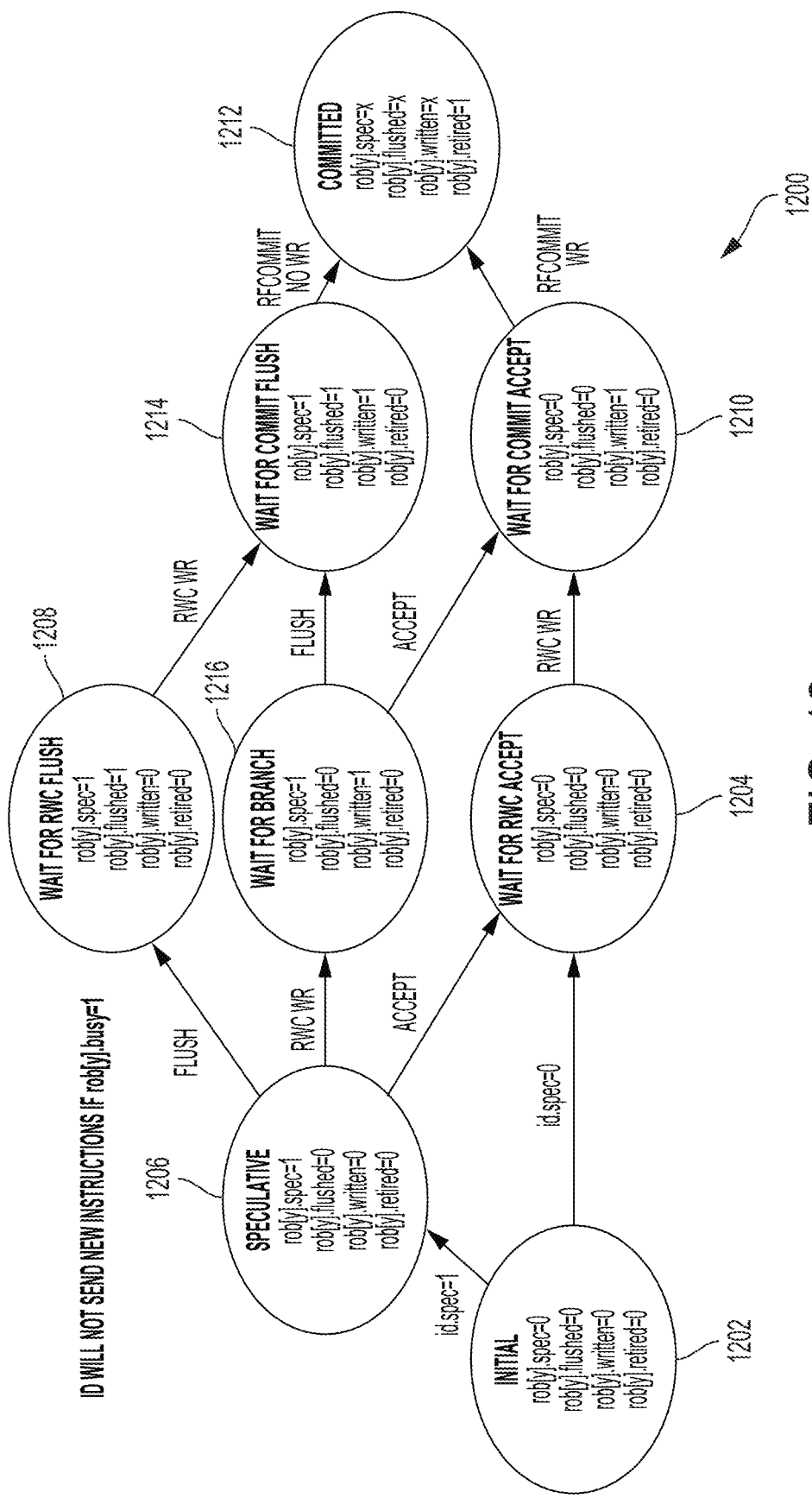
FIG. 12 is a flow chart of an example process for a register file according to some embodiments.

FIG. 12 shows an example data process 1200 for retiring an ROB 812 entry to the RF 810. This example process 1200 may illustrate the transition when rob[y].busy=1 to rob[y].busy=0. At 1202 the initial state is checked and the process moves to 1204 if the instruction data is not speculative to wait for RWC 814 to accept the instruction data, or to 1206 if the instruction data is speculative. At 1210, the process 1200 waits for the commit (e.g. RWC 814) to accept and at 1212 the instruction data is committed. At 1216, the process 1200 waits for the BPU 806 to trigger a flush and, at 1214, waits for the commit flush. At 1208, the process waits for the RWC 814 to trigger a flush and then proceeds to 1214.

RWC (ROB Write Compressor)

The RWC 814 may have the following example attributes. The RWC 814 may contain a separate input FIFO for each Calculation or Computational Resource (CR) and LSU 816 output (e.g. there may be a point-to-point connection between each CR and the RWC 814). When the CR returns the result data (shown as DD in FIG. 8) it may be sent to the RWC 814 with the associated IIDX number and RD number. The IIDX number points to the location in the ROB 812 where the DD values will be written. There may be an 8-lane write bus to the ROB 812 and there may also be an 8-lane write broadcast bus to all Buffer Elements (BEs). There is extra bandwidth on this bus to allow FIFOs to be drained quickly to account for resource blocking which may have caused the FIFOs to fill up. The same data is broadcast to both the ROB 812 and the BEs.

The Index Hold interface may be a one-hot encoded signal (e.g. 64-bits) from the RF 810 which tells the RWC 814 the IIDX values that are being selected by the current instruction's inputs. If any of these indexes match with the index of the data being broadcast and written into the ROB 812, the RWC 814 will write those indicated IIDX values to the ROB 812 and the BEs but will also re-broadcast this data at a later time (e.g. at predetermined clock cycles), using up spare RWC 814 bandwidth. This re-broadcasting of the data protects against the race condition where data is broadcast to BEs at the same time that same IIDX is being requested from the ROB 812. For example, there may be an in-flight instruction which might miss the data being broadcast if it is not currently in a BE.

Scalar Resource Buffer Element (SRBE)

The SRBE has the following example attributes. The processor 800 may contain 16 SRBEs and each SRBE can hold one instruction, for example. The SRBEs may be filled in any order. The decision of which SRBE can be loaded is made by the ID 808 block. The SRBEs may allow draining out-of-order when inputs are all available. Flush/Accept signals are sent to the SRBEs by the ID 808. Any waiting instructions in the SRBE that are speculative and match the flush Branch ID (BRID) may be made ready for dispatch by the CRD 818 and may be made non-speculative. When the RWC 814 writes the flushed SRBE instructions to the ROB 812, the corresponding IIDXs will be freed up. Any waiting instructions in the SRBE that match the accept BRID may be made non-speculative.

Vector Resource Buffer Element (VRBE)

The VRBE has the following example attributes. As an illustrative example, the processor 800 may contain 8 VRBEs and each VRBE can hold one instruction, for example. VRBEs are filled in any order. The decision of which VRBE can be loaded is made by the ID 808 block. VRBEs allow draining out-of-order when inputs are all available. Flush/Accept signals are sent to the VRBEs by the ID 808. Any waiting instructions in the VRBE that are speculative and match the flush BRID may be made ready for dispatch by the CRD 818 and may be made non-speculative. When the RWC 814 writes the flushed VR instructions to the ROB 812, the corresponding IIDXs will be freed up. Any waiting instructions in the VRBE that match the accept BRID may be made non-speculative.

Computational or Calculation Resource Dispatch

Figure 13:
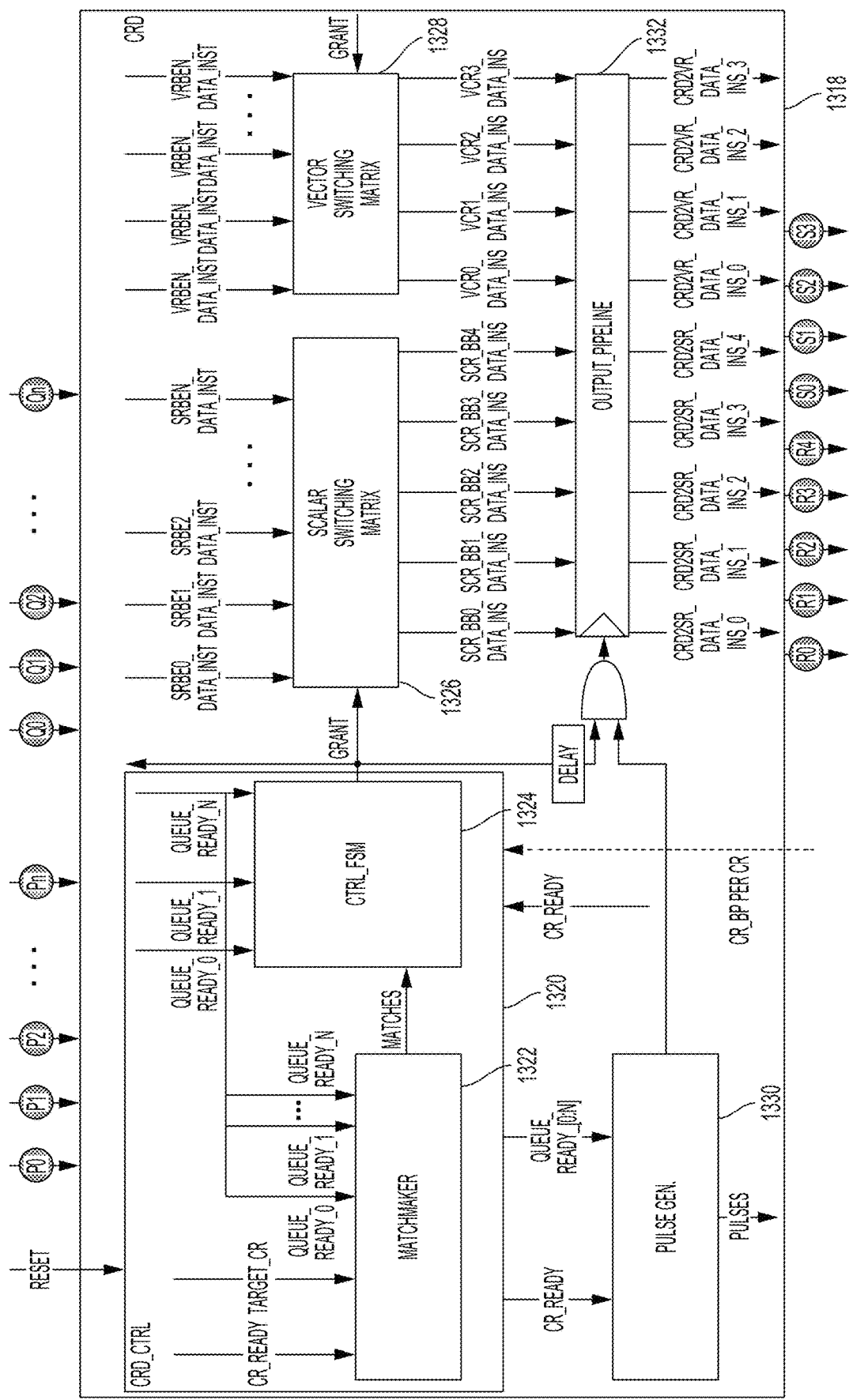
FIG. 13 is a view of an example computational resource dispatch according to some embodiments.

FIG. 13 shows an example CRD 1318 that may include a CRD control 1320 with a matchmaker 1322 and a control FSM 1324. The CRD 1318 may also have a scalar switching matrix 1326 and a vector switching matrix 1328. The CRD 1318 has a pulse generator and an output pipeline 1332. The CRD 1318 may have the following example features. The CRD 1318 may transmit data and instructions from the M scalar queues to the N scalar calculation resources. The CRD 1318 may transmit data and instructions from the P vector queues to the Q vector calculation resources. The CRD 1318 may work a conserving Round-Robin scheduler. The scheduler sequentially services the next queue which has data that can be transmitted. A scalar switching matrix 1326 allows the content of any scalar queuing element to be transmitted to any scalar calculation resource. A vector switching matrix 1328 allows the content of any vector queuing element to be transmitted to any vector calculation resource. Data from a queuing element can only be transmitted to a CR when the CR is ready to accept the data. The CRD 818 may generate the pulses used for transmission of data to the calculation resources. Pulse Generation may be done internally using the pulse generator 1330. Pulse generation may be active when data is available for transmission. The scalar output bus is a broadcast bus and the processor 800 implementation may currently assume it broadcasts to 5 scalar calculation resources at a time. Broadcast buses may be used instead of point-to-point connections to reduce the number of wires. The vector output buses are point-to-point and connect directly to the target vector calculation resources. The scalar and vector output buses provide data to the output pipeline 1332. In some examples, VMAC operations may be allowed to be sent on one broadcast output bus which may allow the other broadcast buses to store two 128-bit register values instead of three, for example.

The CRD 1318 implementation may be based on example assumptions. In the cycle following a queue being granted there may not be another grant on the next clock cycle. This may imply that the queues should be written into in a sequential manner and not always to the same queue. The SCR/VCR queue may send an almost full signal when it has one spot left in its queue. It may not send data to a SCR/VCR queue when it is either full or almost full. It may take a cycle for the almost full signal to update which is how the queue could end up being full. The CRD 1318 may send one element at a time to a SCR/VCR queue. The classification to determine the type of a calculation resource of an instruction may be performed outside of the CRD 1318 before the instruction is sent to the CRD 1318.

Load Store Unit

Figure 14:
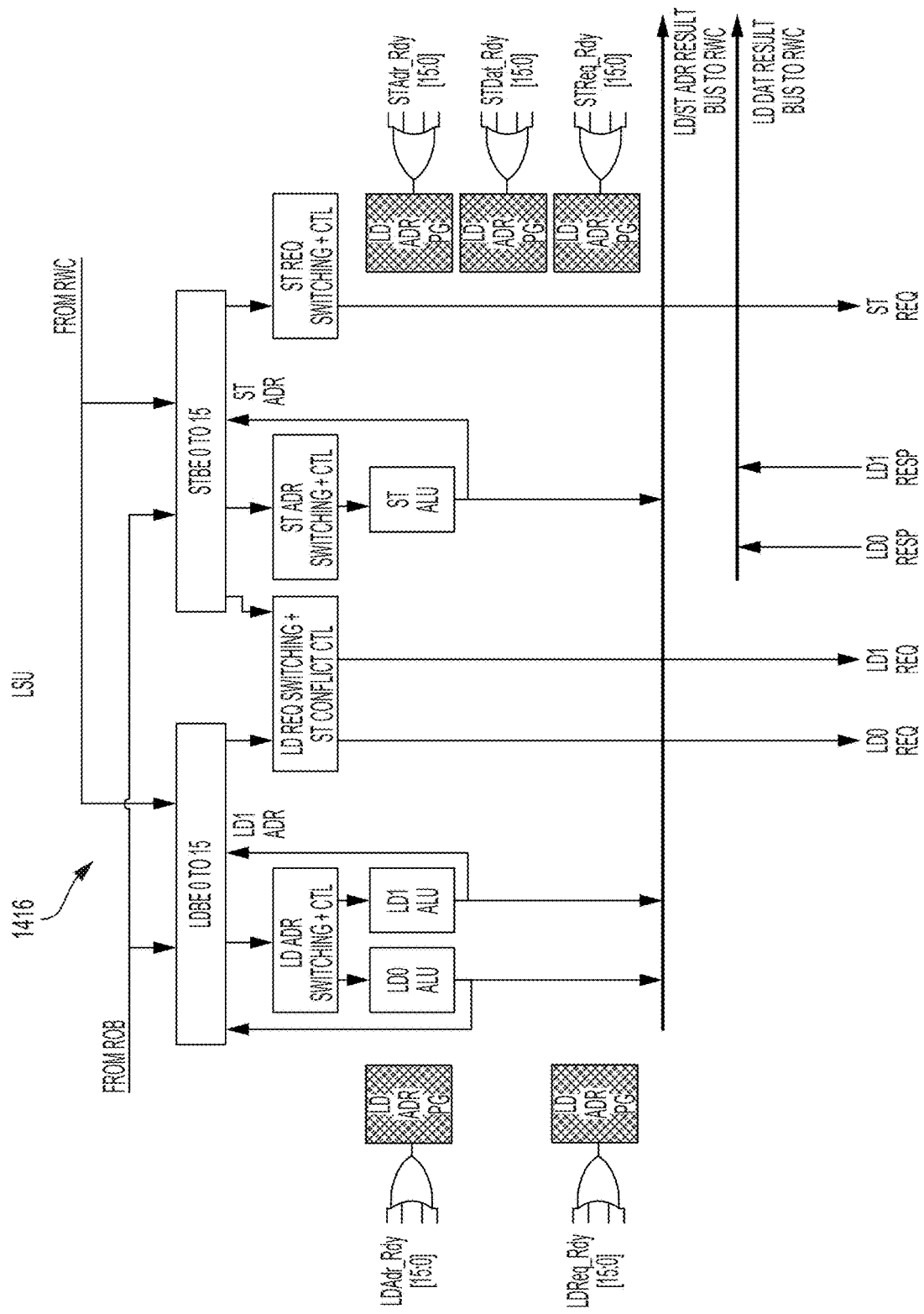
FIG. 14 is a view of an example load store unit according to some embodiments.

FIG. 14 shows an example LSU 1416 that receives data from ROB 812 and RWC 814 (FIG. 8). Reference will also be made to FIG. 8 as an illustrative example of the interactions between various components. The LSU 1416 may have the following attributes. The LSU 1416 may contains 16 LD Buffer Elements (LDBEs) where each LDBE can hold one instruction. LDBEs are filled in any order. The decision of which LDBE can be loaded is made by the ID 808 block. LDBEs allow draining out-of-order when inputs are all available.

There may be two Load ALUs, one for each of the two Load Ports. Each Load ALU can return an address update to the RWC 814 with its associated IIDX. The Current or Updated Address may be used in the Load Request to the DMEM IF. The Load Data may be returned via the DMEM IF and may be sent to the RWC 814 with its associated IIDX A Load/Store address conflict is checked by the LSU 1416. Loads are stalled if the Load address matches any addresses of outstanding STOREs. Once the address conflict is removed when the STORE is sent to the DMEM and no longer outstanding, the LOAD will be allowed to proceed.

The LSU Contains 16 ST Buffer Elements (STBEs), where each STBE can hold one instruction. The STBEs are filled in order. The decision of when a STBE can be loaded is made by the ID 808 block. STBEs are drained in-order when inputs are all available and not speculative.

There is one Store ALU for the one Store Port. Each Store ALU returns an address update to the RWC 814 with its associated IIDX. The Current or Updated Address will be used in the Store Request to the DMEM IF.

Flush/Accept signals are sent to the LDBEs within the LSU 1416. Any waiting instructions in the LDBE that match the flush BRID may be made ready, may bypass the DMEM load and return to the RWC 814 with garbage address update and result data. When the RWC 814 writes the flushed LD instructions to the ROB 812, the corresponding IIDXs will be freed up. Any waiting instructions in the LDBE that match the accept BRID will be made non-speculative.

Flush/Accept signals are sent to the STBEs within the LSU 1416. Any waiting instructions in the STBE that match the flush BRID may be made ready, may bypass the DMEM store and return to the RWC 814 with garbage address update data. When the RWC 814 writes the flushed ST instructions to the ROB, the corresponding IIDXs will be freed up. Any waiting instructions in the STBE that match the accept BRID may be made non-speculative.

State Registers

There are various Processor and Hardware State Registers used to control unique functions within the processor.

CBEGIN register holds the start address pointer for circular addressing mode. CEND register hold the end address pointer for circular addressing mode. Miscellaneous registers may be used for window overflow detection, call increment, old window base, privilege level, user vector mode, exception mode, and interrupt level functionality.

Current Window Overflow Enable registers may define whether windows overflow exceptions are currently enabled. Current Loop Enable registers may define whether the hardware loop instructions loop back function is currently enabled, Further example registers include Loop Begin address pointer used by the Hardware Loop control logic to support two nested Hardware Loops, Loop End address pointer used by the Hardware Loop control logic to support two nested Hardware Loops, Loop Count used by the Hardware Loop control logic to support two nested Hardware Loops, Window Base registers that holds the current offset that is applied to RegFile reads, Window Start registers where each bit represents the state of the SR register.

Calculation Resource State Registers may be used to control unique functions within the CRs.

Data Memory Access

Data memory access may have the following example attributes. Data memory access may have two Load ports, where the Loads are pipelined. Data memory access may have one Write port.

BPU and Speculative Operation

Branch instructions (e.g. instructions that manipulate the Program Counter) are placed in order into one of the four branch processing buffer elements (BPBE). There can be up to four outstanding (i.e. un-resolved) branch instructions in the BPBE at any time. If there are more branch instructions in the ID 808, they will stay there until free locations open up in the BPBE. The BPU 806 can observe all instructions in the BPBE in case the branch prediction process requires it.

For unconditional branch instructions, all instructions after the branch instruction and before the instructions fetched at the new target branch address will be discarded in the ID 808 block. Unconditional branches do not use an entry in the Branch Target Buffer (BTB). Conditional branches make use of a BTB and branch prediction. When a conditional branch is detected, the branch prediction and BTB select between the target address (if branch is taken) and the sequential address (if the branch is not-taken). Program flow continues fetching instructions at this new address. These new instructions are now "speculative" until the branch condition is resolved. The BPU 806 allows up to four levels of speculation, for this example embodiment, which means there are four unresolved Branch instructions.

The results that need to resolved for the outstanding Branches can occur out-of-order. The BPU 806 may signal "flush" or "accept" of specific Branches in-order. The BPU 806 may store the sequential address in case a branch is falsely taken so after the flush, the program can quickly resume at the correct address.

The processor may also implement the functionality for cache behavior, trace port, inter core communication ports, and on chip debug.

Exceptions and Interrupts

Exceptions and interrupts may be serviced once all outstanding branches are resolved in order for the return address to be a non-speculative address. When an enabled exception/interrupt is detected: the ID block will stop dispatching if there is at least one outstanding Branch instruction (the processor is in a speculative state) and another Branch instruction is decoded. The outstanding Branch instructions must have time to resolve without other Branch instructions causing further speculation. Once all outstanding Branches have been resolved and the processor is no longer speculative, the return address of the current PC will be saved to the integer return register, and the target address for the interrupt vector will be sent to the IMEM. An RTI (return from interrupt) instruction will cause the integer return value to be sent to the IMEM as the next PC value.

Data Flow Overview

Figure 15:
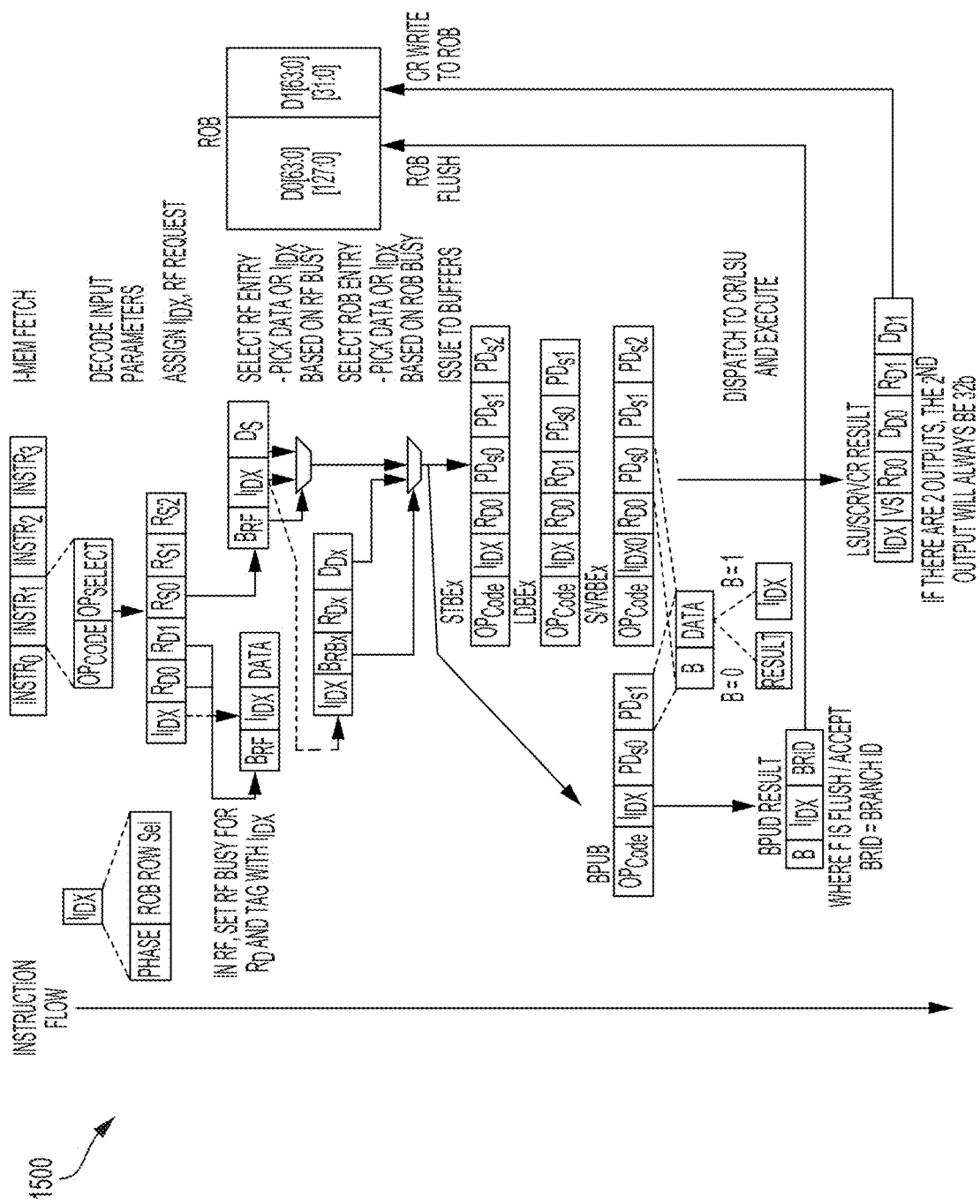
FIG. 15 is a flow chart of an example instruction flow according to some embodiments.

FIG. 15 shows a flowchart of a process 1500 as an illustrative example embodiment. Instructions are fetched multiple at a time from the iMEM interface into the IFIFO block as long as the IFIFO is not full. An example is four instructions being fetched at a time.

Instructions require source data that is "not busy" and a resource that is available to operate on that source data. When the resource is finished its operation, it outputs the destination data. Register source (RS) values address the RegFile and point to data source (DS) values. FIG. 15 indicates R and P and other reference letters.

Register destination (RD) values address where in the RegFile that a particular resources data destination (DD) needs to be eventually written. RD and DD are first written by the resource (thru the RWC) into the ROB at the location pointed to by IIDX. The ROB entry also contains a ROB Busy (BRB) bit, a Commit (C) bit and a Speculative (S) bit.

DD is written to the RegFile at address RD once the instruction can be committed. The instruction can be committed if it is not busy, there are no branches still in the speculative state and it is the oldest IIDX value, for example. For example, the processor writes to the RegFile are non-speculative and in instruction order. In some examples, committed data can be used for the ST instructions. Load instructions output two pieces of data RD0 and RD1, for example.

Instructions coming from the IFIFO are Pre-Decoded as either Branch, Load, Store, Scalar Calculation Resource (SCR) or Vector Calculation Resource (VCR) instructions. The VCR instructions are further classified into VMAC and non-VMAC. VMAC instructions may require up to three 128-bit inputs, for example.

Once classified the ID may move an individual instruction out to the RegFile based on the following examples. If there is a free ROB indexes (IIDX) to allocate to that instruction. If there is room in the classified buffer element. i.e. if this is a vector calculation instruction, check for if there a free buffer element in the VRBE. Once it is decided by the ID that the instruction can move to a free buffer element, the instruction will flow from the ID, thru the RegFile, thru the ROB and to the buffer element without halting.

For unconditional branch instructions using an absolute immediate target address, the information is passed directly to the BPU or BPBE to allow for a fast branch to occur with instructions (e.g. four instructions) that will need to be discarded by the ID block. For example, this may be the four instructions in flight when the quad with the unconditional branch was pre-decoded. The reference to a quad pack of instructions is only an illustrative example.

While the instruction is in the ID block, the RSx and RDx values are extracted and updated by the window base amount. For this illustrative example, three input S/VMAC instructions must be the 4th instruction in the quad as Instr3 lane supports reading three 128-bit inputs. Within the RegFile entry pointed to by RDx, the RegFile Busy (BRF) bit is asserted and the IIDX field is updated. The IIDX points to an entry in the ROB where the RD data (DD) needs to be eventually written by the CR. The IIDX is a six bit value which represents ROB entries 0 to 63. IIDX [5:0] has a one to one mapping into the ROB.

The size of the IIDX/ROB reflects the total number of instructions that can be in-flight at any time. This may mean that a "free" entry in the ROB, and therefore a "free" IIDX number, may be available to assign to an instruction that is being issued.

If all entries in the ROB are still busy, instruction fetching will halt until there are at least four free entries. Each RSx is examined in the RegFile block to determine whether it is busy or not. RSx can be busy in the RegFile yet not busy in the ROB while branches are still speculative or during non-speculative times when an RD is in the ROB and waiting to be committed to the RegFile. If RSx is not busy, the instruction Opcode bits plus the required RSx data (DSx) is passed to the ROB. If RSx is busy, as indicated by the BRF bit, the following example functions may happen.

The IIDX number stored in the RegFile is returned which points to a location in the ROB to look for RSx. This IIDX number is also sent to the RWC to protect against race conditions. The Instruction Opcode bits plus this IIDX number is passed to the ROB. If the ROB entry pointed to by IIDX is not busy, the data will be read and made available (with the Opcode) as an output of the ROB, to be passed to the ID block. If the ROB entry pointed to by RIDX is busy, the IIDX with the Opcode will be made available as an output of the ROB.

In the flowchart of FIG. 15, PDSx refers to pointer/data and is what is passed from the RegFile to the ROB and from the ROB into the buffer elements. An extra bit in the PDSx tells the logic that it contains a pointer or data. When inputs are requested in the ROB, this also triggers a write from the ROB to the RegFile of any entries that need to be committed. Once committed, an entry will be retired in the following cycle to avoid a race condition with reading the just committed value from the RegFile. When instructions flow thru the ROB, they contain the identification of an element within the branch processing, load, store, scalar resource and vector resource buffer elements (BPUBE, LDBE, STBE, SRBE, VRBE). This allows the instruction to be broadcast from the ROB to the buffer elements.

Branch instructions are pushed into the BPBE in order and wait for their inputs if there is room available. For this example, there can be up to four outstanding (i.e. unresolved) branch instructions in the BPBE at any time. If there are more branch instructions in the ID, they will stay there until free locations open up in the BPBE. The BPU can observe all instructions in the BPBE in case the branch prediction process requires it.

Load instructions are pushed into the LDBE in any order if there is room available. The LSU can observe all instructions in the LDBE to allow out-of-order DMEM load access if there are no address conflicts with Store instructions.

For loads, the Opcode, RD and IIDX may be pushed into the LDBE along with two PDSx values. When the address elements in PDSx are available, the DMEM address will be calculated and if there is no address conflict with a previous pending store, the load will be executed.

The address output (IIDX, RD1 and DD1) from the load instruction may be sent to the RWC to be written into the ROB, not waiting for the load data to return. When the DMEM Load data returns, the IIDX, RD0 and DD0 will be sent to the RWC to be written into the ROB. All store instructions are pushed into the STBE in order.

For stores, the opcode, RD and IIDX are pushed into the STBE along with three PDSx values: two PDSx values are for calculating the Store address and one PDSx value is for the Store data. When the address elements in PDSx are available, the DMEM address may be calculated and the Store may be executed.

The address output (IIDX, RD1 and DD1) from the store instruction may be sent to the RWC to be written into the ROB. All Vector Resource instructions are pushed in any order to the VRBE. All Scalar Resource instructions are pushed in any order, first to the SRBE, and then to the VRBE if the SRBE is full. Scalar input data may be stored in the 32 lsbs of the 128-bit vector register.

Blocked instruction inputs in the buffer elements (in the BPBE, LDBE, STBE, SRBE and VRBE) may individually monitor the RWC broadcast bus to detect when data with the required IIDX is broadcast. This may be the data required by the blocked input. This broadcast data may be latched. Once an instruction has all its inputs, it can be moved to the calculation resource.

The "Index Hold" information sent to the RWC from the RegFile ensures that the Buffer Element may not miss the broadcast of the data with the matching IIDX. The CRD monitors the state of the SRBE and VRBE to know when to pull an instruction and push it to a CR FIFO. For example, if there is a VCRx instruction waiting in VRBEy, and the VCRx fifo is not full, then the CRD will read VRBEy, set VRBEy available, and write the instruction into the VCRx Fifo.

When an instruction has all its inputs and is dispatched to a Calculation Resource (CR), the CR is passed the Opcode, IIDX number and DSx values.

When the CR returns the result data, DD, it may be sent to the RWC with the associated IIDX number. The IIDX number points to the location in the ROB where the DD values will be written. The RWC may broadcast the data from the CRs back to the buffer elements in case there are instructions waiting for that data.

For this example, the DD is written to the RegFile at address RD once the instruction can be committed, meaning the data is in the ROB and the index is not speculative. DD is available to be read speculatively from the ROB by other instructions.

In the case of a branch, the Branch IIDX is recorded and all results in the ROB with IIDX greater than the recorded Branch IIDX are flagged as "speculative" and cannot be committed (written) to the RegFile. This speculative data is available to other instructions as inputs however these instructions outputs will also be speculative and flagged as such within the ROB.

The following examples may describe when a branch is resolved. If the Branch was correctly predicted, the speculative data is valid and can be committed to the RegFile. While waiting to be committed, the data can still be used as inputs to new instructions and these new instructions output data may no longer be speculative.

If the branch was incorrectly predicted, the speculative data is not valid and must be flushed from the ROB. "Flushing" occurs by moving the read pointer in the ROB to the next non-speculative location.

Register Windowing

Figure 16:
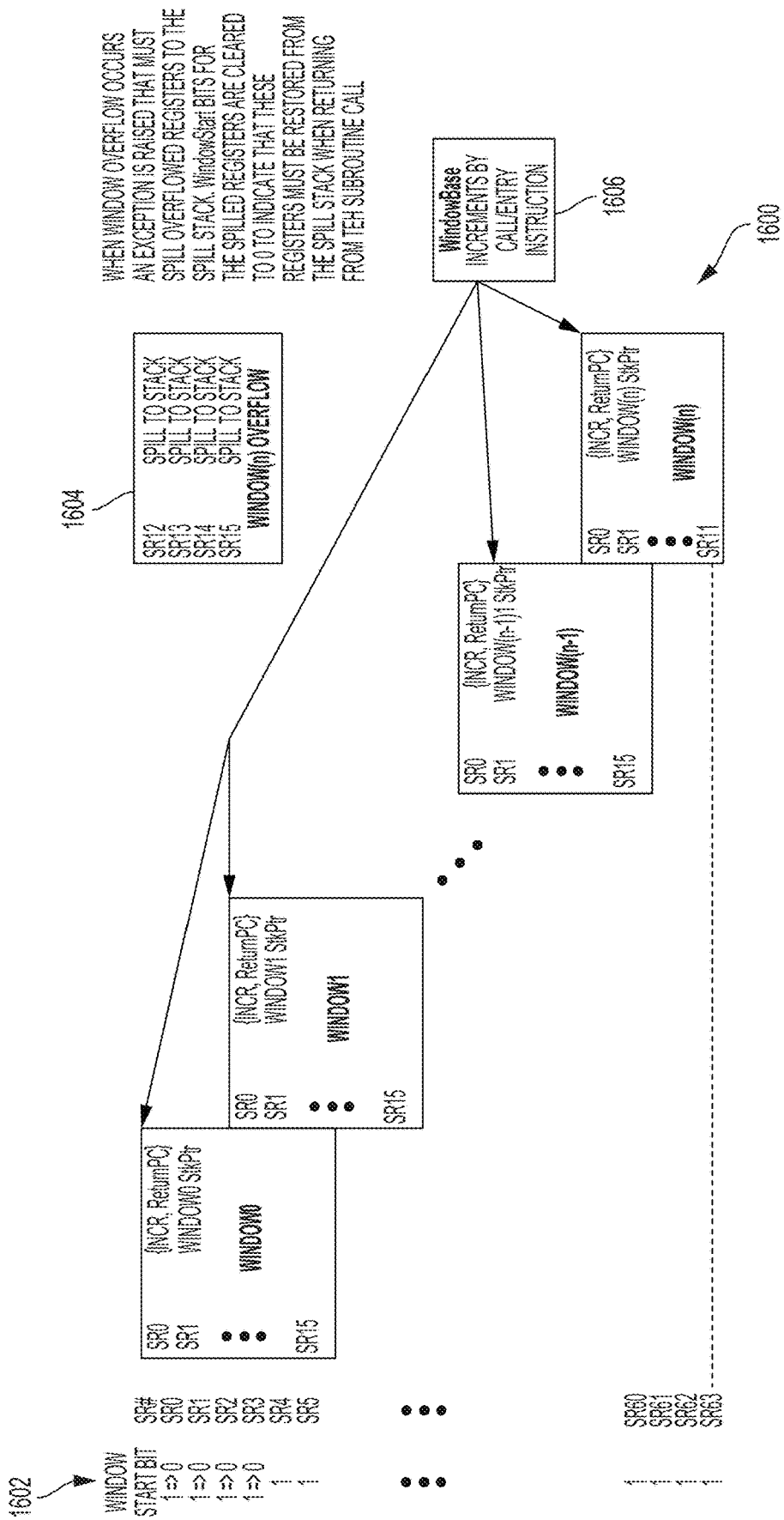
FIG. 16 is a view of example windows according to some embodiments.

FIG. 16 shows an example schematic of hardware registers implementing windowing according to some embodiments. The Scalar Register (SR) register file contains sixty-four, 32-bit registers (SR0-SR63). The SR register file is configured with 16-register access windows. Register windowing is an efficient way to manage registers between function calls by reducing the need to save and restore registers. Function calls can rotate the register window by 4, 8 or 12 registers, where this rotation increment is contained in the call opcode. There is always an overlap with the previous register window so that function arguments and return values can be passed in the overlapping registers. When rotating the register window, the new window may wrap around from 63 to 0 which causes a window overflow exception. The overflowed registers will need to be spilled to the stack before the subroutine can continue. When returning from a subroutine that has registers spilled to the stack, these registers must be restored before jumping to the return address.

When window overflow 1604 occurs, an exception is raised that must spill overflowed registers to the spill stack. Window Start bits 1602 for the spilled registers are cleared to 0 to indicate that these registers must be restored from the spill stack when returning from the subroutine call.

These are two example hardware registers that are used for register window control: (1) WindowBase [6:0] register 1606 holds the offset value needed by the hardware to access the correct SR register within a given window. For example, if WindowBase[6:0]=52, SR1 is actually SR(1+52)=SR53; and (2) WindowStart 1602 register is a 64-bit register where each bit represents whether that SR was spilled to the stack or not.

For the example shown in FIG. 16, when using register windowing, the following example assumptions are made concerning the use of the SR registers within the current 16-register window: SR0 of the current window holds the current increment value and the return address. SR1 of the current window must hold the current stack pointer (StkPtr).

There are three increments of the register window that can be made using CALL4/X4, CALL8/X8 and CALL12/X12 with increments of 4, 8 and 12 respectively. The reference "X" indicates the target address comes from a register while no "X" means the target address comes from the addition of the current PC plus an immediate offset.

The CALLn instruction sets the PS.INCR bits to "n", which is one of 4 states: 0, 4, 8 or 12. (PS=Miscellaneous Program State register). The PS.INCR may later be used by the ENTRY instruction which must be the first instruction executed by the subroutine being called. The CALLn instruction writes the increment n and the return address of the instruction following CALLn to SR(0+n) register, then the processor jumps to the target address. For example, CALL4 will save the increment of 4 plus the return address to SR4 then jumps to the target address. When the window rotates after the ENTRY instruction executes, the increment and return address will be held in SR0 of the new window.

As mentioned herein, ENTRY is the first instruction of all subroutines called with CALL4/X4, CALL8/X8 and CALL12/X12. This instruction is not used by a subroutine called by CALL0/X0. The example ENTRY instruction performs the following:

With the current WindowBase[6:0], read the StkPtrCur from SR1. Update the StkPtrNxt =
StkPtrCur − immediate_frame_size.
Update the new WindowBase[6:0] by the amount in PS.INCR.
With the new WindowBase[6:0], write StkPtrNxt to SR1.
Check for WindowOverflowException.
WindowEnd[6:0] = WindowBase[6:0] + 16
If WindowEnd[6]=1, then the window has overflowed.
If no overflow, continue executing instructions in the subroutine.
If overflow:
Save PC of instruction following ENTRY to EPC (Exception PC register)
Jump to the WindowOverflowException(n) handler where n is 4,8 or 12.

The example WindowOverflowException handler performs the following:

---

Read the current StkPtr from SR1.
If WindowOverflowException(4)
Need to check the lower 4 registers which are outside the previous window. These lower 4 registers will be SR12...SR15
Create WindowBasePlus12 ... WindowBasePlus15
If WindowBasePlus12[6] = 1, spill SR12 to stack pointed to by StkPtr and clear the WindowStartfWindowBasePlus12] bit
...
If WindowBasePlus15[6] = 1, spill SR15 to stack pointed to by StkPtr and clear the WindowStart[WindowBasePlus15] bit
If WindowOverflowException(8)
Need to check the lower 8 registers which are outside the previous window. These lower 8 registers will be SR8...SR15
Create WindowBasePlus8 ... WindowBasePlus15
If WindowBasePlus8[6] = 1, spill SR8 to stack pointed to by StkPtr and clear the WindowStart[WindowBasePlus8] bit
...
If WindowBasePlu15[6] = 1, spill SR15 to stack pointed to by StkPtr and clear the WindowStart[WindowBasePlus15] bit
If WindowOverflowException(12)
Need to check the lower 12 registers which are outside the previous window. These lower 12 registers will be SR4...SR15
Create WindowBasePlus4 ... WindowBasePlus15
If WindowBasePlus4[6] = 1, spill SR4 to stack pointed to by StkPtr and clear the WindowStart[WindowBasePlus4] bit
...
If WindowBasePlus15[6] = 1, spill SR15 to stack pointed to by StkPtr and clear the WindowStart[WindowBasePlus15] bit
Execute RFWO - Return from Window Overflow
Jump to address pointed to by EPC

---

The RETW returns from subroutines called by CALL4/X4, CALL8/X8 and CALL12/X12 and that had ENTRY as its first instruction. RETW performs the following:

---

RETW uses SR0[29:0] as the low 30 bits of the return address and. Bits 31 and 30 of the PC address of the RETW instruction is used as the high 2 bits of the return address. SR0[31:30] represents the window increment that was used to get to the current WindowBase.
Check to see if any registers were spilled:
If SR0[31:30] = 1 = an increment of 4
Check WindowStart[WindowBasePlus12...WindowBasePlus15] bits to see if any are cleared.
If SR0[31:30] = 2 = an increment of 8
Check WindowStart[WindowBasePlus8...WindowBasePlus15] bits to see if any are cleared.
If SR0[31:30] = 3 = an increment of 12
Check WindowStart[WindowBasePlus8...WindowBasePlus15] bits to see if any are cleared.
If none of the registers were spilled (i.e. all bits set to 1), the RETW performs the following:
Subtract the increment from the WindowBase.
Jump to the return PC address.
If any of the registers were spilled perform the following:
Save the PC address of the RETW instruction to EPC. When returning for the WindowUnderflowException(n) handler, the processor will re-execute the RETW instruction.
Use the increment "n" to jump to the correct WindowUnderflowException(n) handler.

---

The WindowUnderflowException handler performs the following:

---

Read the current StkPtr from SR1.
If WindowUnderflowException(4)
Need to check the lower 4 registers which are outside the previous window. These lower 4 registers will be SR12...SR15
Create WindowBasePlus12 ... WindowBasePlus15
If WindowStart[WindowBasePlus12] = 0, restore SR12 from stack pointed to by StkPtr and set the WindowStart[WindowBasePlus12] bit to 1.
...
If WindowStart[WindowBasePlus15] = 0, restore SR15 from stack pointed to by StkPtr and set the WindowStart[WindowBasePlus15] bit to 1.
If WindowUnderflowException(8)
Need to check the lower 8 registers which are outside the previous window. These lower 8 registers will be SR8...SR15
Create WindowBasePlus8 ... WindowBasePlus15
If WindowStart[WindowBasePlus8] = 0, restore SR8 from stack pointed to by StkPtr and set the WindowStart[WindowBasePlus8] bit to 1.
...
If WindowStart[WindowBasePlu15] = 0, restore SR15 from stack pointed to by StkPtr and set the WindowStart[WindowBasePlus15] bit to 1.
If WindowUnderflowException(12)
Need to check the lower 12 registers which are outside the previous window. These lower 12 registers will be SR4...SR15
Create WindowBasePlus4 ... WindowBasePlus15
If WindowStart[WindowBasePlus4] = 0, restore SR4 from stack pointed to by StkPtr and set the WindowStart[WindowBasePlus4] bit to 1.
...
If WindowStart[WindowBasePlus15] = 0, restore SR15 from stack pointed to by StkPtr and set the WindowStart[WindowBasePlus15] bit to 1.
Execute RFWU - Return from Window Underflow
Jump to address pointed to by EPC which jumps back to the RETW instruction. RETW will now complete without an exception.

---

This is an example illustration and other variations may be used to implement windowing techniques described herein.

Flush

The Flush operation may have the following example attributes. The ID observes the status of the ROB and ensures there are no more than 32 speculative instructions by halting fetch. The BPU resolves branches in-order, accepting one branch at a time and flushing as many branches as needed in one shot. The IIDX stack in the RF ensures that the IIDX gets properly handled during accept and flush operations. The ID block handles keeping track of the number of unresolved Branches, marks instructions as speculative when following a conditional branch, and adds a id.brid (Branch ID) to indicate which of the 4 branch level an instruction is associated with.

The following provides an illustrative example. The previous "RD IIDX Stack" section contains an illustration of a similar code sequence.

---

Assume
no unresolved branches
ROB index is picked by the ID and is denoted by iidx
Rdnum = Register Destination number
The address update for LD is not shown here for simplicity
R5 = R2 + R3
In ID, append to instruction: iidx=1 ; spec=0 ; brid=dontcare
In RF at R5 : busy=1 ; iidx=1
At ROB[1] : spec=0 ; brid=dontcare ; rdnum=5
...
LD R4
In ID, append to instruction: iidx=3 ; spec=0 ; brid=dontcare
In RF at R4 : busy=1 ; iidx=3
At ROB[3] : spec=0 ; brid=dontcare ; rdnum=4
BR R4 < R6
In ID, append to instruction: iidx=4 ; spec=0 ; brid=dontcare; branch=1
In RF, since input R4 is busy the pointer iidx=3 is returned which points to where R4 will be eventually written in the ROB.
Since branch=1, increment head of IIDX stack by 1, copy tail contents to head
Set curbrid=0
At ROB[3] : spec=0 ; brid=dontcare
Instructions following will be set speculative with brid=0
...
R5 = R2 + R3
In ID, append to instruction: iidx=7 ; spec=1 ; brid=0
In RF at R5 : busy=1 ; iidx=7
IIDX stack head has been incremented so previous iidx=1 is saved at the tail. The head now points to iidx=7
At ROB[7] : spec=1 ; brid=0 ; rdnum=5
...
BR R5 < R7
In ID, append to instruction: iidx=9 ; spec=1 ; brid=0; branch=1
In RF, since input R5 is busy the pointer iidx=7 is returned which points to where the most current R5 will be eventually written in the ROB.
Since branch=1, increment head of IIDX stack by 1, copy tail contents to head
Set curbrid=1
At ROB[9] : spec= 1 ; brid=0
Instructions following will be set speculative with brid=1
...
R5 = R2 + R3
In ID, append to instruction: iidx=11 ; spec=1 ; brid=1
In RF at R5 : busy=1 ; iidx=11
IIDX stack head has been incremented so previous iidx=7 is saved one below the head. The head now points to iidx=11
At ROB[11] : spec=1 ; brid=1 ; rdnum=5
...

```
LD R2
In ID, append to instruction: iidx=13 ; spec=1 ; brid=1
In RF at R2 : busy=1 ; iidx=13
At ROB[13] : spec=1 ; brid=1 ; rdnum=2
BR R2 < R7
In ID, append to instruction: iidx=14 ; spec=1 ; brid=1; branch=1
In RF, since input R2 is busy the pointer iidx=13 is returned which points to where R2 will be
eventually written in the ROB.
Since branch=1, increment head of IIDX stack by 1, copy tail contents to head
Set curbrid=2
At ROB[14] : spec=1 ; brid=1
Instructions following will be set speculative with brid=2
...
R5 = R12 + R13
In ID, append to instruction: iidx=17 ; spec=1 ; brid=2
In RF at R5 : busy=1 ; iidx=17
IIDX stack head has been incremented so previous iidx=11 is saved one below the head. The
head now points to iidx=17
At ROB[17] : spec=1 ; brid=2 ; rdnum=5
...
At some point in time R5 at iidx=1 is written to ROB and committed to the RF. Since the tail
points to iidx=1 for R5, the write is allowed. The tail does not move.
...
At iidx=20, brid=0 is resolved accepted
In ID, accept with brid=0 is sent to RF/ROB/BE's
In RF, the tail is increment by 1. For R5, the tail now points to iidx=7.
In ROB and BE's, set spec=0 for all entries with brid=0
...
At iidx=30, brid=1 is resolved flushed, which means brid=2 needs to be flushed as well.
In ID, flush with brid=1 and brid=2 is sent to RF/ROB/BE's
In RF, the head is decremented by 2 because there were 2 branches flushed. The head now
equals tail For R5, thehead/tail now points to iidx=7.
In ROB, set spec=0 and flush=1 for all entries with brid=1 or brid=2
In BE's, set spec=0 and ready=1 for all entries with brid=1 or brid=2
```

LD/ST Conflict

Storing is an example of committed data through register writing. The requirement that committed data can be used for the ST instructions, for example, may not sufficiently lead to the fact that these ST instructions using the committed data (register contents) are committed. A store instruction can use the data from the RWC that has not been written into the register file, and then write them into the memory. This is also a store-commitment. If the address-ROB is merged into the data-ROB, the ROB actually plays a role as a store-queue in which the store-effective-addresses are stored in term of lidx. The LD can be speculative and out-of-order if their effective addresses are not conflict with the effective addresses of any outstanding store instructions in the store-queue.

In some example, the LD/ST may be used rather than MOVE instruction to exchange AR (scalar register) and VR (vector register). The following provides an example:

SV128 VR7,R3;//(*R3)=VR7;

LD R7,R4;//R7=(*R4);R4=R3+3;

The example may move the 3rd lane of the VR7 into the R7. The ROB would detect LD/ST conflict so that the LD would not be sent to the memory until the ST is done. The pipeline is stalled. However, if the LD is speculated and the ST data is in the ROB, the ROB simply returns the 3rd lane of the 128-bit data to be stored to the R7.

Example Processor

Figure 17:
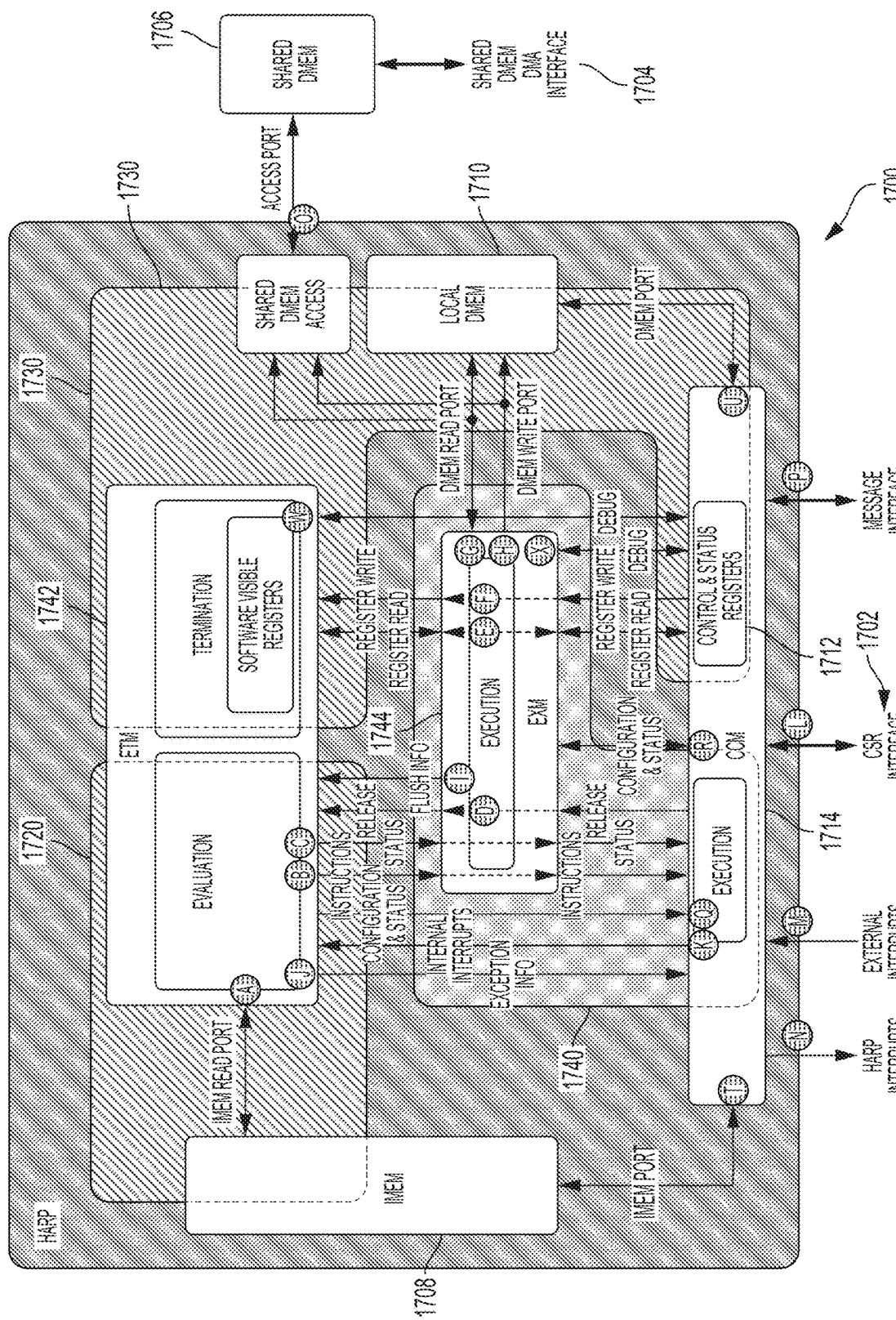
FIG. 17 is a view of an example processor according to some embodiments.

FIG. 17 illustrates a schematic diagram of an example processor according to some embodiments. The digital signal processor 1700 may be a high-performance asynchronous RISC processor with low-power technology to offer a high-performance processing unit, as an illustrative example. The processor 1700 may be used in a many-core configuration where the program is partitioned into multiple processes, with each process running on the processor 1700, for example.

In some example embodiments, a system may integrate many processors 1700 into the same ASIC. As such, the system may create a powerful, multi-core SoC that meets their system requirements. Processor 1700 architecture may provide a mesh connected network.

Compiler efficiency and developments relate closely with the instruction sets and a processor architecture. The processor 1700 architecture may be used to develop an efficient compiler.

The processor 1700 interacts with external agents through its CSR interface 1702, DMEM interface 1704 to a shared memory (DMEM) and external input interrupts. Program instructions are written to the IMEM 1708 during initialization through the CSR interface 1702. At any time, input data required by the program can be loaded to the shared DMEM 1706 using DMA transfers, accessible with load and store from the core. Output data generated by the program leaves the processor 1700 via the shared DMEM 1706. An instruction goes through, in order, Evaluation 1720, Execution 1730 and Termination 1740 stages. The evaluation stage fetches the instruction from the IMEM 1708. All necessary input operands are gathered from the local data memory 1704 or control and status registers 1712 in order to execute the instruction. Instructions are retired (terminated) when speculation is resolved and the results (if any) are written to the data memory or destination registers.

An instruction is deemed in-flight from the time they are dispatched to the EXM by the SBM until they are terminated. A temporary register is deemed in-flight from the time they are assigned to an instruction until they are committed to the IR or VR.

The term in-queue may be used to describe the state of the instructions from the time they are dispatched by the scoreboard unit to the CR queues until they leave the pre-fetch buffer in the EXM. An Integer Register (IR) may be 32-bit register for integer value. The term in-use may be used to describe the state of resources from the time they are assigned by the scoreboard unit until they are released. A Speculative instruction is an instruction which can cause a flush or an exception. Transaction may be an action of checking that specific conditions are satisfied, requesting a pulse to the pulse generator and sending source-synchronous data and clock downstream. A Vector Register (VR) may be a versatile 128-bit register holding. A VR can contain different values, such as for example, 32-bit floating-point value, 8×16-bit fixed or floating-point values, 4×32-bit fixed or floating-point values, and so on.

The following may be used to describe different sizes of a datum. Nibble for 4 bits; Byte (B) for 8 bits; Half-Word (HW) for 16 bits; Word (W) for 32 bits; Double-Word (DW) for 64 bits; Kilo Bytes (kB) for 1024 bytes (or 8192 bits).

The processor 1700 may support machine level privilege including Instructions to Access CSReg, Interrupt-Management Instructions, and CSR control and status fields for trap, timer and interrupt support. The processor 1700 may have 64 kB (TBD) instruction memory and 256 kB (TBD) data memory, for example, and memories may be byte-addressed and little-endian. The processor 1700 may support various register types. For example, processor 1700 may support 32 32-bit Integer Registers (IR), 32 32-bit Floating-Point Registers, where the bits [31:0] of the VR supports the floating-point registers, 32 128-bit Vector Registers (VR), where VR is SIMD registers holding floating-point, fixed-point or integer values; and Control and Status registers (CSR) 1712.

The processor 1700 may support precise exceptions and interrupts and single-stepping debug and provides observable states of processor 1700.

Example Usage Model

The processor 1700 may be a high performance, energy-efficient signal processing core that may be used in many core configurations.

In an example application, a processor 1700 is instantiated within a cluster, which controls and facilitates data movement to and from the processors 1700 within the cluster using a shared data memory. Multiple clusters compose a group, and multiple groups may be interconnected to provide a mesh of processing cores. Messages, DMA and router engines may allow full connectivity between processors 1700.

Instruction Life Cycle

An instruction enters the processor 1700 from the IMEM 1708. Instructions are loaded into the IMEM 1708 during initialization through the CSR interface 1702. The content of the IMEM 1708 does not change during program execution. Once the IMEM 1708 is loaded, the processor 1700 can be configured to start through a configuration register.

Once enabled, the processor 1700 becomes autonomous and the program is executed. When enabled, the processor 1700 configuration registers can be modified with CSR read and write instructions or via the CSR interface 1702, except of the debug mode, IMEM 1708 and DMEM 1706 content. Once disabled, the processor 1700 may stop fetching new instructions. The processor 1700 activity status confirms when the core is idle.

Inside the processor 1700, an instruction goes through three phases of its life cycle: evaluation 1720, execution 1740 and termination 1730. The evaluation stage 1720 and termination 1730 may be implemented using an Evaluation and Termination Unit (ETM) 1742 along with other components. The execution stage 1740 may be implemented using an Execution Unit (EXM) 1744, along with other components. These will be described in detail herein.

Evaluation

The life of an instruction starts when it is fetched from the IMEM 1708. The first phase of the life cycle is evaluation. During this phase, the following example functions are performed: Instruction fetch from IMEM 1708; Program Counter management; Instruction evaluation for Instruction opcode decoding, Register ID of the input operands, Register ID of the output destination, Integer or Vector operations, Branch and Jump functions; and Resource assignment. The instruction leaves the evaluation phase when all resources required by the instruction are ready. Accordingly, processor 1700 may have an evaluation unit (e.g. ETM 1742) with various components for implementing aspects of the evaluation stage 1720.

Execution

Once an instruction is evaluated, it may be dispatched to the execution phase. There are various types of execution units within the processor 1700 for different types of instructions. They can be divided into different categories: Integer, Vector, Branch, Jump/System and Load/Store. Integer execution units handle all integer instructions as well as bit-manipulating instructions. Vector units execute all single instruction multiple data (SIMD) instructions plus conversion instructions between integer and floating-point formats. The Branch and Jump unit handles all conditional and unconditional instructions that may impact the program counter. The Load/Store execution unit handles the DMEM related load and store instructions.

Instruction execution in the processor 1700 may be speculative. This means that the results may be computed and available before the state of the program is fully resolved. The processor 1700 execution units operate on the operands once all inputs are ready. The result of the execution is stored temporarily in local storage within each of the execution units. Depending on the resolution of the speculative instructions, the results of the instructions may continue into the Termination phase or may be discarded without changing the register or data memory contents. Accordingly, processor 1700 may have an execution unit (e.g. EXM 1744) with various components for implementing aspects of the execution stage 1740.

Termination

The last phase of an instruction within the processor is Termination. An instruction can be terminated in several ways. For example, instructions can be terminated when the speculation decision was resolved as incorrect. In this case, the results from the execution of the instructions will be discarded. As another example, for instructions where the speculation was resolved, the instructions are terminated when the temporary results from execution units are moved into the software-visible registers, the Integer Registers (IR) or Vector Registers (VR). Floating-point registers are a subset of the VR. In the case of Store instruction with correct speculation, the instruction is terminated when the store data are sent to the DMEM. Branch/jump instructions are terminated when the branch or jump decision is resolved. Register updates occur for jump instructions. Accordingly, processor 1700 may have a termination unit (e.g. ETM 1742) with various components for implementing aspects of the termination stage.

Instruction Set

The processor 1700 supports the different example instructions. The processor 1700 supports vectorized floating-point instructions, where multiple floating-point operands are processed in parallel. The floating-point instructions are executed using a subset of the vector resources and calculation units.

Memory

There are two main memories embedded in the processor, an Instruction Memory (IMEM) 1708 and a Data Memory (DMEM) which includes both a local DMEM 170 and a shared DMEM 1706 (with access port and shared DMEM DMA interface 1704).

The IMEM 1708 and DMEM (local DMEM 170 and a shared DMEM 1706) are accessible by an external agent during the core initialization phase through the processor CSR interface 1702. Once the core operation is enabled, the memories read and write ports become dedicated to the program execution. The memory content remains available via the CSR interface 1702 if the core is idle.

Instruction Memory

The processor 1700 has a dedicated IMEM 1708. Instructions in IMEM 1708 are considered static. Accesses to the IMEM 1708 are address-aligned to 32-bit word boundaries. For an IMEM size of 64 kB (TBD), the maximum processor 1700 program length is 16 k 32-bit instructions, for example. IMEM 1708 may support 64-bit data read or write accesses to a 64-bit aligned address.

Data Memory

The processor 1700 supports two distinct DMEM 1706/1710 ports. The processor 1700 can be connected to a dedicated scratch pad or local memory 1710 and/or a shared memory 1706. The shared data memory 1706 allows data movement between multiple cores while the local DMEM 1710 may be used to store intermediate calculation results.

The processing core uses load and store instructions to access any of the data memories. The memory address differentiates between the scratch pad and shared memories. The scratch pad memory provides fast, deterministic read and write delays while the shared memory access latencies depends on the arbitration outcome for multiple simultaneous access requests to the memory but provides additional flexibility and sharing.

As an example, DMEM 1706/1710 may support 128-bit data read or write accesses to a 128-bit aligned address, with a 16-bit byte write enable.

Registers

The processor 1700 supports different register types. An example is Integer Registers. In an example, the processor 1700 has a set of 32 32-bit registers, termed Integer Registers (IR). The IR are software visible and contain 31 general-purpose registers x1-x31. Register x0 is hardwired to a constant 0 and cannot be modified. IRs support integer and binary formats for example. To support SIMD, the processor 1700 has a set of 32 128-bit registers, termed Vector Registers (VR). VR are software-visible and referenced as v0-v31. VRs support half-precision floating point, single-precision floating point, fixed point, integer and binary formats for example. Software is responsible for the format of the content of a VR when it uses the register. When the processor 1700 executes an instruction with VR as operands, it does not check the format of the contents. The processor 1700 assumes that the formats of the content and that of the instruction match.

The VR are used as floating-point registers, f0-f31. When used as floating-point registers, the f0-31 register space is an overlay of the least significant bits of the v0-31 vector registers. In other words, a vector load instruction into v5 will overwrites the content of f5 as well; or a floating-point load instruction into f10 will overwrites the 32 LSB of v10 (the upper 96-bits of v10 must be ignored). New instructions to map integer register content into any of the floating-point data set within a vector register are considered as part of the processor custom extension.

The processor 1700 implements multiple Control and Status Registers (CSR) to configure and control the operation of the core and monitor its status. All CSR fields are software-visible and accessed using CSR instructions. The processor 1700 also provides read and write accesses to these registers through its CSR interface.

As a speculative processor, the processor 1700 contains temporary registers to avoid changing the software-visible registers prematurely. Temporary registers are not visible by the program and cannot be assigned by software. The usage of these registers is governed by hardware within the processor 1700. The temporary registers are observable via the debug interface. Each execution unit has its own set of temporary registers. During the evaluation phase, the processor 1700 assigns a virtual temporary register (VTR) to hold the result of an instruction. This VTR remains associated with its instruction until it is terminated. The VTR may be re-assigned to a new instruction. Virtual temporary registers allow the processor 1700 to oversubscribe the physical temporary register assignment. Each virtual temporary registers can be uniquely identified with a VTR ID: 1-bit oversubscription ID (assuming 2:1 virtual to physical oversubscription) and physical temporary register ID.

Timers and Watchdog

The processor 1700 supports the following 64-bit timers: CYCLE: Number of fetched instructions, including speculative instructions; TIME: Integer value corresponding to the wall-time clock real time period; and INSTRET: Numbers of instruction retired by the core.

All timers are cleared when the core is in reset. When read, the timers are not reset. Therefore, the value read must be compared against its previous read value to determine the number of events (CYCLE, INSTRET) or real time (TIME) over the last observation period.

The processor 1700 implements a watchdog timer to monitor the activity of the core. The watchdog timer increments using a wall-time clock and its value is compared against a configurable threshold. An interrupt is generated when the watchdog value reaches the threshold.

The TIME and watchdog timers may use a divided version of an IMEM clock to keep track of the time. Multiple clock divider ratios (1, 4, 32, and 128) are available.

The watchdog timer detects unexpected fatal conditions in the core (like a deadlock condition). It is intended to be periodically monitored by software and its threshold set accordingly to prevent the interrupt. The watchdog interrupt, considered fatal, is forwarded to the processor interrupt output to request assistance from an external agent.

Exceptions

An exception is an unusual condition occurring at program run time. When an exception happens, the processor 1700 immediately stops its program execution and enters the exception handler routine.

The processor 1700 supports a precise exception mode. All pre-exception instructions are executed and terminated normally. The processor 1700 register state is updated by these pre-exception instructions. The instruction responsible for the exception is not terminated and requires assistance from the exception handler. Any in-flight instructions following the exception could be executed but are not be terminated, therefore, do not alter the processor register state.

The processor 1700 supports the following example exceptions: DMEM address violation (e.g. Out-of-range; Misaligned); IMEM address violation (Out-of-range; Misaligned); IMEM data integrity violation (ECC error); Illegal instruction; System call instruction (SCALL); System break instruction (SBREAK); and Instruction Trap.

A trap refers to the transfer of the information associated with an exception into a software-visible register. A trap happens when an exception is detected.

Instruction Trap

The processor 1700 handles specific complex instructions. When those instructions are evaluated by the core, a trap is generated and the exception handler is called.

The list of instructions resulting in a trap may be integer division, floating-point division, and floating-point square root.

Exception Handler

An exception is associated with an instruction. The processor 1700 processes the exception(s) in-order, based on the program execution. If multiple instructions generate exception simultaneously, only the oldest instruction is considered. All other exceptions are ignored.

When an exception is detected within the processor 1700, the program enters the exception handler. The processor 1700 supports a configurable machine trap vector base address register that holds the IMEM location (program count) of the exception handler.

The memory address of the instruction responsible for the exception is saved in the machine exception program count register and the machine cause register is set according to the exception cause.

Based on the severity of the exception, the exception handler decides on the course of actions required to resume the processor 1700 operations. For non-fatal exception as SBREAK, the exception handler can resume the program execution at the exception PC and four. For fatal exception, the exception handler could request external assistance to reset and re-initialize the core.

Interrupts

An interrupt refers to special events happening inside or outside of the processor 1700. These events are caused by an error condition or a normal, informational, event that requires attention. As opposed to exceptions, interrupts are not associated to any instruction from the program under execution. When the core execution is interrupted, the current program count must be preserved when entering the exception handler, and restored when exiting.

An interrupt monitors the activity on an event (interrupt source) and holds a pending state until the interrupt is serviced. The exception handler's interrupt service routine is responsible to identify the pending interrupt source(s), their severity level and process them.

The processor 1700 supports the following interrupt sources: internal interrupts, external interrupts, general-purpose interrupts), messages or doorbells (from other processors in the same cluster), and doorbell status clear.

The doorbell status clear interrupts (one per doorbell) can be used by the source processor instead of polling the doorbell status until it is cleared at the destination processor.

For maximum flexibility, all interrupts may be maskable. The interrupt mask does not affect the interrupt pending state. A mask simply prevents a pending interrupt to trigger a consequential action (such as entering the exception handler, unlocking the WFI instruction or changing the output interrupt status).

The processor 1700 provides dedicated interrupt masks for every internal interrupt usage.

For example, Core Interrupt may stop the program execution and enter the exception handler. WFI Interrupt may unlock the Waiting-For-Interrupt (WFI) instruction and resume the program execution. Output Interrupt may assert the processor output interrupt.

Core Interrupt

The processor 1700 generates an internal core interrupt signal that combines all pending interrupts with a set of masks. The core interrupt mask should be set by software according to the priority of each interrupt source. Only high-priority interrupts should be allowed to assert the core interrupt and call the exception handler.

The core interrupt forces the ETM instruction decode stage to insert a flag and dispatch the next instruction to the EXM branch resolution unit. Since that instruction is not executed when the exception handler is called, the program count of that instruction is saved. The instruction is only re-evaluated after the interrupt service routine completed and the exception handler resumes the program execution.

The processor 1700 evaluates the core interrupt and enters the exception handler routine according to the machine trap vector base address. When the exception handler is called, the core interrupt is automatically masked by hardware (using a global core interrupt mask in the CSR) to prevent the exception handler from being interrupted. Before exiting the exception handler, the global core interrupt mask must be manually re-enabled by the program.

The exception handler uses the machine cause register to determine the type of event(s) responsible for entering the exception handler routine. If the cause is an interrupt, the exception handler starts its interrupt service routine and reads the pending interrupt statuses to determine which source to service. The interrupt service routine only clears the serviced interrupt and keeps the other pending interrupts for later processing.

Since the processor 1700 provides a pending interrupt register to determine the interrupt status, the exception code field of the cause register is unused and always set to an all-1s value (reserved) on an interrupt.

The program count of the instruction superseded by the interrupt flag is saved in the machine exception program count register and the machine cause register is set with the interrupt flag. The exception handler resumes the program execution at the exception PC. The exception handler preserves the pre-interrupt processor register context and restores it when exiting its routine.

Output Interrupt

The processor 1700 provides an output interrupt pin. This interrupt pin uses its own interrupt source mask. If the processor is stalled or deadlocked, the expiring watchdog timer uses this pin to request assistance from an external device or agent. Other interrupt sources that cannot be serviced locally by the exception handler routine running on the processor could also activate the output interrupt pin by setting the mask accordingly.

The exception handler running on the core would set the software interrupt pending and activate its mask on the output interrupt pin. The device or agent connected to the processor output interrupt signal is responsible to clear the interrupt status by clearing the pending software interrupt through the CSR interface.

Wait-for-Interrupt

The Wait-For-Interrupt (WFI) instruction is used to synchronize the processor 1700 to a specific event. In a scenario of a data transfer between two processors, the receiving processor program would reach the WFI instruction and stop. When the transmitting processor has the data ready, it sends a doorbell (interrupt) to the receiving processor, which resumes the program execution. The WFI instruction is also used to transfer the control to a debugger is a software breakpoint is reached.

When a WFI interrupt is executed by the core, all post-WFI instructions are flushed and the core stops fetching new instructions from the IMEM. Eventually, all pre-WFI instructions are terminated and the core becomes idle. The processor creates an internal WFI unlock interrupt signal (with its own set of interrupt masks) to unlock the core and resume the instruction fetch mechanism.

The WFI interrupt mask must be set (with a CSR write instruction) before the WFI instruction is executed to allow one (or multiple) interrupt event(s) to unlock the core.

The interrupt source that unlocks the core still needs to be serviced and cleared by the exception handler. Therefore, the core interrupt mask has to minimally include the same WFI unlock interrupt source(s). Once unlocked for the WFI instruction, the core enters the exception handler, the pending interrupt(s) is cleared and the program resumes at the instruction following the WFI instruction.

The Control Status Register Interface

The CSR interface 1702 has access to all processor configuration, control and status register. The interface is controlled by an external agent (or device). It is mainly used to initialize the core and run debug operations.

The interface uses a source-synchronous protocol. The read or write requests originates from the external agent (master). The processor (slave) returns the register data (source synchronously) and update one of the register content on a read and write access respectively.

The term CSR may be used to describe the CSR and custom processor configuration, control and status registers Control and Configuration Unit (CCM)

The CCM 1714 provides the processor registers for control, configuration and status monitoring. The CCM 1714 implements the Control and Status Registers (CSR) as well as additional custom processor registers. Those registers can be accessed in read and write by instructions from the program. The processor 1700 provides access to its control, configuration and status register space via the CSR interface 1702. The CCM 1714 also handles interrupt, timer and counter logic, and implements several debug features.

Example features of the CCM 1714 including: providing the reset logic to the processor core and memories; implementing a number of configuration, control and status registers (CSR), including a subset of the Control & Status Registers (CSRs) and custom processor configuration, control & status registers; providing CSR read and write access to a program running on the processor (internal access) or to an external agent (through the CSR interface); providing external read and write accesses to the IMEM for writing the program during the initialization phase; providing external read and write accesses to the DMEM to initialize the data memory if required; Manages interrupts, timers and counters; providing special debug features and ports; The IMEM and DMEM content can only be modified when the core is idle; reading access to the integer and vector registers through its CSR interface; writing access to the processor integer and vector registers is supported using the DMEM and load instructions.

Instruction Memory Controller

Figure 18:
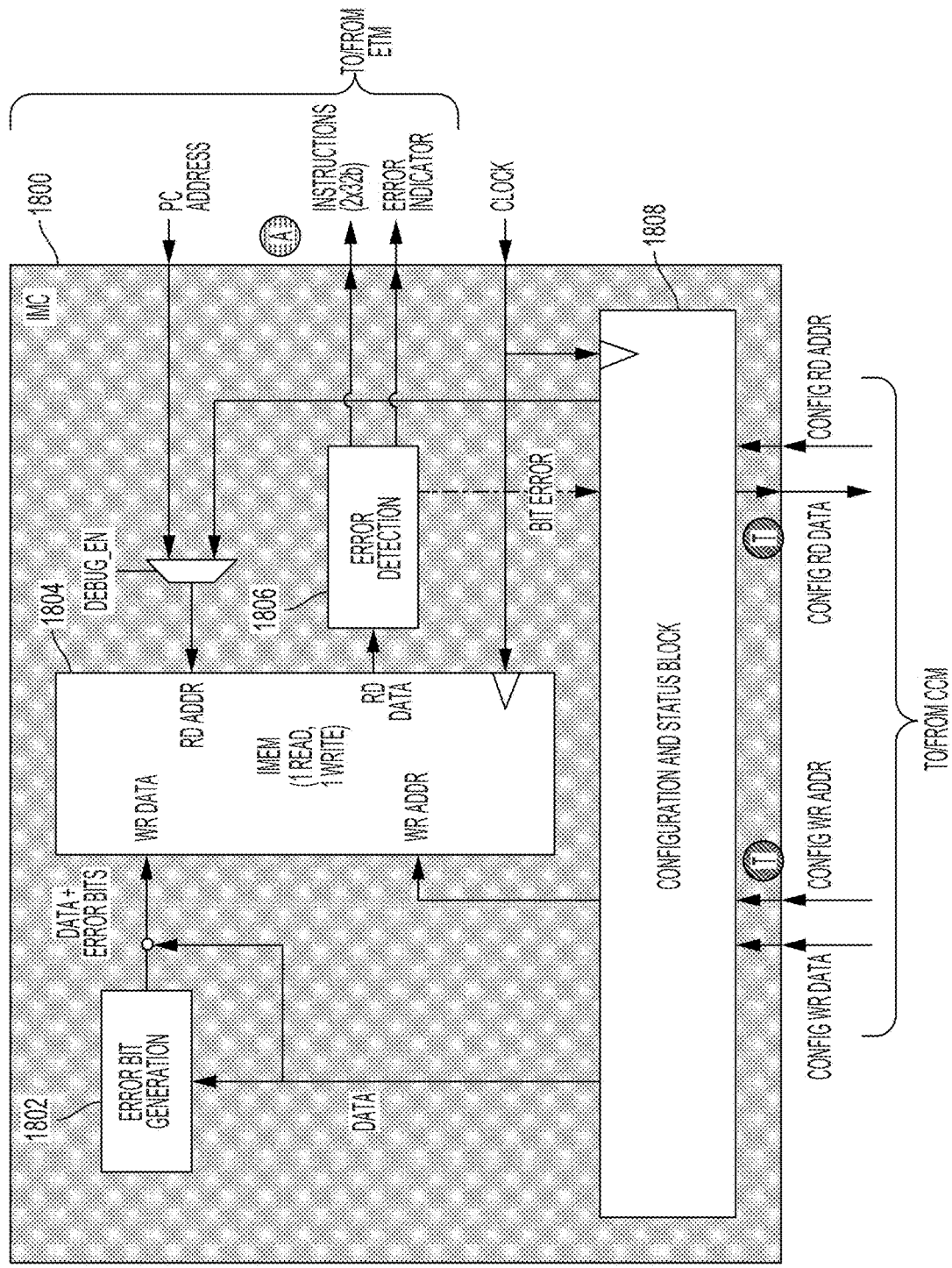
FIG. 18 is a view of an example instruction memory controller according to some embodiments.

FIG. 18 shows a schematic diagram of an Instruction Memory Controller (IMC) 1800 with an error bit generation unit 1802, IMEM 1804, error detection unit 1806 and a configuration and status block 1808. The IMC contains the IMEM 1804 that holds all processor instructions. It controls the accesses to IMEM by the CCM and Evaluation and Termination Unit (ETM), which are the only units that have direct connections to IMC 1800. The memory and the interface to the IMC 1800 also operates on the same clock domain The IMC 1800 provides one read and one write ports to the IMEM 1804. The ETM sends read requests to IMC 1800 for retrieval of instructions. The IMC 1800 performs dual-instruction fetch from the IMEM 1804, providing up to two 32-bit instructions at a time. The CCM sends read or write requests to the IMC 1800 to load instructions into IMEM 1802 and verify its content.

The IMC 1800 is a memory controller that allows the ETM to extract instructions from the IMEM 1804 and the CCM to read and write instructions in the IMEM 1804. The instructions are received through the CSR interface of the processor and are passed to the IMC. The IMC gathers the instructions and write them into the IMEM 1804. Error code bits are added with the instructions to support error detection when the instructions are retrieved by the core.

The CCM and ETM ports may be mutually exclusive. The CCM provides a configuration mode to select one of the interfaces.

IMEM Write Access

A user loads instructions to the IMEM 1804 through the processor configuration interface. These instructions are formatted into write accesses to the IMEM 1804 by the IMC. The IMC supports only static update of the IMEM 1804. It means that content of the IMEM 1804 cannot be modified when a program is running. If a user attempts to write into the IMEM 1804 during a program, the processor behavior is un-deterministic and may result in the corruption of the program.

Instruction Fetch

The ETM fetches instructions from the IMEM 1804 by sending an address corresponding to the program count. The address is 64-bit aligned to double-word boundaries (the lower 3 bits of the address are always zero). The IMC 1800 does not perform range or alignment checks on the address received from the ETM.

The IMC 1800 retrieves 64-bit data and the associated error code word from the memory on every read request. The data contain two 32-bit instructions. The instruction located in the lower 32-bit will be executed before the instruction in the upper 32-bit.

Error Detection

The data integrity is checked for bit error before being sent to ETM or CCM. No error correction is performed. When no bit error found, the associated error code bits will be stripped and the two instructions are sent to the ETM without error indication. If an error is detected, the error will result in an exception by the processor in normal operation. The IMEM 1804 address associated to the error is preserved. For debug purposes, an external agent can read the error data using the CCM port.

Flow Control

The IMC 1800 does not backpressure to the ETM. It accepts all read requests from the ETM and returns the corresponding read data three cycles later. Similarly, the IMC does not receive backpressure from ETM. When the instruction data is retrieved from the IMEM 1804, the IMC 1800 sends it to the ETM unconditionally.

When the processor is idle, the IMEM access mode may be changed.

Evaluation and Termination Unit (ETM)

Figure 19:
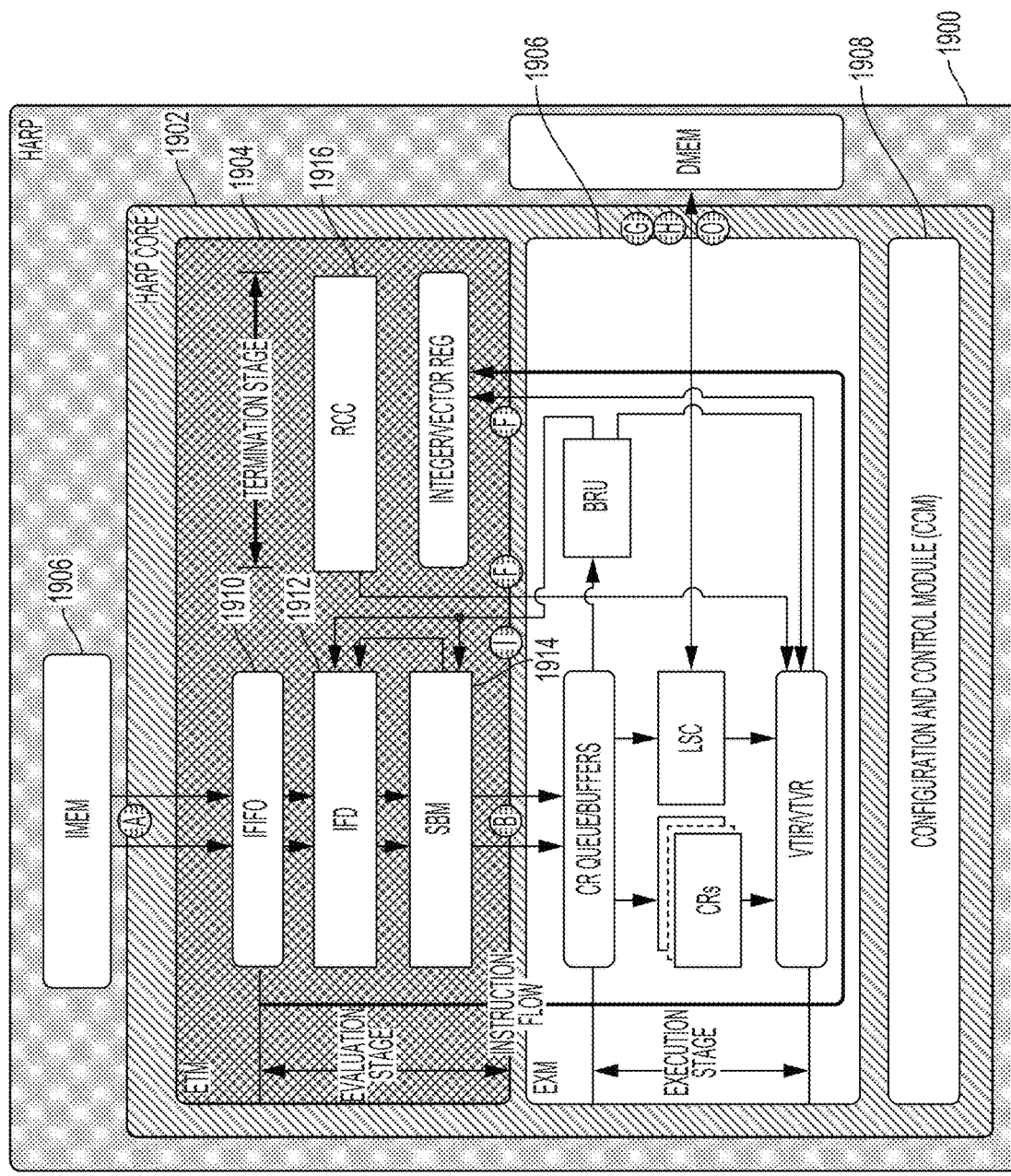
FIG. 19 is a view of an example evaluation and termination unit according to some embodiments.

FIG. 19 provides a schematic of the processor 1900 with a core unit 192 having an Evaluation and Termination Unit (ETM) 1904, an Execution Unit (EXM) 1906, and the CCM

1908. The ETM 1904 processes the first and the last phases of instruction lifecycle in the processor 1900. The Instruction Fetch and Decode unit (IFD) 1912 and the Scoreboard unit (SBM) 1914 implement the required functions for the instruction evaluation phase while the Register Commit Controller (RCC) 1916 handles the instruction termination. The ETM 1904 may be implemented as an evaluation unit and a separate termination unit in some example embodiments.

The processor 1900 implements a dual instruction fetch mechanism. After the core initialization and reset de-assertion, the IFD 1912 sends read requests to the IMEM Controller (IMC) 1906 to read the content of the instruction memory starting from the initial value of the program counter. The IFD 1912 fetches two instructions at a time and writes them into the Instruction FIFO (IFIFO) 1910.

During the evaluation phase, the two instructions at the head of the IFIFO 1910 are decoded. As a part of instruction decoding, the IFD 1912 determines the resource requirement (i.e. calculation resources required, temporary register required) for the instructions to be distributed and executed. In the parallel, the SBM 1914 advertises the resource availability to the IFD 1912. When there is a match between resource requirement and the resource availability, the IFD 1912 extracts both instruction from the instruction bundle at the head of IFIFO 1910 and forwards it to the SBM 1914. Instruction cannot be sent independently.

The SBM 1914 is a centralized control unit for the processor core 1904, and is responsible for resource management, instruction dependency tracking, and instruction flow control. When it receives an instruction bundle from the IFD 1912, the SBM 1914 assigns an instruction tag to each instruction, determines the source input dependency, allocates the required resources and sends the decoded instructions along with resource usage and flow control information to the Execution unit (EXM) 1906.

During the termination phase, the Register Commit Controller (RCC) 1916 sends commit requests to the temporary register read ports to commit the instruction results to the destination integer, floating point or vector register. The branch and jump instructions terminate in either a flush or release of the branch speculation. In the case of store (ST) instructions, the instruction termination is handled by the Load and Store Controller (LSC). The BRU and LSC functions are detailed in the Execution Unit (EXM) section.

The ETM consists of the following example components. The IFD 1912 Performs instruction fetch, decode, and resource availability checking functions. The SBM 1914 Performs resource management, source input dependency tracking, and instruction flow control and status update. The RCC 1916 controls the instruction results commit order. Integer Register (IR) is 32-bit general purpose integer register-set. The Vector Register (VR) is 128-bit general purpose register-set which encompasses the 32-bit floating point registers (FR) in the lower 32-bits processor.

Performance

The IFD supports dual instruction from the IMEM. The instruction distribution and execution rate depends on the source input dependency and the resource usage of the instructions. The distribution rate can be optimized through compiler optimization (i.e. by minimizing the instruction inter-dependency and maximizing parallel use of available resources.) Due to the speculative nature of processor, the instantaneous instruction commit rate will increase or decrease depending on the outstanding speculative instructions.

Example Functions

The evaluation unit of the ETM handles the following example functions: Instruction fetch and decode; Resource management; Source input dependency tracking; Instruction distribution to the EXM.

The termination unit of the ETM processes the following example function: Integer and vector register commit control.

Instruction Fetch and Decode Unit (IFD)

Figure 20:
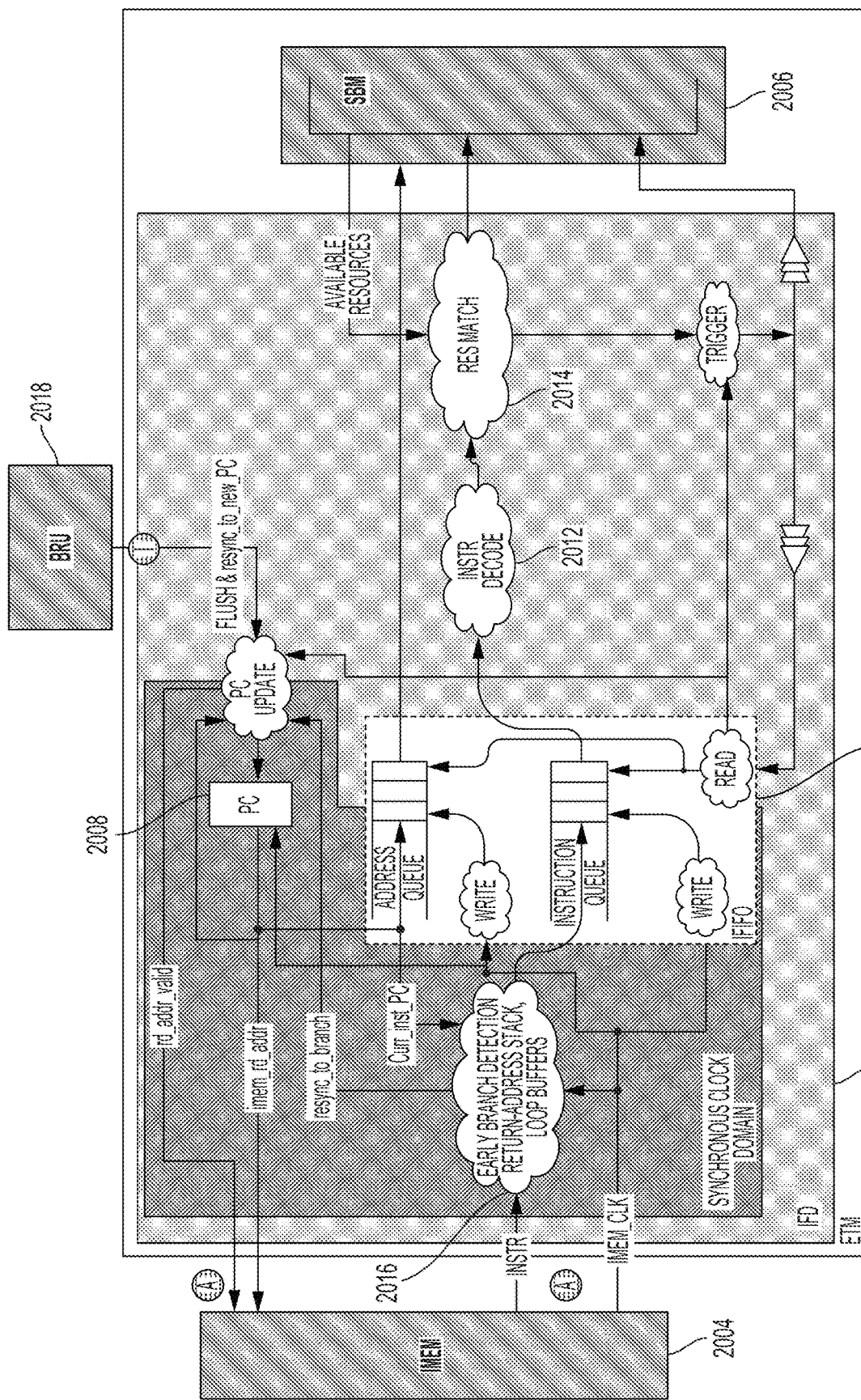
FIG. 20 is a view of an example instruction receive and decode unit according to some embodiments.

FIG. 20 shows an example schematic of the Instruction Fetch and Decode Unit (IFD) 2002 of the ETM 2000. The IFD 2002 fetches instructions from the IMEM 2004, decodes the fetched instructions, and evaluates the availability of the resources required before forwarding the instructions to the Scoreboard unit 2006. The IFD 2002 includes the program counter 2008, the instruction FIFO (IFIFO) 2010, the instruction decoder 2012 and the resource matching logic 2014. The IFD 2012 may also include the early branch prediction for branch support 2016 with the return address stack for function call support and the loop prediction buffer for loop support.

Program Counter

The program counter 2008 holds the address of the next instruction bundle that will be fetched from the IMEM 2004. The address corresponds to the program count. The program counter 2008 is set to zero upon reset. The program counter 2008 is updated either by the new target program count supplied by the BRU 2018 on a flush/exception or by the early branch detection logic when a branch/jump is predicted as "taken". Otherwise, the program count is incremented by 8 (IMEM 2004 is byte addressable) for normal instruction flow. If the program counter 2008 rollovers, the IFD 2002 will not raise any flag or exception. Similarly, when the program counter 2008 value is updated by the BRU 2018, the IFD 2002 does not perform any range check on the new program count and assumes that the BRU 2018 performed an IMEM 2004 range and alignment check.

Next instruction address values sent out to the IMC (Instruction Memory Controller) are always aligned to double-word (DW) boundaries. When the IFD 2002 receives a new flush request from the BRU 2018 with a program count aligned on a 32-bit boundary (but not DW-aligned), the IFD 2002 detects this condition. The word-aligned target program count is converted into a DW-aligned memory address before being sent out to the IMC.

The program counter 2008 is clocked by the IMEM 2004 periodic clock. However, the address supplied by the BRU 2016 is delivered to the IFD 2002 with a clock pulse. A rising edge on this clock indicates a flush request and the target program count is re-sampled into the IMEM 2004 clock domain as the new target address for the program counter 2008. For example, this may use an asynchronous clock.

The WFI (Wait-for-Interrupt) instruction causes the processor to stop the current program execution and wait for an external event before resuming.

When a flush request results from the execution of a WFI instruction, the BRU 2016 also signals the IFD 2002 to stop fetching new instructions (WFI_halt signal). The IFD 2002 re-synchronizes the program counter 2008 to the new target program count provided by the BRU 2016 and monitors the interrupt that unlock the WFI instruction.

The instruction fetch resumes upon the detection of the interrupt event. If operating in debug mode, the instruction fetch will only resume on the rising edge of the debug launch signal, controlled by the external debugger via the processor external interface.

The IFD 2002 supports a single step debug mode that fetches, evaluates, executes and terminates one instruction at the time. In this mode, the program counter is forced to wait for a debug launch signal before every instruction fetch.

Since the IMC is dual-instruction fetch, the program counter 2008 increments by four and alternates between read request for slot #0 (invalidating slot #1) and for slot #1 (invalidating slot #0), based on the current value of the program counter 2008.

Instruction Fetch

Until the IFIFO 2010 is full, the IFD 2002 sends to the IMC a read request with the value of the program counter. The IMC responds to each request by returning a 64-bit data chunk representing two consecutive 32-bit instructions (also called an instruction bundle) along with an error flag. If an data error is detected, the IFD 2002 marks both instructions in the bundle as invalid and will not perform any resource matching for these instructions. Further, the IFD 2002 signals an IMEM data error exception to the Scoreboard unit 2006. The two instructions along with the error flag will be forwarded to the Scoreboard unit 2006 that will send the appropriate exception request to BRU 2016.

The processor may expect that each instruction bundle in the IMEM 2004 is covered with error detection code word capable to detect one or multiple bit error in the memory content. Detected errors are not corrected and generate an exception in the core.

The IFD 2002 assumes that the IMC processes the read requests in order. The program count sent out to the IMC are also stored immediately (i.e. without waiting for the data to return) into an 8-deep address queue using the periodic memory clock.

The instruction bundle returned by the IMC (labeled slot #0 for the lower 32-bit and slot #1 for the upper 32-bit) is stored in an 8-deep instructions queue using the periodic memory clock.

The address and instructions queues together are referred to as the IFIFO 2010. The address and instructions queues share the same read pointer but have independent write pointers. The common read pointer is incremented each time an instruction bundle is transferred to the Scoreboard unit 2006.

IFIFO

When monitoring the IFIFO 2010 full level, any in-flight read requests are accounted for, as the IMC will return with instruction data. The instruction queue must be able to accept any incoming data without overflowing. For the IFIFO 2010 empty level, only the instruction queue is considered.

The IFD 2002 stops sending read requests to the IMC if the IFIFO (address queue) is full. Similarly, the IFD 2002 stops sending instruction to the Scoreboard unit 2006 if the IFIFO 2010 (instruction queue) is empty.

When the IFD 2002 sends out an instruction request to IMC with a DW-aligned memory address derived from a word-aligned memory address (i.e. when the address received from the BRU 2018 was not DW-aligned), the instruction located in slot #0 of the IMC response bundle is marked as invalid in the IFIFO 2010. This instruction will not be evaluated by the downstream logic (i.e. no resource matching will be performed for the instruction residing in slot #0).

Along with the instruction data, the associated program count 2008 from the address queue is also forwarded to the Scoreboard unit 2006.

Instruction Flush

The IFD 2002 receives a flush signal and a new program count from the BRU 2016 when a program discontinuity occurs.

When it receives a flush signal, the IFD 2002 deletes all the instructions in the IFIFO 2010 by moving the write pointer of the instruction queue to the read pointer location. The pointers of the address queue are also re-aligned.

Then, the IFD 2002 sets the program count to the new target program count received from the BRU 2018 and starts fetching new instructions immediately. Post-flush read requests are added to the address queue. Instruction bundles received from any in-flight read requests launched before the flush request are discarded. Only the received instruction data from post-flush read request are stored in the instruction queue.

Early Branch/Jump Detection

In order to reduce the flush penalty incurred when a branch is taken, the IFD implements Early Branch Detection (EBD) 2016. In essence, the EBD 2016 detects backward branches within the instruction bundle coming from the IMEM 2004 and predicts that backward branches are always taken. The EBD 2016 computes the taken branch target address and triggers re-synchronization of the program counter 2008 to the new branch program count destination. Branch instructions are forwarded to the downstream logic along with a prediction bit indicating whether the branch was predicted as taken (P=1) or not taken (P=0). The BRU 2016 evaluates and confirms the prediction bit and generates a flush only when the early prediction was wrong. The BRU 2016 also performs the target program count range and alignment checks on the branch target program count.

The EBD 2016 introduces one additional clock cycle latency between the time when the instructions are received from the IMEM 2004 and the time when the instructions are written to the IFIFO 2010. A configuration field enables the EBD 2016. When disabled, the EBD 2016 is bypassed. The prediction bit is therefore always 0 (not taken).

Conditional Branch

The EBD 2016 inspects the instruction bundle coming from the IMEM 2004 and may do the following when any one of the two instructions is a branch: Compute the branch target address (instruction PC+12-bit offset); If the branch is a forward branch, the IFD 2002 predicts the branch as not taken and the program count increments normally; If the branch is a backward branch, the IFD 2002 predicts the branch as taken and resynchronizes the program count to the branch target address; Due to the detected program discontinuity, the IFD 2002 invalidates all in-flight instruction fetch requests. The instructions data from invalidated fetch requests are ignored upon reception on the IMC interface; No flush occurs and the instructions already stored in the IFIFO 2010 are not invalidated.

Predictions made by the EBD 2016 may not always be accurate, it is therefore required that the BRU 2016 validates the early prediction. For this purpose, the EBD 2016 stores the prediction results (one bit) along with the instruction. The BRU 2018 generates a flush request for any incorrect early prediction.

Return Address Stack (RAS)

In parallel to the EBD 2016, the IFD 2002 implements a 4-entry Return Address Stack (RAS) 2016 that stores the return address (program count+4) of procedure calls using the JALR and JAL instructions. For JAL or JALR instructions, the return address is pushed in the stack when the destination register rd=x1. The return address is popped from the stack when the source register rs1=x1 (and the destination register rd=x0).

The RAS 2016 allows accurate prediction of the return address of procedure calls and early re-synchronization of the program counter without an expensive delay to access the software-visible register for obtaining the return address.

The RAS 2016 only provides a fast path to evaluate and execute the JAL and JALR instruction, and is not meant to replace the software context saving and restore operations on procedure calls. When the stack is full, the oldest entry of the stack is pushed out of the stack to free space for new incoming return address. On flushes, the RAS 2016 is entirely cleared. If a JALR instruction with source register rs1=x1 is seen when the stack is empty, the RAS 2016 mechanism is bypassed, and the BRU 2018 processes the instruction.

Jump instructions are forwarded to the downstream logic along with a prediction bit indicating whether the jump was taken (P=1) or not taken (P=0). The BRU 2018 evaluates and confirms the prediction bit and generates a flush only when P=0. As jumps always result in a flush, when BRU 2018 sees P=0 (jump not taken), it means that the RAS mechanism was not able to handle the jump instruction (RAS empty). As for the EBD 2016, the BRU 2018 also performs the target program count range and alignment checks on the jump destination program count.

A configuration field enables the RAS 2016 feature.

JAL

The RAS 2016 logic treats JAL jump instructions as unconditionally taken branches. JAL destination program count can always be computed without accessing a register. The program count is always resynchronized to the new jump target program count (instruction PC+20-bit offset).

The BRU 2018 re-computes the target program count, validates the prediction and updates the destination register with the return program count. Since no address range check is performed within the RAS 2016, the BRU 2018 is responsible for generating an exception if the target program count calculated is invalid.

JALR

JALR instructions use indirect addressing for target program count computation. Two scenarios are considered.

If the RAS 2016 level is not empty, the jump is predicted as taken and the return program count at the top of the RAS 2016 is considered the base address. The program counter is re-synchronized to the base address plus the 12-bit offset (immediate value).

If the RAS 2016 level is empty, the jump instruction can only be predicted taken if the following conditions are met: (1) the JALR instruction is located in slot #1 within the instruction bundle; (2) slot #0 within the same bundle is occupied either by a LUI (Load Upper Immediate) instruction or by an AUIPC (Add Upper Immediate) instruction; and (3) the destination register of the LUI/AUIPC instruction is the same as the JALR source register If the three conditions are met, the RAS 2016 computes the jump target program count for the JALR instruction using the information contained in both slots of the bundle. The program counter is re-synchronized to this new destination program count. Otherwise, the jump is predicted not taken and the BRU 2018 handles it and a flush will eventually occur.

As for the JAL instruction, the BRU 2018 re-computes the target program count, validates the prediction and updates the destination register with the return program count.

Loop Prediction Buffer

The IFD 2002 implements a Loop Prediction Buffer (LPB) as part of the EBD/RAS 2016 with a 4-entry buffer to store the memory address (instruction program count) of the last four backward branches along with their target program count. Each entry has its valid status.

Loops bodies represented by backward branches will be entered in the LPB the first time they are encountered since backward branches are predicted taken by the EBD 2016.

The LPB correctly predicts any loop entering condition if the compiler uses forward branch instructions to evaluate any loop entering condition. The LPB correctly predicts the loop iteration execution (except the loop exit condition) if the compiler uses backward branch instructions to go from loop end back to loop start. The LPB may not correctly predict a loop exit condition. A flush may always be required when exiting a loop.

The LPB is an aid to the program counter 2008 to detect a loop condition when the read request is sent to the IMC rather than waiting for the instruction data returned later. When the program counter value matches the instruction PC of one of the LPB valid entry, the program counter is resynchronized to the associated target program count. This process does not need to invalidate any IFIFO 2010 entry, as the loop start instruction is fetched immediately after the loop end instruction.

Initially, the LPB is empty. When the LPB detects a backward branch, the instruction and target PC are stored in one of the LPB entry. The program counter is re-synchronized to the target PC, as described in relation to the EBD 2016.

When the LPB is not empty and a backward branch is detected, the LPB first checks if the instruction PC already exists in one of the valid entry of the LPB. If it already exists, the new address will not be written into the LPB. Otherwise, it will be written in one of the empty LPB entry. If all LPB entries are used, the current branch instruction replaces the oldest valid.

All LPB entries are preserved during flushes to allow nested loop support. Otherwise, inner loop exits would always clear the information of any outer loop instruction and target program count.

A configuration field enables the LPB feature.

Instruction Decoding

The decoding process checks that the incoming valid instructions are compliant to the formats supported by the processor. Any valid instruction extracted from the IFIFO 2010 that does not comply with the formats is declared illegal. No resource matching is performed for illegal instructions. If the illegal instruction is located in slot #0, the instruction located in slot #1 is set as invalid and no resource matching is performed. If the instruction located in slot #0 is legal, but the instruction located in slot #1 is illegal, the instruction located in slot #0 will be executed normally.

The Scoreboard unit 2006 is responsible for transmitting the illegal exception to the BRU 2018, and results in a call to the exception handler (with a flush generated from the program discontinuity).

The decoding logic extracts the following information from each of the incoming valid instructions: 8-bit opcode; Up to 20-bit immediate value with a valid status; Up to three 5-bit source operand #1, each associated to the valid status; Up to one 5-bit destination operand, with its valid status.

Since multiple instruction formats exist, the valid status indicates if the immediate, source or destination fields are valid.

The decoding logic assigns each instruction to one of the following categories: Invalid instruction; Illegal instruction; Load; Store; SALU; BRU; SMUL; VMAC; VALU; VLUT; CCM; and NOP. The instruction category information is forwarded to the Scoreboard unit 2006 along with the opcode, immediate value and all the source and destination operands.

The instruction categories are sent to the Scoreboard unit 2006 using one-hot encoding. The IFD 2002 also indicates whether the instruction should be executed by a scalar or vector CR using a one-hot encoded signal.

Resource Matching

Based on the instruction category, the resources (instruction tag, CR queue, buffers, virtual temporary destination register) required for successful execution of instructions within the bundle are identified. The IFD 2002 first evaluates the resource requirement for each resource type per slot. The IFD 2002 then proceeds with the comparison of the required resources against the resources available advertised by the Scoreboard unit 2006. The IFD 2002 declares that there are enough resources if the number of required resources is less than or equal to the number of available resources advertised by the Scoreboard unit 2006. When there are enough resources for all valid instructions, the instructions are transferred to the Scoreboard unit 2006. The instruction tag is a resource required by all valid instructions. Illegal instructions are considered invalid and hence, they will not consume any resources.

FIG. 20 shows an example table of required resources based on the instruction category. For this example, instructions using integer register x0 as their destination register do not need VTIR resource. Before sending the next instruction to the Scoreboard unit 2006, the IFD 2002 waits for the minimum instruction distribution period. The minimum period depends on the time needed by the Scoreboard unit 2006 to update the resources status with the latest instruction bundle and the newly updated status information to travel back to the IFD 2002 for the next instruction bundle evaluation.

Scoreboard Unit (SBM)

FIG. 21 shows an example schematic of the SBM 2102 of the ETM 2100 is the central control unit of the processor. As such, the SBM 2102 keeps track of information about the in-flight instructions and the resource usage in order to ensure proper operation of the processor. The main functions of SBM 2102 include resource management, source input dependency tracking and instruction in-flight and commit status tracking. The SBM 2102 receives decoded instructions from the IFD 2106 and provides resource availability signals to the EXM 2108 to trigger execution of the instructions.

Resource Management

The IFD 2106 relies on the resource availability information from the SBM 2102 to determine whether it can forward the instruction bundle at the head of IFIFO. Therefore, accurate and timely update of the current resource status is crucial to the optimal operation of the processor. The SBM 2102 has a resource manager 2104 manages the following resources and advertises their availability to the IFD 2106: Instruction tag; SALU queue entry; SMUL queue entry; VMAC queue entry; VALU queue entry; VLUT queue entry; Load queue entry; Store queue entry; Branch queue entry; CCM queue entry; Load buffer; Store buffer; BRU buffer; Virtual Temporary Integer Register (VTIR); and Virtual Temporary Vector Register (VTVR).

When the IFD 2106 determines there is a match between the resource requirement and availability for the current instruction bundle, it extracts the instruction bundle from the head of IFIFO and sends the decoded instructions to the SBM 2102. However, the SBM 2102 does not know the resource requirement of the current instruction bundle when it receives the bundle from the IFD 2106, only that there are sufficient resources available. Based on the decoded instruction information, the SBM 2102 calculates resource usage of the current bundle and updates the resource availability for the subsequent instruction bundle.

The SBM 2102 marks the resources consumed by the current instruction bundle as "in-use". When the EXM 2108 frees up a resource, it sends the corresponding resource release signal to the SBM 2102, which in turn marks the resource as available again.

Instruction Tag

The SBM 2102 assigns a tag to all valid instructions (including NOPs which may be used for other functionality besides resolving dependencies and pipeline hazards). Throughout the lifecycle of an instruction, the instruction tag is used to keep track of the instruction status and to keep the instruction ordering. For this example, there may be 32 available tags in the SBM 2102. The SBM 2102 manages the tags as a resource, and marks the tag as "in-use" when assigned to an instruction and releases the tag when the instruction terminates. In addition, the SBM 2102 keeps track of a tag page that toggles each time the current tag index rolls over to zero. The tag, tag page and flush marker information form a unique identifier which is sent out with the instruction. The tag page is only used by the LSC during load and store address conflict resolution. The page bit is required when comparing two instructions with tags before and after the index rollover. The SBM 2102 may have an instruction status unit 2110 for tracking status of instructions, instruction tags, and so on.

In the special case of NOP instruction, the SBM 2102 assigns a tag and logs it in the IFT 2106 for debugging and tracing purposes. However, the SBM 2102 terminates NOP instructions immediately and does not send them out to the EXM 2108.

VTIR and VTVR

If an instruction generates a result destined for a location in the integer or vector register, the SBM 2102 assigns a virtual temporary register. There are two types of virtual temporary registers: Virtual Temporary Integer Register (VTIR) and Virtual Temporary Vector Register (VTVR). The VTIRs and VTVRs are used to hold the instruction results in temporary locations for the integer and vector instructions respectively, thus making the speculative results available to the subsequent instructions before the results are written to the destination integer or vector registers. The SBM 2102 may have a VTIR/VTVR map table 2112 and a VTIR/VTVR count table 2114.

Similar to the tags, the SBM 2102 manages the VTIRs and VTVRs as consumable resources. Therefore, they are marked as "in-use" when assigned, and released when the corresponding instructions terminate. The VTIR and VTVR are referenced by their virtual indices, which may include the following information: Over-Subscription (1-bit) and Physical Temp Reg Index (5-bit).

In order to minimize the latency in releasing VTIRs and VTVRs, the SBM 2102 implements "over-subscription" of the temporary registers. Using two to one over-subscription ratio, the SBM 2102 assigns the virtual indices and permits two instructions targeting the same physical temporary register location to be in-flight at the same time. In other words, the SBM 2102 can send an instruction to the EXM 2108 with the over-subscribed VTIR or VTVR without verifying the availability of the physical temporary register they are referencing.

Once the instruction reaches the pre-fetch buffer in the EXM 2108, it is the responsibility of the EXM 2108 to verify the availability of the physical temporary location before sending the instruction to the targeted Calculation Resource (CR). The SBM 2102 keeps track of the commit state and "in-queue" states of each VTIR and VTVR. The EXM 2108 uses the VTIR/VTVR commit and "in-queue" states to determine if the instruction can be safely dispatched to the CR without the risk of over-writing the content of the previous instruction result assigned to the same physical register before it is terminated.

Further, the SBM 2102 allocates fixed VTIR and VTVR indices based on the CRs. For example, the SBM 2102 assigns the VTIR indices 0 to 3 followed by 32 to 35 to the SALU0. The indices are assigned sequentially such that instructions executed by the SALU0 will write their results to the assigned VTIR in round robin fashion. Once all the physical indices (0 to 3 in the example above) are used up, the SBM 2102 over-subscribes the VTIR and VTVR indices with the over-subscription bit set to 1 (32 to 35 in the example above).

FIG. 23 shows a table of the VTIR and VTVR indices allocated to each CR. Indices are mapped to provide easy decoding of the bits 4:2 when locating a virtual temporary register. Unused VTIR/VTVR indices are reserved.

VTIR and VTVR Count Table

As a part of the resource management function, the SBM 2102 keeps track of the number of instructions that references a particular VTIR and VTVR locations for their source inputs. This information is kept in the VTIR and VTVR count tables 2114. Each time the SBM 2102 distributes an instruction which reference a particular VTIR and VTVR for any of its source inputs, it increments the associated counter. The EXM 2108 then sends the VTIR/VTVR count release signal to the SBM 2102 when the instruction leaves the pre-fetch stage. The release signal is per instruction basis. Even if the instruction uses the same VTIR or VTVR locations multiple times for its source inputs, the SBM 2102 expects only one release signal per VTIR (or VTVR) referenced by the instruction. The SBM 2102 decrements the VTIR or VTVR count when it receives the release signal. The VTIR/VTVR counter value must be zero before the associated VTIR or VTVR resource can be released for re-use. In other words, there cannot be any outstanding instructions that reference the VTIR or VTVR before the SBM can release it.

CR Queue and Buffers

Similar to the other resources, the SBM 2102 manages the CR queue entry availability and the LD, ST, BRU buffer availability as resources marking them as "in-use" when assigned and releasing then when the release signal is received from the EXM 2108. The SBM 2102 supports the CR queue/buffer allocation shown in the table of FIG. 24. The LD and ST buffers are shared between the integer and vector instructions.

Source Input Dependency Tracking

In order to keep track of the source input dependency, the SBM 2102 stores the latest temporary register assignment information in the VTIR and VTVR map tables 2112. These two tables store the latest indices of VTIR and VTVR assigned to the destination Integer Register (IR) and Vector Register (VR) locations. The VTIR and VTVR map tables 2112 also keep track of the in-flight status of each temporary register. A VTIR or VTVR is deemed "in-flight" when it is allocated to an instruction until its content is committed to the destination register location in the IR or VR. This is shown at reference 2514 in FIG. 25

Figure 25:
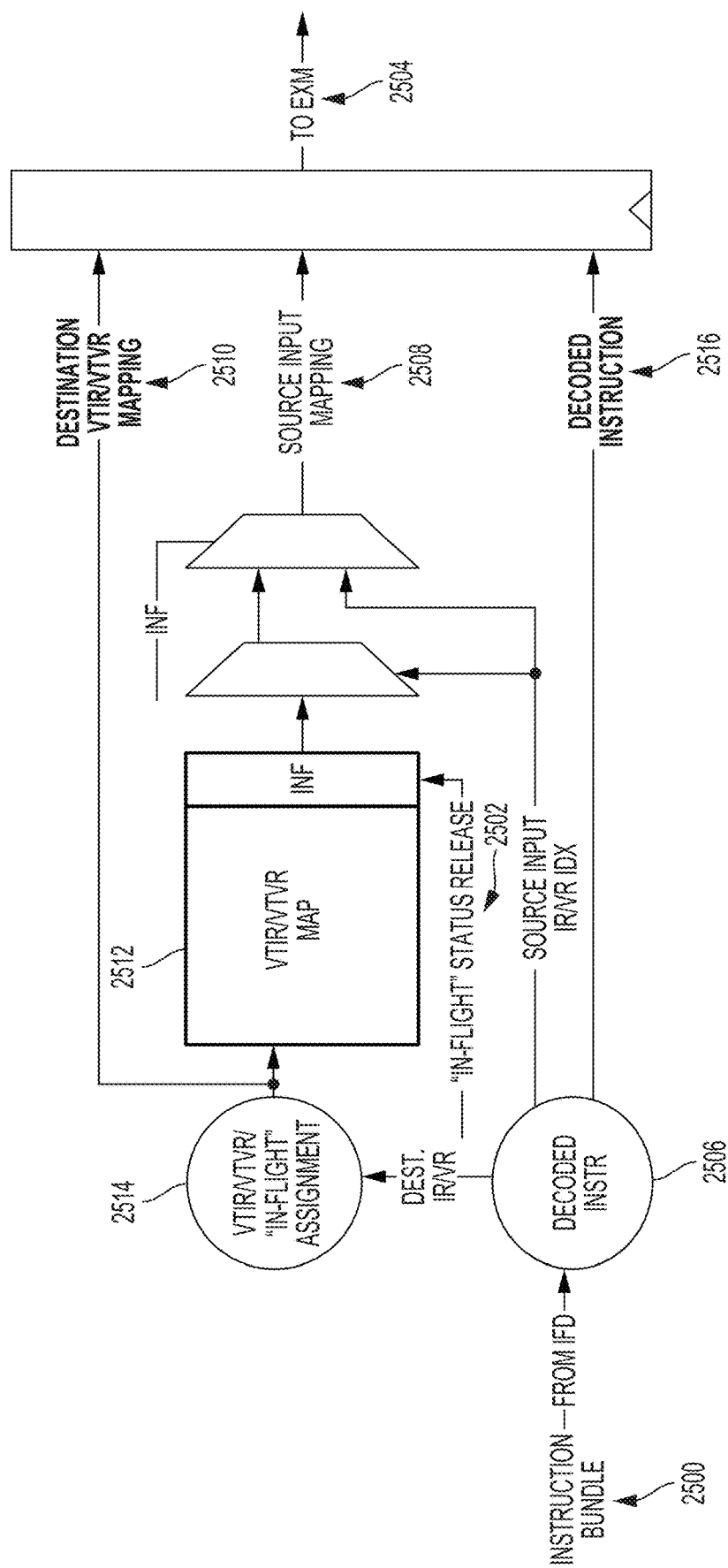
FIG. 25 is a view of an example temporary registers according to some embodiments.

FIG. 25 shows an example data flow of the SBM 2102. At 2500, when the SBM 2102 receives an instruction bundle from the IFD 2106, at 2506, the SBM 2102 decodes the instruction and determines the origin of the source inputs for each operand by referencing the VTIR and VTVR map tables 2512. If a source input comes from an in-flight VTIR or VTVR, the SBM 2102 sets the indication for the CR to read the source input from the current VTIR or VTVR assigned to the IR or VR. Otherwise the SBM sets the indication for the CR to read the source inputs from the IR or VR directly.

At the same time, the SBM 2102 updates the VTIR and VTVR map tables 2112 with the latest VTIR and VTVR assigned to the current instruction bundles. The VTIR and VTVR map tables 2512 are indexed by the IR and VR locations respectively, as illustrated in the FIG. 25.

The SBM 2102 sends both the original IR/VR source input indices (shown at 2508 as source input mapping) and their virtual register mapping (shown at 2510 as destination mapping) to the EXM at 2504. The decoded instruction is provided to EXM 2504 at 2516.

When it encounters a program discontinuity (flush request) as a result of a control transfer (jump or branch) instruction, an exception or a system instruction, the SBM 2102 saves the state of current VTIR and VTVR map tables 2512 into a stack. Since the processor supports up to four active program discontinuities, potentially up to four VTIR/VTVR maps 2512 must be saved. The VTIR and VTVR maps 2512 in the stack continue to update the in-flight status information, while keeping the content of VTIR/VTVR map static. In case of a flush, the SBM retrieves the VTIR/VTVR map 2512 in the stack associated with the instruction causing the flush and make them the "active" maps when the operation resumes from the flush. Since the content of the maps reflect the temporary register assignments for the pre-flush instructions and the in-flight states of the temporary registers in the maps are up to date, the SBM 2102 has the latest pre-flush VTIR and VTVR assignment information to determine the source input dependency correctly for the post-flush instructions. The first address location of the Integer Register (x0) may be hard wired to all zeros in some examples. Therefore, the SBM 2102 does not assign a temporary register if the destination register is set to x0. If the SBM 2102 waits for all pre-flush instructions to commit their results before resuming operation from a flush, we do not need to store the VTIR and VTVR maps in the stack.

Instruction In-Flight Table (IFT)

Figure 22:
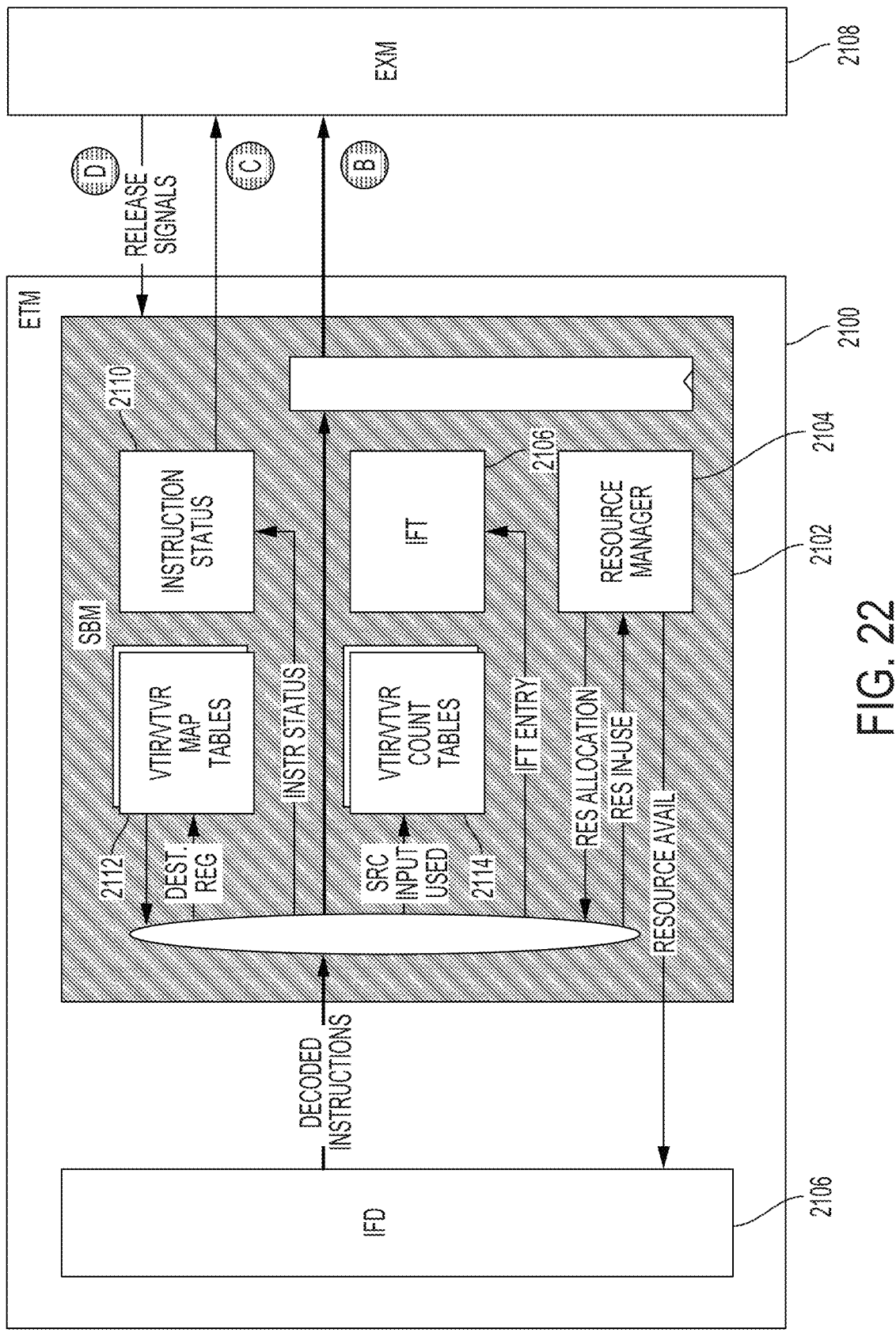
FIG. 22 is a view of another example evaluation and termination unit according to some embodiments.

The SBM 2102 implements an in-flight table (IFT) 2106 (FIG. 22) to keep track of pertinent information about the instructions, which it uses later in the instruction lifecycle. The IFT 2106 has 32 entries and is indexed with the instruction tag.

An entry in the IFT table 2106 may consist of the following information: Tag "in-use" indication (1-bit); Instruction commit status (1-bit); NOP indication (1-bit); VTIR required (1-bit); VTVR required (1-bit); Destination IR or VR (5-bits); Destination VTIR or VTVR (6-bit); and PC (32-bit).

Since VTIR and VTVR required fields are mutually exclusive (an instruction only has one destination register, hence can only consume one virtual temporary register), the type (integer or vector) of destination IR/VR and destination VTIR/VTVR can be determined using the VTIR and VTVR required fields.

When the SBM 2102 sends an instruction to the EXM 2108, it writes the IFT 2106 entry in the tag location of the table. At the same time, the SBM 2102 marks the entry as "in-use", and the commit status to "not committed". When the result of the instruction has been committed to the final destination register, the SBM 2102 receives the tag release signal from the EXM 2108. In this case, the SBM 2102 sets the commit status to "committed", and marks the entry as "not in-use", thus releasing the tag and making it available for re-assignment. In addition to releasing the tag, the SBM 2102 looks up the IFT entry associated with the tag to determine if a VTIR or VTVR resource was used by the instruction. If a VTIR or VTVR resource was used, the SBM waits for the related entry in the VTIR or VTVR count table to be equal to zero and releases the temporary register resource.

For the instructions that do not generate a result, the entry is marked as used when assigned, but the "commit status" remains as "committed". For such instructions, VTIR or VTVR release is not necessary.

The IFT 2102 entry remains in the table until the entry is re-assigned and is overwritten by a subsequent instruction.

Temporary Register Commit Status and In-Queue Status Bits

In addition to the "commit" and "in-use" indicators for the tags, the SBM 2102 keeps the commit and in-queue status of the temporary registers in order to support 2:1 over-subscription, for example. The VTIR/VTVR commit status bit is set when the temporary register is committed to the IR or VR, and cleared when the SBM 2102 assigns the temporary register to a subsequent instruction. Similarly, the SBM 2102 also maintains the "in-queue" status of the temporary registers. The temporary registers (VTIR and VTVR) are deemed "in-queue" between the time they are assigned by the SBM 2102 until the time the EXM 2108 sends the associated instruction to the targeted CR for execution. When the instruction leaves the pre-fetch stage and enters the execution stage, the EXM 2108 sends a release signal to the SBM to clear the "in-queue" status of the temporary register assigned to the instruction.

The VTIR and VTVR commit and in-queue status bits are used by the EXM 2108 to determine if the over-subscribed temporary register has already been committed or has been re-assigned to a subsequent instruction. When either of the status bits is set, the EXM 2108 can dispatch the waiting instruction from the pre-fetch buffer without the possibility of over-writing the previously over-subscribed temporary register location.

Speculation State Bits

The SBM 2102 keeps track of the speculative instructions. The processor considers as speculative any instruction that can result with an instruction pipeline flush or can create an exception. The following are examples of speculative instructions: Jump and branch instruction; System instruction (SBREAK, SCALL); and Load and Store instruction. Instructions that could potentially cause arithmetic exceptions (i.e. floating point divide by zero) are not treated as speculative instructions.

When the SBM 2102 sends out speculative instruction, it marks its speculation state bit as speculative. When the speculative nature of the instruction is resolved, the LSC or BRU send a speculation release signal to the SBM. The SBM clears the speculation state bit. The RCC then uses this information to allow instructions to be committed when the speculation of all previous instructions has been removed.

Flush Status Bits

The SBM 2102 receives from the BRU a flush request signal along with the tag and the BRU buffer index associated with the instruction causing the flush. When it receives the flush signal, the SBM de-asserts the its ready signal to stop the IFD 2106 from sending any more instructions. However, the SBM 2102 finishes processing the current instruction bundle before processing the flush.

As mentioned in the previous section, the SBM 2102 retrieves the VTIR and VTVR maps associated with the BRU buffer index from the stack and make them the active VTIR and VTVR maps to be used with post-flush instructions. In addition, the SBM 2102 releases the tag, the VTIR and VTVR resources that were speculatively assigned to the instructions subsequent to the instruction causing the flush. This allows the SBM 2102 to re-use the resources for the post-flush instructions when the operation resumes.

The SBM 2102 keeps track of the Flush Marker (FM). Each time a flush occurs, the SBM 2102 increments the FM and uses the updated FM when the operation resumes from a flush. Before incrementing the FM, the SBM 2102 sets the flush status bits of the flushed instructions. The flush status bits are associated with the current flush marker. The EXM 2108 uses the flush status bits to determine if a given instruction has been flushed.

Finally, if the jump instruction causing the flush generates a result that must be committed to the IR, the SBM 2102 clears the speculation bit associated with the instruction. This allows the RCC to control the commit ordering and the release of the tag and the VTIR happens as in the normal flow. At the same time, the SBM 2102 asserts its ready signal to indicate to the IFD that it is available to process the post-flush instructions.

If the flushing instruction does not have a result to be committed to the IR, the SBM 2102 releases the tag of the flush causing instruction and set its ready status immediately.

When the operation resumes after the flush, the SBM 2102 assigns the tag, VTIR, and VTVR resources starting with the resources that were released due to the flush, but using the new flush marker. For example, if the instruction with tag 4 caused a flush and the tags 5, 6, and 7 have been flushed with the flush marker of 2, when the operation resumes, the SBM 2102 assigns the tag 5 to the first post-flush instruction with the updated flush marker of 3. Other resources, such as the queue entries, are released using the normal release signal from the EXM 2108. Therefore, with the exception of tag release, the EXM 2108 must send release signals for other resources (i.e. CR queue release) even if the instruction using the resource has been flushed. The SBM 2102 supports up to four outstanding flushes (flush markers). In some example cases, there may be more than 4 outstanding flushes. If the flush markers rollover, and the SBM 2102 starts re-using the flush marker when there are still outstanding flushed instructions in the CR queue that use the same flush marker, the flush status bits are overwritten and the previously flushed instruction in the CR queue potentially loses their "flush status". It might be possible to "OR" the flush status bits, rather than over-writing them, to preserve the previous flush status, and so on Otherwise, it needs to keep track of "flush status release" to protect against the condition however unlikely.

Exception Handling

The SBM 2102 does not generate an exception within the unit. However, when the IFD 2106 detects an exception (such as for example, IMEM data error, illegal instruction), it forwards the exception indication to the SBM 2102. The SBM 2102 in turn assigns a tag to the exception causing instruction and sends it to the BRU.

The BRU process the exception requests in-order, asserts the flush request, and sends it to the other units along with the tag of the instruction causing the flush. The cause of the flush (branch, jump, or exception) is also published by the BRU. If the flush is caused by an exception, the SBM 2102 looks up the IFT entry associated with the flush tag and retrieves the program count. The SBM 2102 then sends the exception PC to the CCM.

Register Commit Controller (RCC)

Figure 26:
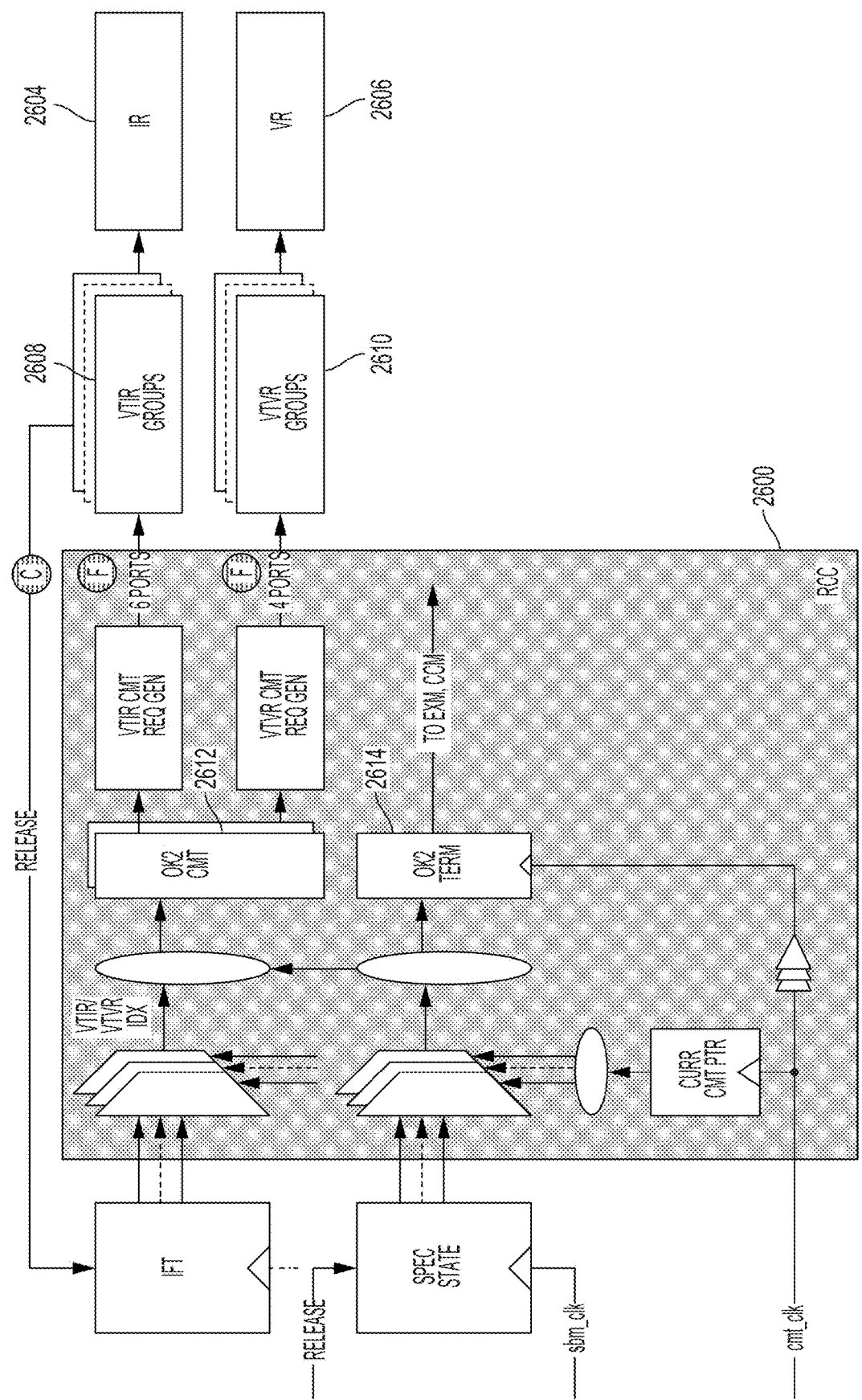
FIG. 26 is a view of an example register commit controller according to some embodiments.

During the termination stage, the RCC performs the task of managing the commit ordering. FIG. 26 shows the block diagram of the RCC 2600.

The processor supports five and four commit ports for IR 2604 and VR 2606 respectively. The RCC 2600 allocates the commit ports based on the VTIR and VTVR functional groups 2608, 2610. FIG. 27 provides an example table that shows the commit port assignments. When an instruction produces an integer or a vector result, it must be committed to the assigned integer or vector register upon the completion of the instruction (unless the instruction is flushed), while keeping the instruction commit sequence in order. The commit order is determined based on the age of the "tag" assigned to the instruction by the SBM at the instruction evaluation stage.

The RCC 2600 keeps track of a commit pointer. Starting from the tag pointed to by the current commit pointer, the RCC evaluates up to eight consecutive instruction tags and the associated speculation state bits in order to determine if the result can be committed. In addition, the RCC 2600 references the IFT 2602 to determine if the instruction requires the result to be committed to the IR or VR.

If all outstanding speculation of previous instructions has been resolved, and if the instruction requires its result to be written to the integer or vector registers, the RCC 2600 allows the commit to go through by setting the OK2COMMIT bit 2612 associated with each VTIR or VTVR.

The RCC 2600 does not have to wait for the instruction result to be available in the temporary register before setting the OK2COMMIT bits 2612. Based on the OK2COMMIT value, the Commit Request Generator (CRG) in the RCC 2600 selects which of the temporary register the commit port it is servicing should be committed (based on round-robin priority scheme), and sends the commit request to the targeted temporary register group. Once the CRG sends the commit request to the VTIR or VTVR groups 2608, 2610 in the EXM, it waits for an acknowledgement from the EXM before sending out the next commit request.

Similarly, the RCC 2600 sets OK2TERM bits 2614 in order to indicate that all previous speculations have been resolved. These bits are referenced by the instruction tag. The OK2TERM bits 2614 are used by the EXM to determine if all previous speculative instructions have been cleared, and therefore, it can send out the ST data to the DMEM. The BRU also uses the OK2TERM bits 2614 to determine the previous speculative instruction states before generating a flush or an exception request signal. The CCM uses the OK2TERM bits 2614 in order to determine if it can update the content of a Control and Status Registers (CSR).

The branch instructions not resulting in a flush does not have to wait for its OK2TERM bit 2614 to be set before sending the speculation release signal to the SBM for that instruction.

Integer Register Unit (IRM)

The ETM implements the 32 general-purpose register set. The Integer Register Unit (IRM) includes the 32 integer registers and the read ports to support the source operand read requests from the EXM. When it receives a read request from the EXM, the IRM looks up the requested register content and sends it on its associate read data port. The IRM supports 15 read ports. The number of read port connections to the respective CRs is shown in the table of FIG. 28.

In addition, the IRM supports 5 write ports to commit the data into the IRs from the temporary integer registers.

Vector Register Unit (VRM)

Figure 29:
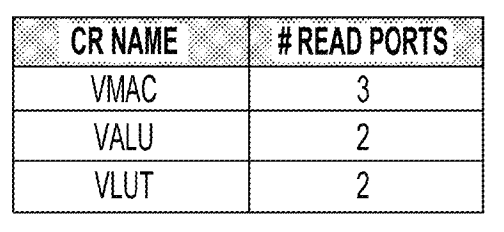

In order to support the custom extensions of the processor, the Vector Register Unit (VRM) implements vector registers. The VRM implements 7 source input read ports for the vector CRs. These are shown in the table of FIG. 29. In addition, the VRM implements 4 write ports to commit the data into VRs from the temporary vector registers. If the 32-bit floating point instruction are executed in a dedicated CR (instead of the vector CR), the number of read ports of the VRM has to be updated.

Initialization

The program counter in the ETM is set to the initial value of zero. After the release of processor core reset, the ETM starts to fetch instructions from the IMEM when enabled.

Debug Features

The IFD supports a single step mode where a single instruction is fetched, evaluated and executed. The instruction fetch mechanism is regulated by a pulse controlled via the processor external interface. The processor provides an activity status to indicate if the instruction has been terminated.

To facilitate hardware and software debugging, the SBM provides a speculation-override mode to ignore the speculative nature of any instructions.

The ETM provides the following observable signals through its debug port shown in the table of FIG. 30.

Controllable Pulse Generators

Except for the pulse generators, the ETM internal logic can only be monitored and cannot be controlled, initialized or configured through writeable debug registers. Only when operating in single-step mode, pulse generators require their own "external trigger" to be activated. This mode allows stepping into the instruction life cycles, one stage at the time.

Execution Unit (EXM)

Figure 31:
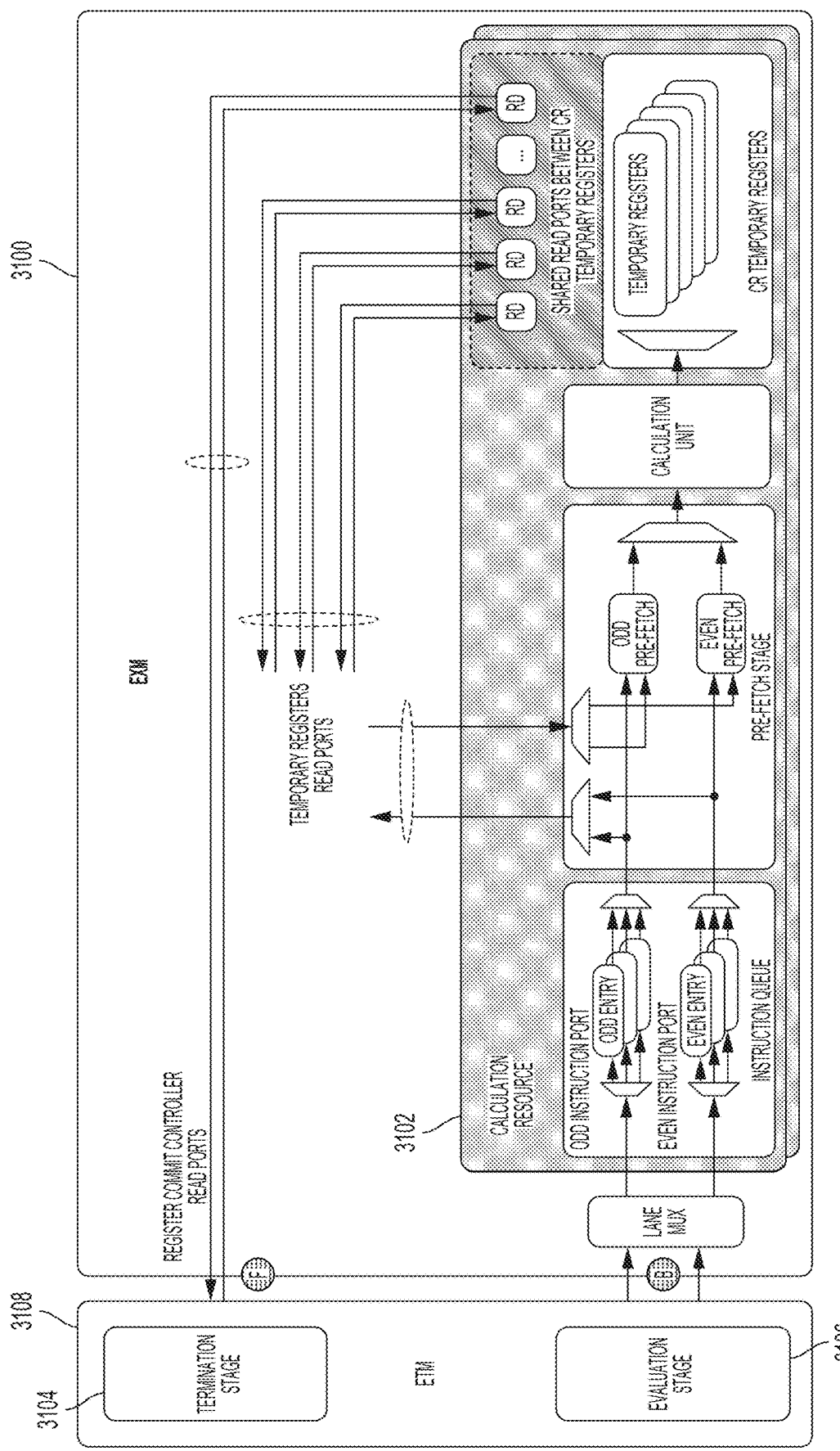
FIG. 31 is a view of an example execution unit according to some embodiments.

FIG. 31 shows an example schematic of the Execution Unit (EXM) 3100 in the processor. The EXM is composed of multiple Calculation Resources (CR) 3102 with the following example components: scalar units (two SALU, one SMUL) and vector units (one VALU, one VMAC, one VLUT), two load and one store units in the Load and Store Controller (LSC) and one Branch Resolution Unit (BRU).

The main task of the EXM 3100 is the execution of instructions. All scalar and vector CRs share a common architecture, while LSC and BRU units are customized to handle load/store and branch/jump instructions respectively.

The ETM 3108 sends instructions with all required information for a CR to queue, execute and store results in dedicated temporary registers after the evaluation stage 3106. The temporary registers are accessible to all other CRs 3102 using the dedicated read ports to allow out-of-order speculative execution. The Register Commit Controller (RCC) in the termination stage 3104 of the ETM 3108 terminates instructions by transferring the integer (32-bit), floating-point (32-bit) or vector (128-bit) data from a temporary register to its destination register. Instruction termination is only performed when all speculations from previous instructions are resolved.

The following example features may be implemented by the EXM 3100: decoding and routes (Lane Mux) received instructions from the ETM; providing queue to hold instructions prior to their execution; generating read requests for all valid instruction source operands; executing instruction using calculation units and stores results in temporary registers; providing access to speculative results in temporary registers to other CRs and RCC; processes flush status indication from the ETM scoreboard; Reports back to the ETM instruction status (for termination) & resource updates (for reallocation to new instructions).

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

The example processors may include various units or components. In other examples, the units may be hardware and software modules configured to provide the functionality described herein.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

The description provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A processor comprising:
an instruction memory for storing instructions at corresponding instruction memory addresses;
an instruction memory controller for controlling access to the instruction memory;
an evaluation unit for:
triggering the instruction memory controller to receive instruction data from the instruction memory,
evaluating operand dependencies and execution pipeline dependencies for operands and opcodes of the instruction data,
determining source register identifiers for source data for operands of the instruction data and destination register identifiers for instruction results generated by execution of the instruction data, and
evaluating resource requirements for the execution of the instruction data;
an execution unit for dispatching the instruction data including a sequence of instructions to computational resources for execution when the source data for the operands is ready or available and the computational resources specified by the resource requirements are ready or available, wherein the sequence of instructions are generated from removing No Operation (NOP) instructions from instruction code that includes the NOP instructions, wherein the execution unit holds or queues the instruction data from being dispatched upon determining that the instruction data requires output of a previous instruction that has not been completed, holding or queuing lasting until the previous instruction completes to resolve the execution pipeline dependencies with maintaining an order of the sequence of instructions being dispatched by the execution unit the same as an order in which the execution unit receives the sequence of instructions and without inserting a specified delay between any two instructions of the sequence of instructions in the instruction memory, wherein the execution unit includes:
a scalar dispatcher for forwarding scalar instructions of the sequence of instructions to one of a plurality of scalar arithmetic logic unit (sALU) slices executing the scalar instructions out of order, and
a vector dispatcher for storing vector instructions of the sequence of instructions in at least one vector computational resource (CR) queue before forwarding the vector instructions to a vector slice unit executing the vector instructions in order;
a termination unit for terminating the execution of the instruction data when speculation is resolved and triggering transfer of the instruction results from temporary registers to a destination register;
registers and a data memory for loading the source data required for the operands to execute the instruction data and receiving the instruction results generated by the execution of the instruction data; and
a data memory controller for controlling access to the data memory for the source data and reading from and writing to the data memory based on opcodes of the instruction data and the instruction results.

2. The processor of claim 1, further comprising a program counter unit for generating read requests with at least one instruction memory address for the instruction data stored in the instruction memory at the at least one instruction memory address, the program counter unit providing the read request to the evaluation unit to receive the instruction data.

3. The processor of claim 2, further comprising an instruction FIFO for storing the instruction data received from the instruction memory in response to the read requests, the instruction data being held by the evaluation unit for dispatch.

4. The processor of claim 3, wherein the instruction FIFO receives the instruction data as multiple instructions at a time and validates the instruction data.

5. The processor of claim 4, further comprising a branch processing or jump unit for triggering a flush of the instruction FIFO.

6. The processor of claim 1, wherein the evaluation unit further comprises a distribution unit for indicating that it is ready to accept the instruction data for evaluating the operands and execution dependencies for the operands and the opcodes of the instruction data, and assigning instruction tags to provide reference identifiers for the instruction data.

7. The processor of claim 6, wherein the distribution unit is configured to divide the instruction data into bundles or packs for parallel execution of the bundles or packs.

8. The processor of claim 6, wherein the distribution unit may hold the instruction data by not releasing the instruction data from an instruction FIFO.

9. The processor of claim 6, wherein the distribution unit decodes the instruction data to detect invalid instruction data and triggers an exception for the instruction data.

10. The processor of claim 6, wherein the distribution unit decodes the instruction data to generate an instruction profile for required resources for the operands and the opcodes of the instruction data, the required resources being part of source input operand dependencies and the execution dependencies for the operands and the opcodes of the instruction data.

11. The processor of claim 6, wherein the distribution unit identifies instruction type and computational resource type for the instruction data as part of evaluation of source input operand dependencies and the execution dependencies for the operands and the opcodes of the instruction data.

12. The processor of claim 6, wherein the evaluation unit further comprises a scoreboard unit for tracking resource and operand availability for the opcodes of the instruction data, comparing the resource and the operand availability to input operand dependencies and the execution dependencies of the resource requirements for the execution of the instruction data to generate a resource available signal, and tracking information about current in-flight instructions using the instruction tags.

13. The processor of claim 12, wherein the scoreboard unit is configured for tracking status of the instruction data using the instruction tags, holding the instruction tags pending completion of the instruction data, and upon detecting the completion of the instruction data, releasing the instruction tags.

14. The processor of claim 12, wherein the distribution unit provides identifiers to the scoreboard unit for the operands as part of evaluation of source input operand dependencies and the execution dependencies for the operands and the opcodes of the instruction data.

15. The processor of claim 12, wherein the execution unit comprises a dispatcher for dispatching, based on the resource available signal from the scoreboard unit, the instruction data as an entry of at least one queue for the computational resources to execute the operands and opcodes of the instruction data to generate instruction results, the queue advancing to a next entry (if available) when the instruction data is dispatched from the queue to the computational resources.

16. The processor of claim 15, wherein the dispatcher is configured for speculative execution of the instruction data so that the instruction results may be computed and available before full resolution.

17. The processor of claim 1, wherein an individual instruction is associated with a corresponding instruction tag, the corresponding instruction tag being used for tracking status of the individual instruction throughout a lifecycle of the individual instruction and maintaining an order of the individual instruction relative to other instructions of the instruction data.

18. The processor of claim 17, wherein the registers further comprise a plurality of temporary registers and committed registers, and a commit controller configured to trigger termination or completion of execution of the instruction data by transferring data relating to instruction results from the temporary registers to the committed registers, and providing a status notification to the evaluation unit to retire instruction tags.

19. The processor of claim 12, wherein the scoreboard unit tracks the information about current in-flight instructions using the instruction tags and an in-flight table, the instruction tags corresponding to indices of the in-flight table.

20. The processor of claim 1, wherein the data memory comprises a local data memory and shared data memory, the processor connecting to the shared data memory through an access port.

21. The processor of claim 1, wherein the evaluation unit is for holding the instruction data having an execution dependency or an unavailable resource requirement.

22. A processor comprising:
an instruction memory controller for controlling access to an instruction memory for storing instructions at corresponding instruction memory addresses;
an evaluation unit for:
triggering the instruction memory controller to receive instruction data from the instruction memory,
evaluating operand dependencies and execution pipeline dependencies for operands and opcodes of the instruction data,
determining source register identifiers for source data for the operands of the instruction data and destination register identifiers for instruction results generated by execution of the instruction data, and
evaluating resource requirements for the execution of the instruction data;
an execution unit for dispatching the instruction data including a sequence of instructions to computational resources for execution when the source data for the operands is ready or available and all resources specified by the resource requirements are ready or available, wherein the sequence of instructions are generated from removing No Operation (NOP) instructions from instruction code that includes the NOP instructions, wherein the execution unit holds or queues the instruction data from being dispatched upon determining that the instruction data requires output of a previous instruction that has not been completed, holding or queueing lasting until the previous instruction completes to resolve the execution pipeline dependencies with maintaining an order of the sequence of instructions being dispatched by the execution unit the same as the execution unit receives the sequence of instructions and without requiring inserting a specified delay between any two instructions of the sequence of instructions in the instruction memory, wherein the execution unit includes:
a scalar dispatcher for forwarding scalar instructions of the sequence of instructions to one of a plurality of scalar arithmetic logic unit (sALU) slices executing the scalar instructions out of order, and
a vector dispatcher for storing vector instructions of the sequence of instructions in at least one vector computational resource (CR) queue before forwarding the vector instructions to a vector slice unit executing the vector instructions in order;
a termination unit for terminating the execution of the instruction data when speculation is resolved and triggering transfer of the instruction results from temporary registers to a destination register; and
a data memory for loading the source data required for the operands to execute the instruction data and receiving the instruction results generated by the execution of the instruction data, the data memory comprising a local data memory and shared data memory, the processor connecting to the shared data memory through an access port.

23. A method for a processor comprising:
generating at least one instruction memory address for read requests for instruction data stored in an instruction memory at the at least one instruction memory address, the instruction data including a sequence of instructions, wherein the sequence of instructions are generated from removing No Operation (NOP) instructions from instruction code that includes the NOP instructions;
decoding operands and opcodes of the instruction data to evaluate source input operand dependencies and execution pipeline dependencies for the operands and the opcodes of the instruction data;
assigning instruction tags to provide reference identifiers for the instruction data;
tracking resource and data availability for the opcodes of the instruction data, comparing the resource and the data availability to the source input operand dependencies and the execution pipeline dependencies to generate a resource available signal;
tracking information about current in-flight instructions using the instruction tags;
in response to the resource available signal, entering the instruction data as an entry of at least one queue for computational resources to execute the instruction data to generate instruction results, the queue advancing to a next entry (if available) when the instruction data is dispatched from the queue to the computational resources;
holding or queuing, by an execution unit of the processor, the instruction data from being dispatched upon determining that the instruction data requires output of a previous instruction that has not been completed, said holding or queuing lasting until the previous instruction completes to resolve the execution pipeline dependencies with maintaining an order of the sequence of instructions being dispatched by the execution unit the same as an order in which the sequence of instructions are received by the execution unit and without requiring placement of No Operation (NOP) instructions in the instruction memory;
forwarding, by a scalar dispatcher of the execution unit, scalar instructions of the sequence of instructions to one of a plurality of scalar arithmetic logic unit (sALU) slices executing the scalar instructions out of order;
storing, by a vector dispatcher of the execution unit, vector instructions of the sequence of instructions in at least one vector computational resource (CR) queue before forwarding the vector instructions to a vector slice unit executing the vector instructions in order; and
reading from and writing to a data memory based on the opcodes of the instruction data and the instruction results.

24. The method of claim 23, further comprising identifying source register identifiers for input operands and destination register identifiers for the instruction results.

25. The method of claim 23, further comprising identifying different types of operations of the opcodes to identify required resources for executing the instruction data as part of the source input operand dependencies and the execution pipeline dependencies, the different types of operations including integer, vector, branch, jump, system, load or store operations.

26. A processor comprising:
an evaluation unit for:
receiving instruction data,
determining execution pipeline dependencies of the instruction data,
determining resource requirements for execution of the instruction data,
holding the instruction data having an execution dependency or unavailable resource requirement, and
releasing the instruction data when no said execution dependency or said unavailable resource requirement remain; and
an execution unit for:
dispatching the instruction data including a sequence of instructions to computational resources for the execution upon the releasing the instruction data, wherein the sequence of instructions are generated from removing No Operation (NOP) instructions from instruction code that includes the NOP instructions, wherein the execution unit holds or queues the dispatching of the instruction data upon determining that the instruction data requires output of a previous instruction that has not been completed, said holding or queuing lasting until the previous instruction completes to resolve the execution pipeline dependencies with maintaining an order of the sequence of instructions being dispatched by the execution unit the same as the execution unit receives the sequence of instructions and without inserting a specified delay between any two instructions of the sequence of instructions in an instruction memory, wherein the execution unit includes:
a scalar dispatcher for forwarding scalar instructions of the sequence of instructions to one of a plurality of scalar arithmetic logic unit (sALU) slices executing the scalar instructions out of order, and
a vector dispatcher for storing vector instructions of the sequence of instructions in at least one vector computational resource (CR) queue before forwarding the vector instructions to a vector slice unit executing the vector instructions in order.

27. The processor of claim 26 further comprising a termination unit for terminating the execution of the instruction data when speculation is resolved and triggering transfer of instruction results from temporary registers to a destination register.

* * * * *

UNITED STATES PATENT AND TRADEMARK OFFICE
CERTIFICATE OF CORRECTION

PATENT NO. : 11,275,590 B2
APPLICATION NO. : 15/068058
DATED : March 15, 2022
INVENTOR(S) : John Edward Vincent It is certified that error appears in the above-identified patent and that said Letters Patent is hereby corrected as shown below:

On the Title Page

Item (54) and in the Specification Column 1, Lines 2 thru 6; delete "DEVICE AND PROCESSING ARCHITECTURE FOR RESOLVING EXECUTION PIPELINE DEPENDENCIES WITHOUT REQUIRING NO OPERATION INSTRUCTIONS IN THE INSTRUCTION MEMORY" and insert --Device and Processing Architecture for Instruction Memory Efficiency--.

Signed and Sealed this
Eighteenth Day of October, 2022

Katherine Kelly Vidal
*Director of the United States Patent and Trademark Office*